United States Patent
Winegarden et al.

(10) Patent No.: US 6,467,009 B1
(45) Date of Patent: Oct. 15, 2002

(54) CONFIGURABLE PROCESSOR SYSTEM UNIT

(75) Inventors: Steven Paul Winegarden, Sunnyvale, CA (US); Bart Reynolds, Seattle, WA (US); Brian Fox, Santa Clara, CA (US); Jean-Didier Allegrucci, Sunnyvale, CA (US); Sridhar Krishnamurthy, San Jose, CA (US); Danesh Tavana, Mountain View, CA (US); Arye Ziklik; Andreas Papaliolios, both of Sunnyvale, CA (US); Stanley S. Yang, Los Altos, CA (US); Fung Fung Lee, Milpitas, CA (US)

(73) Assignee: Triscend Corporation, Mountain View, CA (US)

( * ) Notice: Subject to any disclaimer, the term of this patent is extended or adjusted under 35 U.S.C. 154(b) by 0 days.

(21) Appl. No.: 09/172,918

(22) Filed: Oct. 14, 1998

(51) Int. Cl.[7] .................................................. G06F 1/00
(52) U.S. Cl. ........................ 710/305; 710/306; 710/308; 710/309; 712/10; 712/15; 712/29; 712/31; 712/36
(58) Field of Search ................................ 710/129, 126, 710/110, 113, 305, 306, 308, 311, 309, 241; 712/10, 15, 16, 17, 18, 28–31, 33, 36; 326/38–42

(56) References Cited

U.S. PATENT DOCUMENTS

| | | | |
|---|---|---|---|
| 4,314,353 A | * | 2/1982 | Gunter et al. .................... 712/1 |
| 4,789,951 A | | 12/1988 | Birkner et al. |
| 4,870,302 A | | 9/1989 | Freeman |
| 5,093,915 A | * | 3/1992 | Platteter et al. .............. 395/700 |
| 5,140,193 A | | 8/1992 | Freeman et al. |
| 5,206,940 A | | 4/1993 | Murakami et al. ........... 395/400 |
| RE34,363 E | | 8/1993 | Freeman |
| 5,343,406 A | | 8/1994 | Freeman et al. |
| 5,347,641 A | | 9/1994 | Cedar et al. |
| 5,369,314 A | | 11/1994 | Patel et al. .................... 326/13 |

(List continued on next page.)

FOREIGN PATENT DOCUMENTS

| | | | |
|---|---|---|---|
| EP | 0062431 | 3/1982 | ............. G06F/3/04 |
| EP | 0139254 | 9/1984 | ............. G06F/13/28 |
| EP | 0307649 | 8/1988 | ............. G06F/12/06 |
| EP | 0306962 | 9/1988 | ............. G06F/15/06 |
| EP | 0361525 | 9/1989 | ............. G06F/15/78 |
| EP | 0486248 | 11/1991 | ............. G06F/15/60 |
| EP | 0503498 | 3/1992 | ............. G06F/15/78 |
| EP | 0511674 | 4/1992 | ............. G06F/15/78 |
| EP | 0536793 | 10/1992 | ............. G06F/9/445 |
| EP | 0636976 | 7/1994 | ............. G06F/11/00 |
| EP | 0742516 | 4/1996 | ............. G06F/7/00 |
| GB | 2297409 | 1/1996 | ............. G06F/17/50 |

OTHER PUBLICATIONS

PCT Search Report, PCT/US99/24114, dated Jan. 26, 2000, 5 pgs.
PCT Search Report, PCT/US99/24114, dated Apr. 25, 2000, 10 pgs.
Efficient Mechanism for Multiple Debug Modes, IBM Technical Disclosure Bulletin, vol. 38, No. 11, Nov. 1995, pp. 65–68.
System Master Slice For Fast Turnaround Time, IBM Technical Disclosure Bulletin, vol. 26, No. 3B, Aug. 1983, pp. 1531–1532.
Update Mechanism For Personal Computer System Resident Firmware, IBM Technical Disclosure Bulleten, vol. 34, No. 10B, Mar. 1992, pp. 133–136.

*Primary Examiner*—Peter Wong
*Assistant Examiner*—Raymond N Phan
(74) *Attorney, Agent, or Firm*—Blakely, Sokoloff, Taylor & Zafman LLP

(57) ABSTRACT

The configurable processor system includes a processor, an internal system bus, and a programmable logic all interconnected via the internal system bus, on a single integrated circuit.

109 Claims, 39 Drawing Sheets

U.S. PATENT DOCUMENTS

| | | | |
|---|---|---|---|
| 5,402,014 A | 3/1995 | Ziklik et al. | |
| 5,432,719 A | 7/1995 | Freeman et al. | |
| 5,432,950 A | 7/1995 | Sibigtroth | 395/425 |
| 5,448,493 A | 9/1995 | Topolewski et al. | |
| 5,488,316 A | 1/1996 | Freeman et al. | |
| 5,504,439 A | 4/1996 | Tavana | |
| 5,592,102 A | 1/1997 | Lane et al. | 326/10 |
| 5,635,851 A | 6/1997 | Tavana | |
| 5,682,107 A | 10/1997 | Tavana et al. | |
| 5,710,891 A * | 1/1998 | Normoyle et al. | 710/119 |
| 5,748,912 A * | 5/1998 | Lee | 710/301 |
| 5,774,684 A * | 6/1998 | Haines et al. | 710/129 |
| 5,784,637 A * | 7/1998 | Sawase et al. | 709/37 |
| 5,818,255 A | 10/1998 | New et al. | |
| 5,825,202 A | 10/1998 | Tavana et al. | |
| 5,834,947 A | 11/1998 | Cedar et al. | |
| 5,844,424 A | 12/1998 | Krishnamurthy et al. | |
| 5,844,854 A * | 12/1998 | Lee | 361/230.01 |
| 5,847,580 A | 12/1998 | Bapat et al. | |
| 5,880,597 A * | 3/1999 | Lee | 326/41 |
| 5,883,525 A | 3/1999 | Tavana et al. | |
| 5,901,295 A * | 5/1999 | Yazdy | 710/113 |
| 5,911,082 A * | 6/1999 | Monroe et al. | 712/35 |
| 5,935,230 A * | 8/1999 | Pinai et al. | 710/111 |
| 5,936,424 A | 8/1999 | Young et al. | |
| 5,942,913 A | 8/1999 | Young et al. | |
| 5,963,050 A | 10/1999 | Young et al. | |
| 5,982,195 A * | 11/1999 | Cliff et al. | 326/741 |
| 6,020,757 A * | 2/2000 | Jenkins et al. | 326/39 |
| 6,020,758 A * | 2/2000 | Patel et al. | 326/40 |
| 6,023,742 A * | 2/2000 | Ebeling et al. | 710/107 |
| 6,067,615 A * | 5/2000 | Upton | 712/37 |
| 6,085,317 A * | 7/2000 | Smith | 713/1 |
| 6,094,065 A | 7/2000 | Tavana et al. | |
| 6,017,824 A * | 8/2000 | Reddy et al. | 326/41 |
| 6,107,827 A | 8/2000 | Young et al. | |
| 6,184,705 B1 | 2/2001 | Cliff et al. | |
| 6,191,608 B1 | 2/2001 | Cliff et al. | |
| 6,212,639 B1 | 4/2001 | Erickson et al. | |
| 6,236,245 B1 | 5/2001 | Papaliolios | |
| 6,259,286 B1 | 7/2001 | Papaliolios | |
| 6,282,627 B1 * | 8/2001 | Wong et al. | 712/15 |
| 6,298,366 B1 * | 10/2001 | Gatherer et al. | 708/523 |

* cited by examiner

| Prefix | Time[N-1] | Time[N] | Time[N+1] | Time[N+2] | Time[N+3] | Time[N+4] | Time[N+5] |
|---|---|---|---|---|---|---|---|
| arb_ | | nw,nq,ew | | | | | |
| mw_ | | | qw,qq,dwm,adr,wren | | | | |
| sw_ | | | dws,adr,wren | | | | |
| fw_ | | | | dws,adr,wrsel | | | |
| fr_ | | | | | | | |
| sr_ | | | | | | | |
| mr_ | | | | | | | |

FIG. 4

| Prefix | Time[N-1] | Time[N] | Time[N+1] | Time[N+2] | Time[N+3] | Time[N+4] | Time[N+5] |
|---|---|---|---|---|---|---|---|
| arb_ | | nw,nq,ew | | | | | |
| mw_ | | | qw,qq,dwm,adr,wren | | | | |
| sw_ | | | dws,adr,wren | waitnow | | | |
| fw_ | | | | dws,adr,wrsel,waited | dws,adr,wrsel,waited | | |
| fr_ | | | | waitnow | | | |
| sr_ | | | | | waited | | |
| mr_ | | | | | | | |

| Prefix | Time[N−1] | Time[N] | Time[N+1] | Time[N+2] | Time[N+3] | Time[N+4] | Time[N+5] |
|---|---|---|---|---|---|---|---|
| arb_ | | na,nr,er | | | | | |
| mw_ | | | qa,adr,rden | | | | |
| sw_ | | | adr,rden | | | | |
| fw_ | | | | adr,rdsel | | | |
| fr_ | | | | | | | |
| sr_ | | | | drs | drs | | |
| mr_ | | | | | drm | | |

FIG. 7

| Prefix | Time[N−1] | Time[N] | Time[N+1] | Time[N+2] | Time[N+3] | Time[N+4] | Time[N+5] |
|---|---|---|---|---|---|---|---|
| arb_ | | na,nr,er | | | | | |
| mw_ | | | qa,adr,rden | | | | |
| sw_ | | | adr,rden | waitnow | waitnow | | |
| fw_ | | | | adr,rdsel | adr,rdsel,waited | adr,rdsel,waited | |
| fr_ | | | | waitnext | | drs | |
| sr_ | | | | waitnow | waitnow | waited | drs |
| mr_ | | | | | waited | waited | drm |

FIG. 8

| Prefix | Time[N-1] | Time[N] | Time[N+1] | Time[N+2] | Time[N+3] | Time[N+4] | Time[N+5] |
|---|---|---|---|---|---|---|---|
| arb_ | | nw,ew | | | | | |
| mw_ | | | qw,dwm,dmaack | | | | |
| sw_ | | | dws,dmaack | | | | |
| fw_ | | | | dws,dmaack | | | |
| fr_ | | | | | | | |
| sr_ | | | | | | | |
| mr_ | | | | | | | |

FIG. 9

| Prefix | Time[N-1] | Time[N] | Time[N+1] | Time[N+2] | Time[N+3] | Time[N+4] | Time[N+5] |
|---|---|---|---|---|---|---|---|
| arb_ | | nr,er | | | | | |
| mw_ | | | dmaack | | | | |
| sw_ | | | dmaack | waitnow | | | |
| fw_ | | | | dmaack | waited | | |
| fr_ | | | | drs | | | |
| sr_ | | | | waitnow | drs | | |
| mr_ | | | | | drm,waited | | |

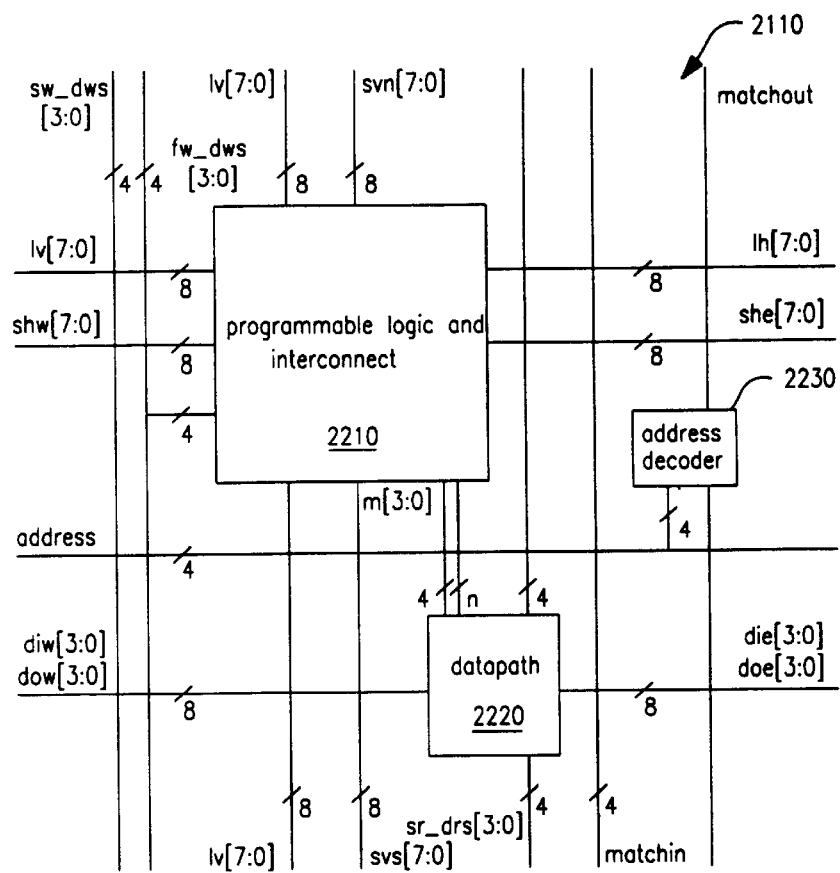
FIG. 22A
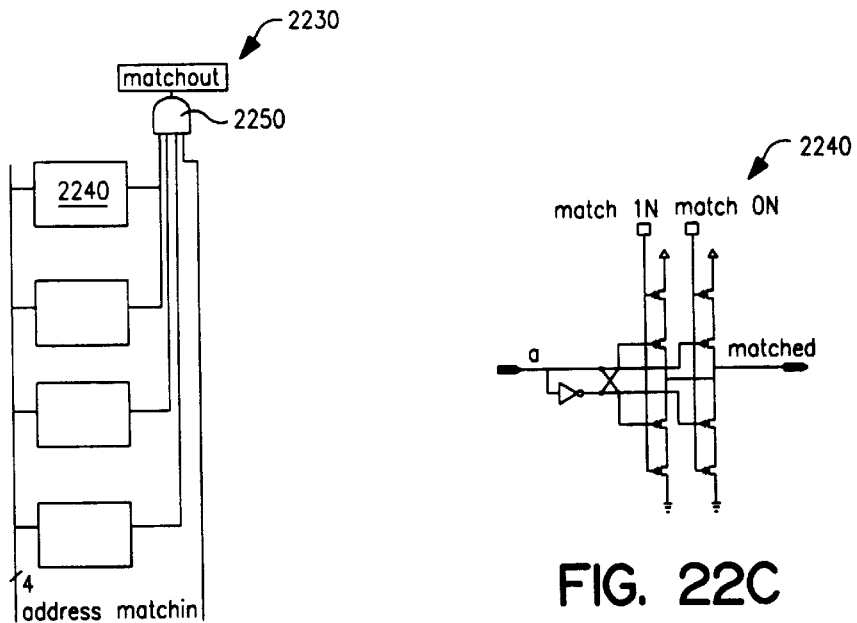
FIG. 22B
FIG. 22C

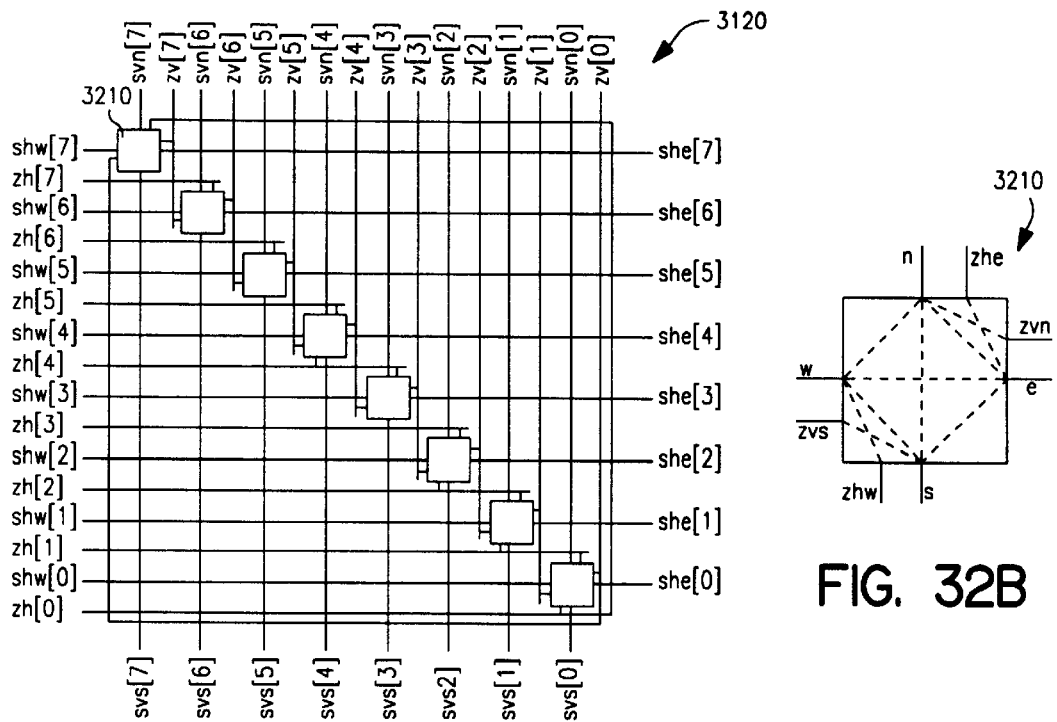
FIG. 32A
FIG. 32B
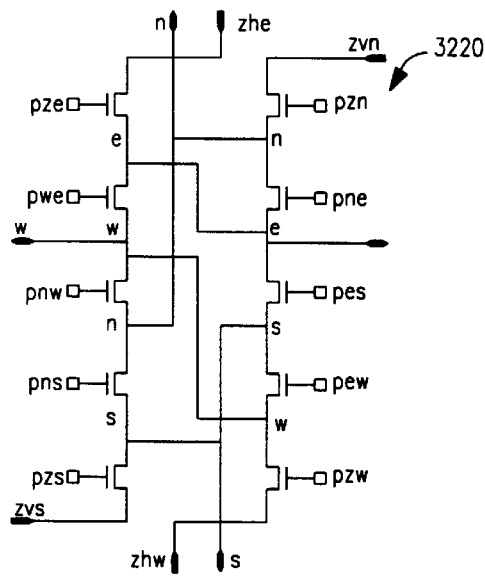
ten-way switch (first implementation)
FIG. 32C
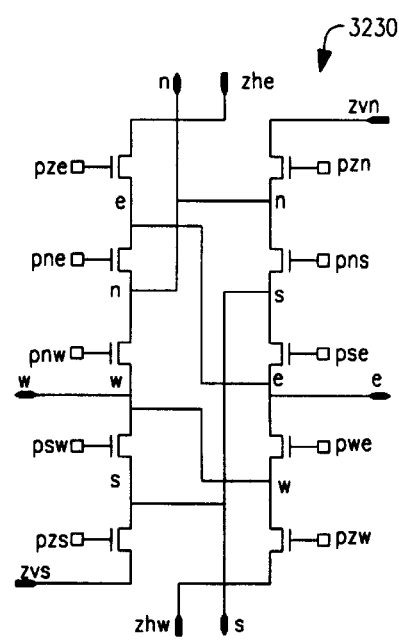
ten-way switch (second implementation)
FIG. 32D

CONFIGURABLE PROCESSOR SYSTEM UNIT

FIELD OF THE INVENTION

The present invention relates to integrated circuits, and more specifically, to a configurable processor system unit.

BACKGROUND OF THE INVENTION

Micro-controllers have been around over two decades dating back to the mid 1970's. A micro-controller describes a class of embedded systems. It is usually a single chip device containing a central processing unit, or CPU, custom logic, and an embedded program written in assembly or machine language. The CPU's program and the custom logic embedded within the micro-controller thus tailor its application. A typical calculator for example has a micro-controller specifically designed to interact with a LCD display, numeric keypad, and provide various arithmetic functions. From the inception of the micro-controller device, hundreds of different custom configurations have been designed to address specific applications. The overhead, in terms of time and cost, associated with customizing a micro-controller is significant. Therefore, custom micro-controllers make practical economic sense when large volumes, usually millions of units, are at stake.

An alternative to custom micro-controllers is an Application Specific IC, commonly known as ASIC. An ASIC offers user customization through personalizing the masking layers during the production of the integrated circuit device. Personalization usually comes in two forms: metal only mask, known as Gate-Arrays, and all mask personalization, called Standard Cells. The average ASIC user must overcome numerous obstacles and challenges before an actual product can be realized. Firstly, designing a CPU and associated development tools is a tremendous barrier for most customers. Secondly, the hardware and software expertise, development time, and non-recurring expenses associated with developing such an ASIC is usually much greater than the return. And finally, test and debug costs, manufacturing lead times, and inventory control pose serious challenges to less experienced, cash starved users.

The most economical approach currently available is to adopt a multi-chip embedded system solution by utilizing a Programmable Logic Device, external non-volatile memory, and an off the shelf standard CPU. This is not a single chip solution and is therefore in a different category. However, for the purposes of completeness it is worth noting the problems associated with this approach. Both power consumption and performance are compromised in a multi-chip solution due to excessive I/O pad and board trace capacitance switching. A multi-chip approach does not scale with process technology due to mechanical bonding and packaging issues. Therefore, it does not benefit from process migrations. Time-to-market benefits are better than competing alternatives but not as good as an integrated solution. And finally, a multi-chip solution offers limited and inflexible CPU to logic, and CPU to I/O signal access due to pre-constrained pin assignment.

SUMMARY OF THE INVENTION

It is an object of the present invention to provide a configurable processor system on a single integrated circuit.

The configurable processor system includes a processor, an internal system bus, and a programmable logic all interconnected via the internal system bus.

Other objectives, features, and advantages of the present invention will be apparent from the accompanying drawings and from the detailed description that follows below.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a timing diagram of one embodiment of an addressed write with no wait states.

FIG. 5 is a timing diagram of one embodiment of an addressed write with one wait state.

FIG. 6 is a timing diagram of one embodiment of an addressed read with no wait states.

FIG. 7 is a timing diagram of one embodiment of an addressed read with two wait states.

FIG. 8 is a timing diagram of one embodiment of a DMA acknowledge write without wait states present.

FIG. 9 is a timing diagram of one embodiment of a DMA acknowledge read with one wait state present.

FIG. 32 is a circuit diagram of one embodiment of a structure of sbox.

Drawing convention: in the figures a white square is used to indicate one or more signals controlled by configuration memory that is configured prior to normal user operation of the programmable logic.

DETAILED DESCRIPTION

1. Introduction

A configurable processor system unit (CPSU) integrates a CPU, an internal system bus, programmable logic also referred to as configurable system logic (CSL), and various system resources all interconnected and communicating via the internal system bus on a single piece of silicon. For one embodiment, one of the system resources provides a dedicated external memory interface function.

Figure 1:
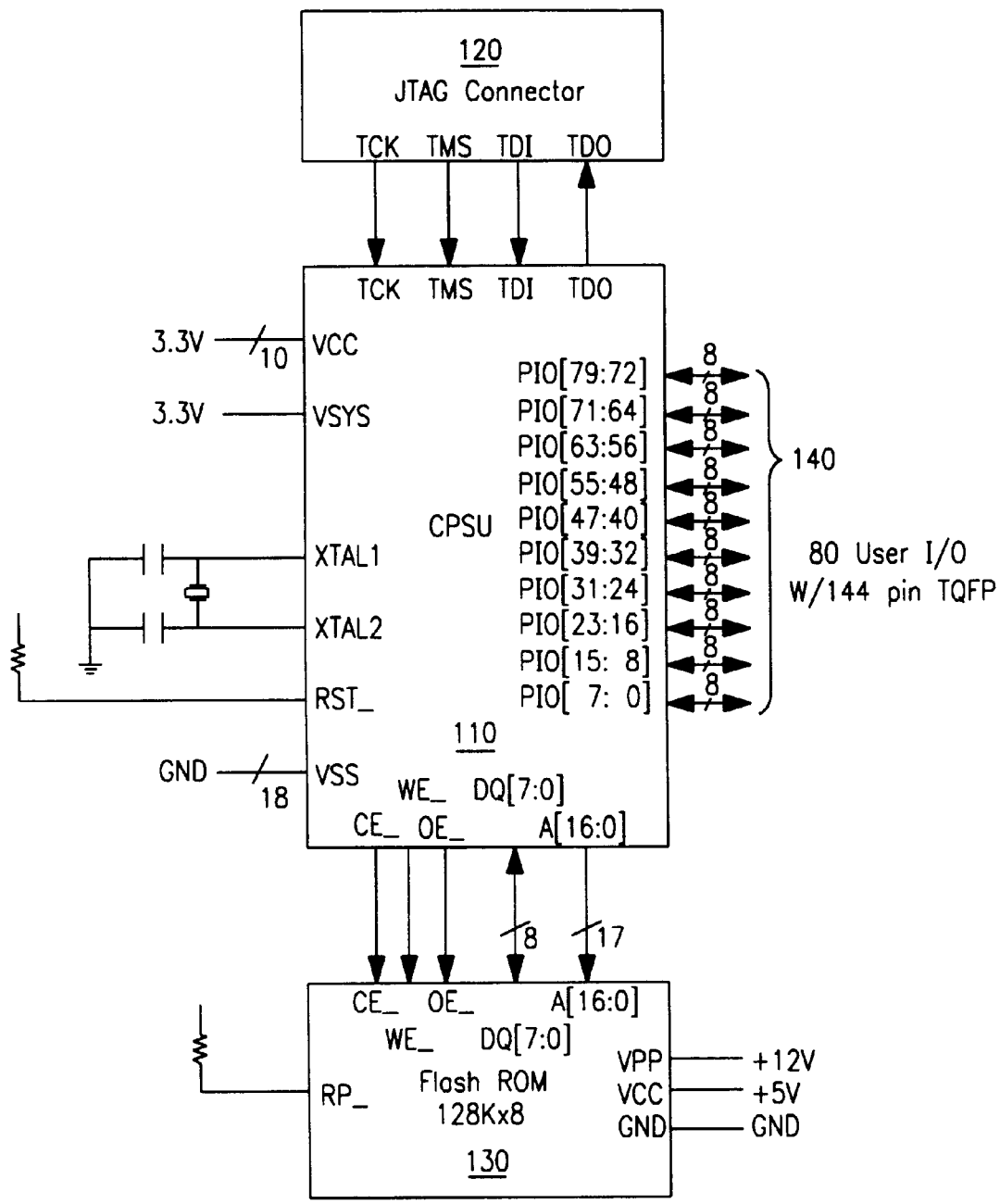
FIG. 1 is a CPSU in a typical system environment.

A typical application environment is shown in FIG. 1. Here the CPSU chip 110 connects directly to a read only memory (ROM) 130 from which it accesses various programmed information to determine its operation. To control, monitor or communicate with its environment, other connections are via the input output pins, also referred to as PIOs 140. For one embodiment, the PIO interface buffers connect directly only to the CSL, where they may be interconnected with the rest of the system or operated independently. The internal system bus signals and the various dedicated system resource signals that connect to the CSL are collectively referred to as the configurable system interconnect or CSI. There are also several dedicated interface pins to the chip for power, timing, initialization and test. Only the power pins have no alternate connection relative to that shown in FIG. 1. The dedicated processor, bus, and system resources provide an efficient and stable high performance system; while the configurable system logic provides flexible general interconnect and interface logic capability. By using a processor and software in conjunction with hardware it is usually possible to simplify and improve the overall hardware implementation. The software and hardware programs that determine the operating characteristics of the CPSU 110 are accessed or loaded from the external ROM following power up and may be changed by reprogramming that ROM. The computing resources and programmable logic resources are available to complement and support each other in an application.

The external interface signals as shown in the application diagram are as follows:

| | |
|---|---|
| PIO[79:0] | CSL I/O pins |
| CE_ | External memory chip enable |
| WE_ | External memory write enable |
| OE_ | External memory output enable |
| DQ_[7:0] | External memory data bus |
| A[16:0] | External memory address bus |
| TCK | JTAG test clock input |
| TMS | JTAG test mode select |
| TDI | JTAG test data input |
| TDO | JTAG test data output |
| VSS | Circuit ground |
| VCC | Supply voltage |
| VSYS | System initialization mode |
| RST_ | Reset input (low assertion) |
| XTAL1 | Oscillator input |
| XTAL2 | Output of oscillator or primary system clock input |

Figure 2:
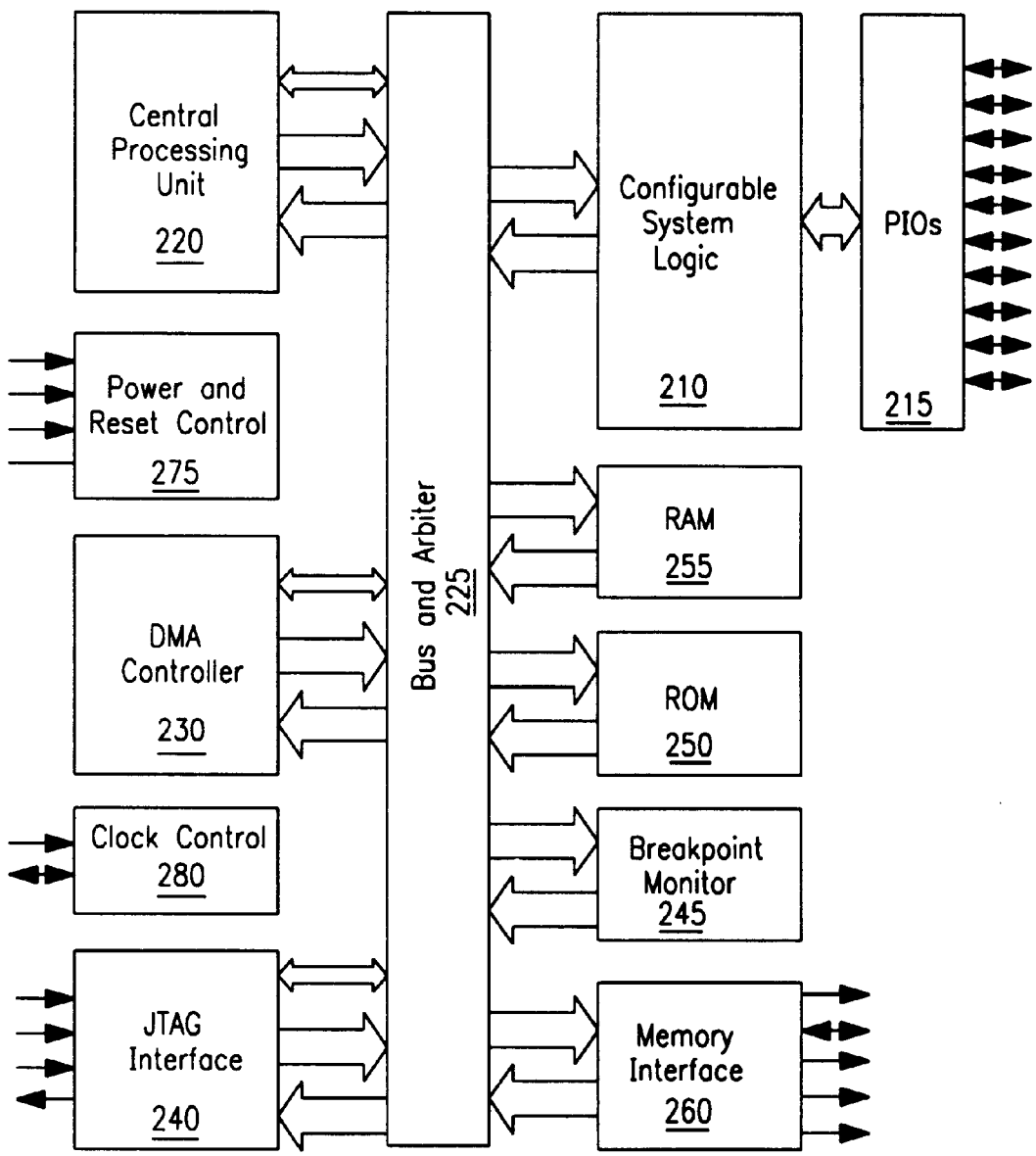
FIG. 2 is a block diagram of one embodiment of a CPSU architecture.

A block diagram of the CPSU 110 identifying one embodiment of the system resources is shown in FIG. 2. Those system resources that reside on the internal system bus 225 are shown to the left of the bus and arbiter block 225 if they are masters, and to the right if they are slaves, in typical application. The CPU 220, CSL 210, PIOs 215, and memory interface 260 mentioned above are shown. The various system resources may also include internal random access memory (RAM) 255, a small internal ROM 250 containing fixed initialization code, a controller for performing direct memory access (DMA) 230, a JTAG interface 240 (Joint Test Action Group) with bus master extensions, and an internal bus monitor and breakpoint unit 245. The clock control 280 and power and reset control 275 sections generally do not have general bus interfaces. There is also a group of control registers that are not shown in the diagram. For one embodiment, these control registers determine the operating characteristics of each of the system resources. The memory bits that determine the configuration of the CSL 210 are assigned to an addressable region on the internal system bus 225. The CSL 210 also has the slave side of the internal system bus 225 distributed throughout along with many programmable bus interface decoders and pipeline registers that may then be used by the user programmable logic within the CSL 210.

2. Configurable System Interconnect 2.1. Overview

The programmable logic section referred to as configurable system logic (CSL) is connected to the processor, various system peripherals, external pins, and clock sources by a group of signals collectively referred to as, the configurable system interconnect (CSI).

A subset of the CSI is structured as a bus of shared signals to facilitate communication between any device connected to it within either the dedicated system logic or within the CSL. For one embodiment, the CSI bus operates synchronously and supports multiple masters and slaves, direct memory access (DMA), and wait states. For one embodiment, the methods applied to improve overall transfer rate on the bus include one or more of: pipelining, separating the write and read data paths, the use of multiplexed or logical OR networks to combine signal sources, and support of a fast default cycle with optional wait states when necessary. One of the system slaves attached to this bus is designed for accessing external memory devices.

The slave interface portion of the CSI Bus extends into the CSL. The interface between the CSI Bus and the CSL includes high performance address decoding terms distributed throughout the CSL to simplify the general purpose CSL logic required to build interface functions. Each of these decoders has logic associated with it to generate signals ready to be connected to programmable logic for read and write or for DMA requests and acknowledges. Each decoder and transaction signal generator is referred to as a selector. The CSI Bus interface signals available within the CSL for the connection of user defined logic, are collectively referred to as a socket. Each CSI Socket logically includes the signals associated with one selector which are not shared, and any suitable copy of the other bus signals interfaced to the CSL, which are shared. All of the pipelining for the CSI Socket signals is done outside of the CSL general-purpose programmable logic. The fact that these signals are pipelined outside the CSL can be ignored when implementing logic within the CSL.

Other parts of the CSI carry communication or control signals that are not suitable for bussing between their corresponding dedicated system resource interface and their interface point within the CSL. These other signals include various system peripheral signals, pad interface buffer signals, and clocks. The microprocessor system peripherals include serial ports, timers, and interrupts.

2.1.1. Primary CSI Signal Name Lists

All of the interconnect signals have a primary name listed here. Each of these primary signal names may be reused with different prefixes. The prefixes will typically resolve which name to associate with a particular pipeline time slot and bus segment. Signal names may also have aliases. The un-prefixed primary name will typically be considered to alias with the names of the signals available within the CSL at CSI Sockets. The prefix conventions will be explained after the primary name lists.

Common Bus Signals

These are the shared or common CSI Bus signals that are also available under aliases at every CSI socket.

| | |
|---|---|
| bclk | Bus clock |
| dws[7:0] | Slave write data bus, into slaves |
| drs[7:0] | Slave read data bus, out of slaves |
| adr[31:0] | Address bus |
| waited | Indicates previous cycle was a wait state |
| waitnext | Assert to cause next cycle to be a wait state |

Bus Control Signals

The following signals are not directly available inside the CSL at a CSI Socket. They do appear on the CSI Bus and are available for dedicated system logic. The signals are available during the pipeline distribution phase and are used as qualifiers in the selectors within the CSL.

| | |
|---|---|
| brst_ | Bus reset (not available at CSI Sockets) |
| dwm | Master write data bus (not inside CSL) |

-continued

| | |
|---|---|
| drm | Master read data bus (not inside CSL) |
| wren | Write enable (not directly available at CSI Sockets) |
| rden | Read enable (not directly available at CSI Sockets) |
| waitnow | Assertion causes the current cycle to be a wait state (not available at CSI Sockets) |
| ignore | Identifies processor to external memory bus read transactions (not inside CSL) |

External Memory Coordination Signals

Additional devices may be connected to the external memory interface bus. These signals allow decoding for this to be implemented with selectors in the CSL.

| | |
|---|---|
| xmreq | External memory cycle request out from selectors in CSL |
| xmact | External cycle enable timing input to selectors in CSL |

Socket Selector Signals

One set of the following three signals are handled by each selector. The index identifies the signals of one of many selectors in the CSL. One selector is associated with each CSI Socket. The first two signals are generated for address and command decodes and driven into the CSL. There are alternate configurations for these signals. When these signals are used for DMA acknowledge, the "rqsel" signal may be used as the corresponding DMA request driven out of the CSL.

| | |
|---|---|
| wrsel[127:0] | Decoded write enable |
| rdsel[127:0] | Decoded read enable |
| rqsel[127:0] | Channel selected DMA request |

Bus DMA Signals

For one embodiment, there are two direct memory access (DMA) channels. The index identifies which channel the signals are associated with. Inside the CSL, the DMA signals are connected to the selectors.

| | |
|---|---|
| dmareq[1:0] | DMA requests |
| dmaack[1:0] | DMA acknowledges |

Breakpoint Signals

The breakpoint generator can receive a break signal from the CSL or have the final break delivered to the CSL.

| | |
|---|---|
| bpevt | Event from breakpoint generator to CSL |
| bpctl | Control from CSL to breakpoint generator |

All of the signals described above are generally synchronous to the bus. The signal groups related to bus operations are also used in the dedicated system logic. Within the CSL there are many copies, or entry and exit points for these signals, all of which are logically equivalent.

Bus Arbitration Signals

Arbitration signals are related only to the operation of bus master devices. Only slave devices may be implemented within the CSL. The portions of the bus that relate to master interface are implemented within dedicated logic. The index identifies which arbitration channel the signals are associated with. These signals are bus synchronous.

| | |
|---|---|
| nw[7:0] | Need (request) write data bus |
| na[7:0] | Need (request) address and control bus |
| nr[7:0] | Need (request) read data bus |
| ew[7:0] | Early enable (grant) of write data bus and address/control if requested |
| er[7:0] | Early enable (grant) of read data bus and address/control if requested |
| qw[7:0] | Queue enable (grant) of write data bus |
| qa[7:0] | Queue enable (grant) of address and control bus |

Prefix Conventions

There are several pipeline time slots and bus segments for each bus signal. The following prefixes are generally used with the primary or base signal names to distinguish a particular time slot and segment.

| | |
|---|---|
| arb_ | Arbitration request and early response |
| mw_ | Master write collection segment |
| sw_ | Slave write distribution segment |
| fw_ | Socket interface write post register distribution segment |
| fr_ | Socket interface read pre register collection segment |
| sr_ | Slave read collection segment |
| mr_ | Master read distribution segment |

Additional and alternate prefixes, postfixes, and indexes are also used as necessary within the implementation to distinguish aliases associated with the same time slot and segment. Input and output designation prefixes "I" and "O" are commonly used within the tile structure with signals that are re-buffered or combined with logic within that tile. Direction of signal flow prefixes associated with the points of the compass are also widely used within the implementation.

2.1.2. Basic Bus Operational Description

For one embodiment, the bus is 32 bit address, 8 bit data, non-multiplexed with separate data in and out, and multiple separate decoded and qualified read and write enables. All bus information is valid at the rising edge of the clock. The full cycle time is available for CSL logic, except for the output delay and input setup time of registers at the socket interface. The same CSI bus is used for both CSL and dedicated system logic. DMA requests may be pipelined and are pended to achieve burst operation. Each cycle on which a request is asserted is recognized as a separate request. A round robin arbitration scheme is implemented for masters; however, the CSL only supports slaves.

Bus Segments

Figure 3:
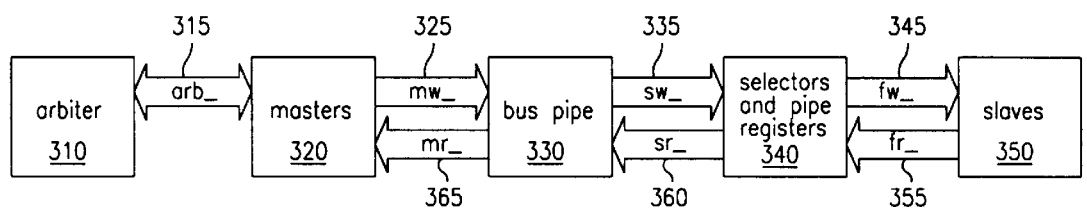
FIG. 3 is a block diagram of one embodiment of bus segments.

A block diagram of one embodiment of the various bus segments labeled according to their name prefix is shown in FIG. 3. The "arb_" arbitration segment 315 connects the arbitration request and response signals between the masters 320 and the arbiter 310. For one embodiment, the arbitration signals are separate for each master 320 and are not bussed. The "mw_" master-write segment 325 carries signals from the masters 320 to the bus pipe 330. The individual master signals are collected together via either multiplexors or logical OR gates into a consolidated bus in this segment. The "sw_" slave-write segment 335 buffers and distributes signals from the bus pipe 330 to the selectors and pipe registers 340 distributed throughout the CSL. The "fw_" socket interface write segment 345 carries signals from the selectors and pipe registers 340 to the slaves 350. Here the signals are routed to the general-purpose configurable logic of the CSL. The "fr_" socket interface read segment 355 collects signals from the slaves 350 to the return pipe registers 340. These signals are also routed through general-purpose configurable logic of the CSL. These "fr_" signals are collected together via either multiplexor cascades simulating logical OR gates or logical OR gates into more consolidated bus signals at the pipe registers. The "sr_" slave read segment 360 carries signals from the return pipe registers 340 located throughout the CSL to the bus pipe 330. They are collected via logical OR gates within this segment into a consolidated bus. The "mr_" master read segment 365 buffers and distributes signals from the consolidated bus 330 to the masters 320. For one embodiment, there are several selectors with a single set of pipe registers in the dedicated system logic also connected to the slave bus segments "sw_" and "sr_" that allow dedicated system logic slaves to interact with the same bus.

Bus Time Slots

A series of timing diagrams are shown in FIG. 4 through FIG. 9. Each diagram shows the signals that are active within each bus segment at the time slots associated with one transaction. Signals that are not active are all driven to zero so that they do not interfere after being combined on the bus via a logical OR. Each time slot is associated with one cycle of the bus clock. The six different transactions shown are:

Addressed write with no wait states in FIG. 4,

Addressed write with one wait state in FIG. 5,

Addressed read with no wait states in FIG. 6,

Addressed read with two wait states in FIG. 7,

DMA acknowledge write without wait states present in FIG. 8,

DMA acknowledge read in the presence of one wait state in FIG. 9.

A generic description of the beginning of a bus transaction follows. First the master makes an arbitration request. In these diagrams it is shown on the "arb_" segment during time slot "Time[N]". If it is not contending with anything else for the bus it will get the bus on the next time slot. An early grant indication is returned to the master during the arbitration time slot. During time slot "Time[N+1]" the arbitration grant is used to enable one master's signals onto the "mw_" bus segment. If no wait state has been added to a previous transaction on the previous cycle, these signals are driven on to the "sw_" bus segment during this same time slot and on through the decoders and selectors. The selector address decoding is done during this time slot. During time slot "Time[N+2]" signals are delivered to the programmable logic on the "fw_" bus segment. These transaction scenarios differ in the remainder of the time slots. Each of these is described separately below.

In the scenario shown in FIG. 4, an addressed write with no wait states, the data is registered into the slave at the end of time slot "Time[N+2]" and the transaction is complete.

In the scenario shown in FIG. 8, a DMA acknowledge write with no wait states present, the data is registered into the slave at the end of time slot "Time[N+2]" and the transaction is complete. The DMA acknowledge signal is owned and driven by the particular DMA channel making the transaction.

In the scenario shown in FIG. 6, an addressed read with no wait states, the data is gated out to the bus on the "fr_" segment during time slot "Time[N+2]". This data is then piped to appear on bus segment "sr_" during time slot "Time[N+3]". The read data is consolidated and passed on to segment "mr_" during the same time slot. At the end of this time slot it may be registered back into the master that originated this transaction.

In the scenarios shown in FIG. 5, FIG. 7, and FIG. 9, the addition of one or two wait states preserve the information on the "fw__" bus segment for one or two additional cycles respectively. In the scenarios of FIG. 5 and FIG. 7 the first wait state is added by the selector decode resulting in the assertion of "sr__waitnow" during "Time[N+2]". In the scenario shown in FIG. 9 the wait state is inserted by something else on the bus, such as a simultaneous addressed read transaction like that shown in FIG. 6, not by the selector handling the DMA. Whenever "waitnow" is asserted on the "sr__" bus segment, it is driven back to the "sw__" bus segment during the same clock cycle or time slot. Whenever "waitnow" is asserted, it results in "waited" being asserted during the next time slot.

In the scenario shown in FIG. 5, an addressed write with one wait state, the data may be registered into the slave at the end of either time slot "Time[N+2]" or "Time[N+3]" or both. At that time the transaction is complete. If it is important to recognize the number of writes at the slave, then the "fw__waited" signal available during "Time[N+3]" may be used to block duplication.

In the scenario shown in FIG. 7, an addressed read with two wait states, "waitnext" is asserted by the slave during time slot "Time[N+2]" resulting in the assertion of "waitnow" during time slot "Time[N+3]". Read data may be driven during the wait states but only the value driven after the last wait state during "Time[N+4]" will be recognized by the master during time slot "Time[N+5]".

In the scenario shown in FIG. 9, a DMA acknowledge read in the presence of one wait state, the wait is ignored by both the master and the slave involved in DMA acknowledge transactions. Read data is driven during time slot "Time[N+2]" and then will be returned to the DMA master during "Time[N+4]".

When transactions are completed without wait states, they may be issued every cycle. Each wait state consumes one additional cycle of the bus.

A DMA acknowledge write transaction, such as that shown in FIG. 8, and an addressed read transaction, such as that shown in FIG. 6, may be issued simultaneously and travel through the bus pipeline together. Further examination of these two timing diagrams will show that none of the same signals appear at the same time on any bus segment. Similarly, the addressed write with one wait state and the DMA acknowledge read in the presence of one wait state, as shown in FIG. 5 and FIG. 9 respectively, may be issued and completed simultaneously.

Cross Section

Figure 10:
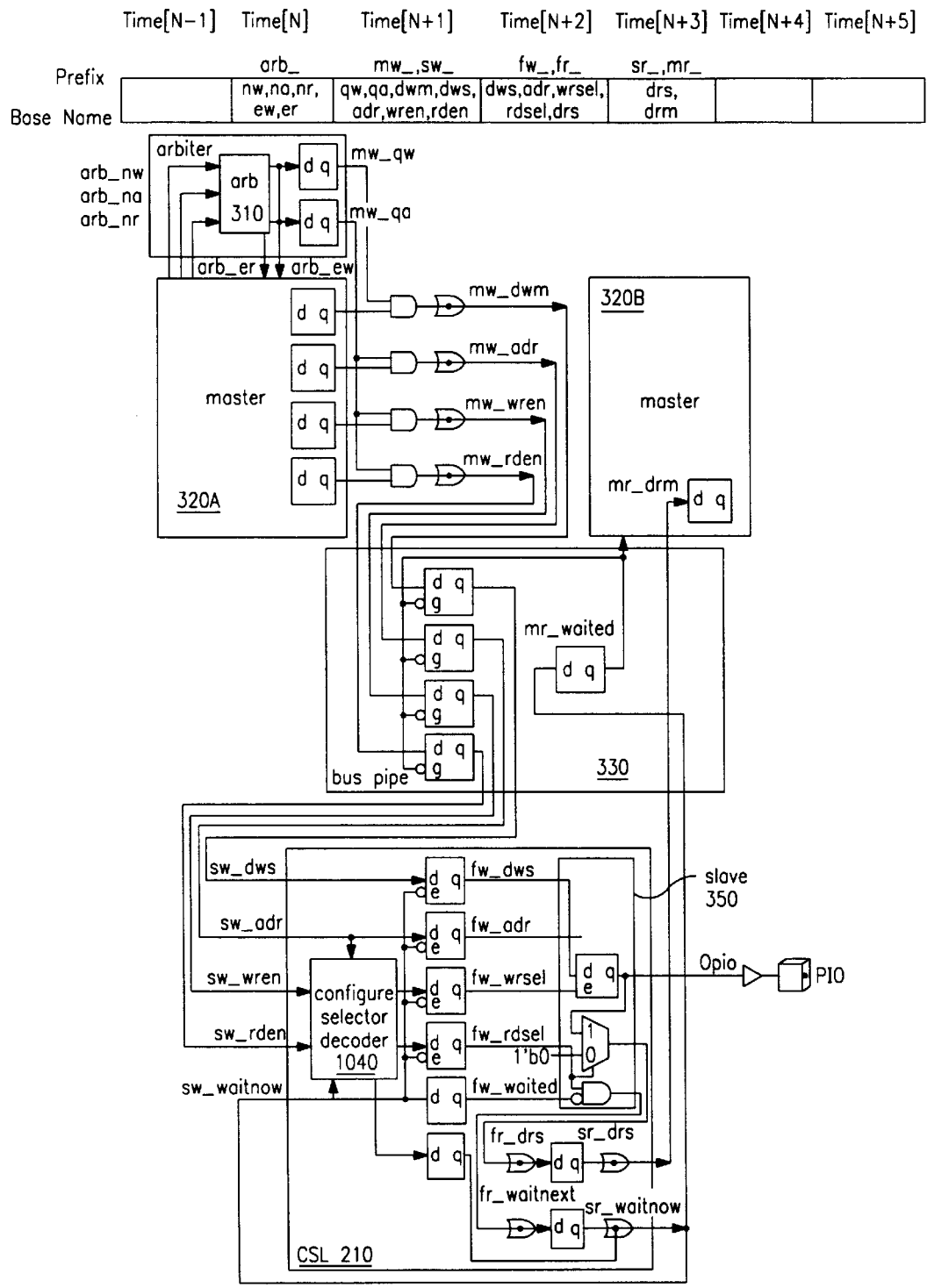
FIG. 10 is a circuit diagram of one embodiment of a cross section of bus showing pipeline from master to a sample slave and back to master.

A cross section of the bus showing the pipeline from a master to a sample slave and back to the master is shown in FIG. 10. The sample slave 350 is implemented within the CSL. Transactions with the sample slave 350 would result in the timing diagrams shown in FIG. 5 and FIG. 7. If the "waitnext" is tied down and the selector is configured for no initial wait-state, the transaction timing diagrams is as shown in FIG. 4 and FIG. 6.

The time slots and applicable signal prefixes and base names for the no wait-state cases are shown at the top of FIG. 10. Fine dotted lines run vertically through the figure between each time slot and through the right edge of the registers assigned to separate those time slots. The right hand edge of each register in the logic diagram is drawn with a thicker line that is aligned with the applicable time slot boundary.

Within the diagram, the segments that collect or consolidate signals have a logical OR gate containing a dot in the center drawn on the applicable signals. This represents that the many sources or aliases for that signal are combined via logical OR gates. This symbol as used here does not imply any particular method or circuit for of implementing a logical OR. A circle at the point where a signal enters a block implies that the signal is inverted relative to its use within the block. The enable controlled registers are shown with an "e" control input that, if asserted, allows new data to be registered when it is clocked. The gated registers, shown with a "g" control input, may be implemented either as a latch or as a clocked register with a bypass multiplexor where the output of the multiplexor is the input to the register. Clock connections are not shown in the diagram; however, all of the registers shown are driven by the bus clock.

The signals have one clock cycle to travel from the outputs of a master 320A through the "mw__" master write collection segment, through the bus pipe 330, through the "sw__" slave write distribution segment, through the configure selector decoder 1040, and to the inputs of the "fw__" socket interface write registers. For more details on the configure selector decoder 1040, see Section 3.2.2.

The control and information on the "fw__" socket interface write distribution segment signals are then available for one or more clock cycle within the general purpose configurable logic. The selector may be configured to insert the first wait state. If more than one wait state is needed, the "fr__waitnext" signal is asserted during the first clock cycle within configurable logic.

If the transaction is a read, then the applicable "fw__" signals are used to enable information onto the "fr__drs" signals. An addressed read without wait states returns the information enabled by "fw__rdsel" through the "fw__drs" socket interface read collection segment to the inputs of the data return registers.

The signals then have one clock cycle to travel from the outputs of a data return registers through the "sr__" slave read collection segment, through the bus pipe return path, through the "mr__" master read distribution segment, and to the inputs of the master return data registers.

In the logic diagram various sections are surrounded by boxes drawn with thin lines. These include the arbiter 310, the master shown in two parts 320A, 320B, and the CSL block 210 which further contains the sample slave 350 configured into the general programmable logic. The slave 350 in this case is a register that may be read or written at some address. The register is one of those available for configurable logic within the CSL. The output of this slave register 350 drives an external "PIO" signal. For one embodiment, the read of the register is via a special read data multiplexor in the CSL. For one embodiment, the gate used for the generation of "waitnext" is implemented in a look up table cell (LUT) inside the CSL. The interconnections between these elements and to the socket interfaces are made via general programmable interconnect inside the CSL. The logic and interconnect resources available for this are covered in a later section.

2.2. Pipelined Bus

This method separates the time taken or allowed within the logic of a programmable bus slave from that taken to distribute bus signals to the slave and the time to return signals from the slave.

There are two alternate examples. In one case the bus signals from the masters to the slaves and back are in a single long time domain allocated to one or more clocks. In another case for bus signals going between chips, they are registered into the slave chip on one clock and read data is registered out on the next.

In this method the bus signals are pipelined at many places throughout a section of programmable logic. This allows the allocation of a single clock cycle to typical functions implemented within the programmable logic. It also facilitates transport of the next set of signals to the input of the pipeline register within the programmable logic while the current set is handled within the logic and transportation of the previous return information back form the programmable logic at the same time. The total data bandwidth may be tripled by this pipelining. The duplication of the pipeline registers within the programmable logic minimizes the time to or from any pipeline register reducing the clock cycle time required within the programmable logic. It also, by minimizing the paths, simplifies the worst case timing analysis for bus interface timing. By leaving the bus transport time entirely outside the programmable logic the bus interface timing appears to be uniform at every point within the programmable logic.

All of the bus interface signals to the programmable logic passes through a set of registers before being available for use inside the programmable logic. All bus interface signals from the programmable logic pass through another set of registers before being returned to the requesting device. This separation of logic into multiple time domains is called pipelining.

Figure 11:
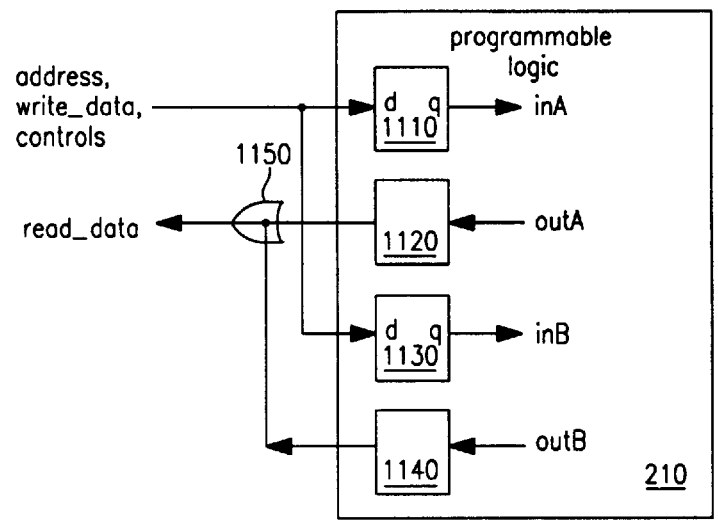
FIG. 11 is a circuit diagram of one embodiment of a bus pipeline registers.

FIG. 11 shows how this may be accomplished. The bus "address", "write_data", and "controls" signal groups are distributed to the programmable logic 210 and then within that section are registered. After the registers 1110, 1130 two sets of these signals are shown as "inA" and "inB". The "read_data" signals generated within the programmable logic are registered by registers 1120, 1140 there, and then returned by the bus. Before the return registers 1120, 1140 they are shown as "outA" and "outB".

2.3. Write Pipe Wait Staging with Bypass

This write pipe wait staging with bypass allows a wait state to be inserted by the slave device on a pipelined bus and makes it appear similar to an un-pipelined interface at the slave level.

There are two alternate examples. In one case the bus is not pipelined and the wait is returned to the master which is responsible for holding the bus signals in their current state. In the second case, usually implemented with pipelined interfaces, the slave is responsible for capturing and holding any signal values it may need to complete the transaction. In the pipelined case, the signaling is usually of the completion of a read transaction rather than a general request to hold the current transaction active.

In this method the bus signals are held in the pipeline registers that provide inputs to the programmable logic. This makes it appear to the slaves as if the master is responsible for holding the bus signals allowing simpler slave implementations since the slave does not need to hold the information itself. Since the bus is pipelined the master may have already sent out the next transaction and can no longer hold the previous state for the slave. An additional staging register holds the next transaction from the master so that the wait signal may be piped before being distributed to the masters thus further easing the timing constraints.

In this method the bus signals are held in the pipeline registers that provide inputs to the programmable logic. An additional staging register is also added between the masters and the slaves to hold the next set of transaction information that the master has already sent out on the same cycle that the wait becomes asserted. The wait signal is staged out of the programmable logic and then combined for use in the pipe staging control so that an entire clock cycle is available.

Figure 12:
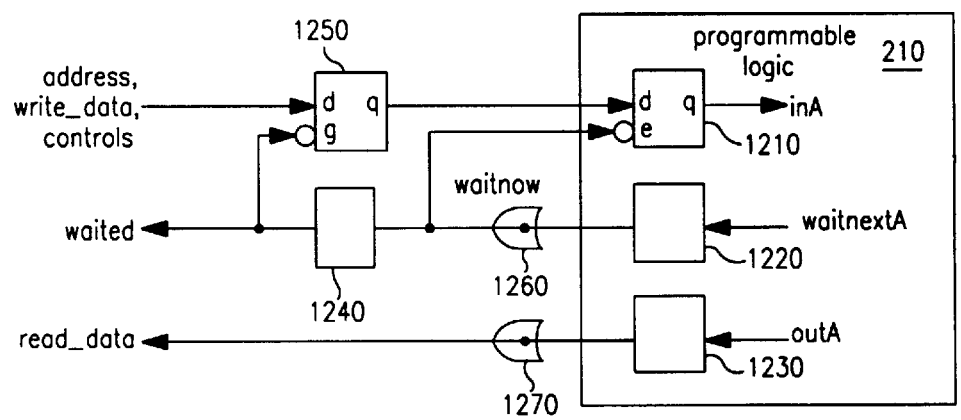
FIG. 12 is a circuit diagram of one embodiment of a bus write pipe wait staging with bypass.

FIG. 12 shows one embodiment of wait staging. The bus "address", "write_data", and "controls" signal groups are sent to the programmable logic 210 via a flow through latch 1250 that may pass those signals on immediately or send the saved copy. The hold versus flow through control is the "waited" signal, which is a registered copy of the "waitnow" signal. The signals flow through whenever the bus has not been waited. After this holding register versus bypass selection the signals are distributed to the programmable logic 210 and then within that section are registered by a register with an enable 1210. The enable for those registers is controlled by the "waitnow" signal. After the registers 1210 one set of these signal is shown as "inA". The "read_data" signals generated within the programmable logic are registered there and then returned by the bus. Before the return registers 1230 they are shown as "outA". The "waitnow" signal cannot be driven directly by the programmable logic and still meet the timing requirements, so the programmable logic is only allowed to make an advance request for a wait on a signal called "waitnextA" that is then registered an driven to the rest of the system. The initial cycle assertion of "waitnow" for a slave is generated by logic connected just ahead of the staging registers that feed "inA" since the programmable logic does not yet have information from which to do this.

2.4. Contention Free Bus

This method allows several sources to provide data to a common bus.

There are five alternate examples. In one case the data bus is a shared signal line that is actively driven either high or low by one source while not being driven by any other source. If inadvertently two sources drive opposite values at the same time, high current contention conditions may result. In another case multiplexors are used to gate each source into the data bus in two stages. Here the data bus passes through every multiplexor stage or an OR of the controls for the multiplexors in a subsection are used to multiplex it into a higher stage. In the third case, multiplexors are also used; however, they are all in a continuous ring such that prior to every multiplex block the same data can be picked up. The delay to any point is long but it does share the signals for write and read data. In the fourth case a wire OR bus is used for a back-plane data bus. In the fifth case in fully integrated designs ORs are used to combine data sources.

In this method a dedicated OR internal system data read bus is distributed throughout programmable logic. This provides a data read path for an internal system bus. It eliminates possible contention conditions of the shared signal bus. It also eliminates the composite controls of a two stage multiplexed bus. It improves the delay over a continuous ring. It is faster that a wire OR. As part of programmable logic it provides a higher performance system data bus than can be implemented with purely programmable logic yet does not require a new dedicated integrated design for each design application as with non-programmable logic.

A dedicated OR internal system data read bus is implemented and distributed throughout some programmable logic linking it together as a bussed system. The OR structure is partitioned into a tree structure to minimize the total delay from any point. Each segment of the read data bus sources logical zeros when no data is being read within that segment. The write data is not looped back through the read data bus. At the lowest level individual read data sources are gated via a logical AND of the source data with the source enable into the OR bus. Multiplexors selecting the source data by the source enable rather than the previous stage where the previous stage is zero at the beginning of a segment may be used near the leaf nodes of the read data bus tree.

Figure 13:
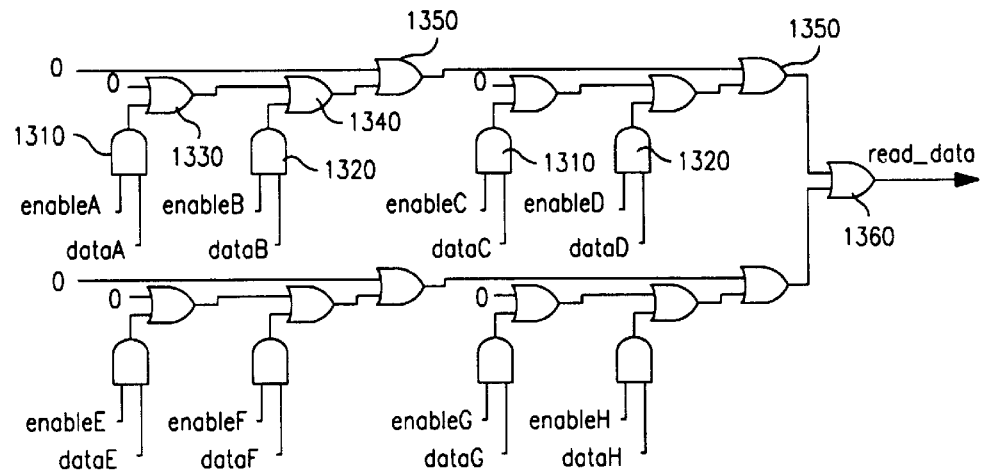
FIG. 13 is a circuit diagram of one embodiment of a dascade and tree OR bus.

FIG. 13 shows one embodiment of the cascade and tree OR bus. The "dataA" through "dataH" signals provide the source data at several points within the programmable logic. The "enableA" through "enableH" signals provide the enables for the source data. Each pair is combined via a logical AND 1310 then fed into the logical OR tree 1330, 1340, 1350. The logical OR tree 1330, 1340, 1350 shown here has two stages at the lowest level 1330, 1340 which then each lead to a two stage branch 1350 which then are combined into a trunk at signal "read_data". There may be more or fewer stages and more or fewer levels in each stage embedded within the programmable logic.

2.5. Split DMA and Simultaneous Grant

This method allows Direct Memory Access transfers to be done in a high performance manner.

There are two alternate examples. In one case the read and write portions of a DMA transfer exist at the same time on the bus. In this case the duration of the read is longer than the write to provide setup and hold time with the read data propagating to the write resulting in slower overall cycles. In the second case a block of data is read into a buffer at the DMA controller and then written from that buffer requiring two transfer-cycles per item transferred.

In this method by separating each DMA channel into two masters that may receive simultaneous grants to access the bus the average data transfer rate from source to destination approaches one item transferred per clock cycle and a higher performance clock cycle is allowed.

A DMA transfer involves a read of data and then a write of that data. One of these, either the read or write, also requires an address and a read or write control while the other requires a DMA acknowledge control. The target of a particular DMA acknowledge will have already been set up to cause data transfer in the appropriate data direction.

In order to improve the performance of the data busses, the read data is separated from the write data, which means that the read data does not have to propagate back to all points on the write data bus in one cycle. This allows the cycle time to be reduced to near the time it takes to propagate data signals in one direction through the system rather than two directions.

With the data read bus split from the data write bus, the two parts of a DMA transfer use independent yet complementary bus signals. Therefore, they may be performed independently in a fully overlapped manner. The corresponding read and write transactions cannot be performed simultaneously since the data to be written is not available until after it is read. Since DMA is only used for larger blocks of data, data that is read may be saved in a buffer and then written simultaneously with another subsequent read.

For one embodiment, each DMA channel is implemented as two cooperating master devices. One of these will perform a series of reads, placing the data in a FIFO (First In First Out) buffer. The other will perform a series of writes taking the data from that same buffer. The master doing the writes, will only do so when there is data in the buffer. The master doing the reads, will only do so when there is space in the buffer to place the data and it has been requested to make the transfers. The buffer will have space for several transactions so that the read process can continue while the write process gets started. In order to access the bus each master arbitrates for bus resources.

The internal system bus is divided into three sets of signals that may be arbitrated for. The read and write data busses are separate but may be used simultaneously for different transactions therefore each of these may be arbitrated for simultaneously. The address and read write control signals may also be arbitrated for, usually along with one of the data busses. Each master that needs access to the bus will send a request to an arbiter for the resources it requires. The arbiter will grant resources to one of the requesters, and if another request may be served simultaneously, it will also grant resources for a second simultaneous transaction. This will result in an increase in the average amount of data transferred per cycle, regardless of the arbitration priority scheme implemented.

Figure 14:
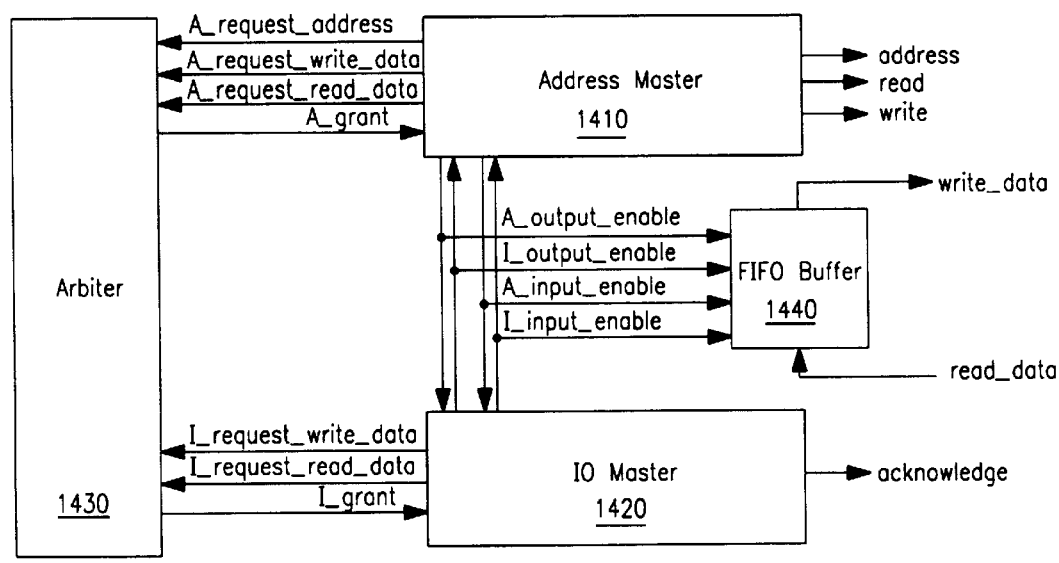
FIG. 14 is a block diagram of one embodiment of a split DMA with simultaneous grant.

FIG. 14 shows one embodiment of a DMA channel. The two masters 1410, 1420 associated with the channel are shown as separate blocks labeled "Address Master" 1410 and "IO Master" 1420. They interact with an arbiter block 1430 and with a FIFO buffer 1440. The address master's 1410 interface to the bus consists of the signals labeled "address", "read", and "write" which together indicate the location to be referenced and which data bus is being used. The IO master's 1420 interface to the bus indicating that a data only transfer is taking place is the signal labeled "acknowledge". The buffer 1440 handles the data interfaces to the bus labeled "read_data" and "write_data". Each of the masters 1410, 1420 may cause data to be written into the buffer 1440, or to be read out. The signals from the masters 1410, 1420 to each other and to the FIFO buffer to control when data is read and written are labeled "I_output_enable" and "I_input_enable" from the IO master 1420, and "A_output_enable" and "A_input_enable" from the Address master 1410. The signals to the arbiter 1430 from the IO master 1420 to indicate which data bus is needed are labeled "I_request_write_data" and "I_request_read_data". The signal from the arbiter 1430 to the IO master 1420 indicating that is has use of the bus resources as requested is labeled "I_grant". The signals to the arbiter 1430 from the address master 1410 indicating the bus resources needed are labeled "A_request_address", "A_request_write_data", and "A_request_read_data". The signal from the arbiter 1430 to the address master 1410 indicating that it has use of the bus as requested is labeled "A_grant". For one embodiment, there are additional internal control signals which determine which of the masters 1410, 1420 will execute the read and when, and other typical DMA transfer characteristics.

2.6. DMA Channeling

This method allows many programmable decoders to be individually used to direct DMA requests and acknowledges within a programmable logic structure.

There are two alternate examples. In one case for there is a dedicated DMA channel and dedicated bus request and acknowledge lines for each device. In the second case the channels and request and acknowledge signals associated with a particular DMA device may be statically configured, however, several devices may share one channel each with its own dynamic enable.

In this method a DMA device may be dynamically configured to use any or none of the available channels so that the channels may be shared over time. It also allows reuse of signal paths into the programmable logic and reuse of the decoders providing flexible addressing of the control bits.

The internal system bus includes signals for DMA channels. One of these DMA channels may be selected at each DMA channel interface. These DMA channel interfaces are distributed throughout an array of programmable logic. At each interface block, control bits select which channel may be enabled and whether it is enabled. When a channel is enabled, requests are passed out from the programmable logic to the selected channel and acknowledges from the selected channel are passed into the programmable logic. The internal system bus interface also includes address and command decoders distributed throughout the programmable logic array in the same manner as the DMA channel interfaces so that some of their logic may be shared. The same signal path into the programmable logic may be used either for the decoded read and write signal from the decoders or as the DMA acknowledge signal. When the interface signal is used for DMA the address and command decode is reused to access the corresponding DMA channel selection and enable control bits. This allows the reference address for these two control bits to be placed anywhere within the system address space. Whether the interface element is to be used for DMA or for addressed references into the programmable logic is determined by another configuration bit that is statically configured in a fixed address space.

Figure 15:
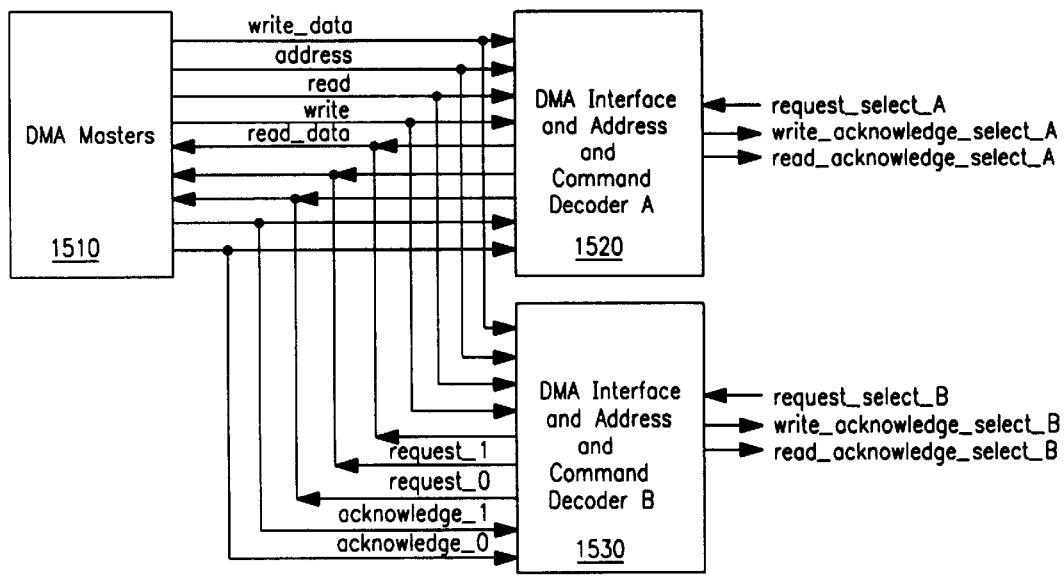
FIG. 15 is a block diagram of one embodiment of a DMA selectors.

FIG. 15 shows general signal flow. The bus is shown between a block labeled "DMA Masters" 1510 and the blocks labeled "DMA Interface and Address and Command Decoder A" 1520 and "DMA Interface and Address and Command Decoder B" 1530. The signals on the bus include "write_data" and "read_data" that are used by both addressed transactions and DMA acknowledge transactions. The other bus signals for an addressed transaction are "address", "read", and "write". The other bus signals for the two different DMA transactions are "acknowledge_0" and "acknowledge_1". The bus signals to request DMA transactions are "request_0" and "request_1". On the other side of the DMA Interface blocks 1520. 1530, the signals interfacing from the first block into the programmable logic are shown as "request_select_A" and the dual function signals "write_acknowledge_select_A" and "read_acknowledge_select_A". From the programmable logic to and from the second block the signals are labeled "request_select_B", "read_acknowledge_select_B" and "write_acknowledge_select_B".

Figure 16:
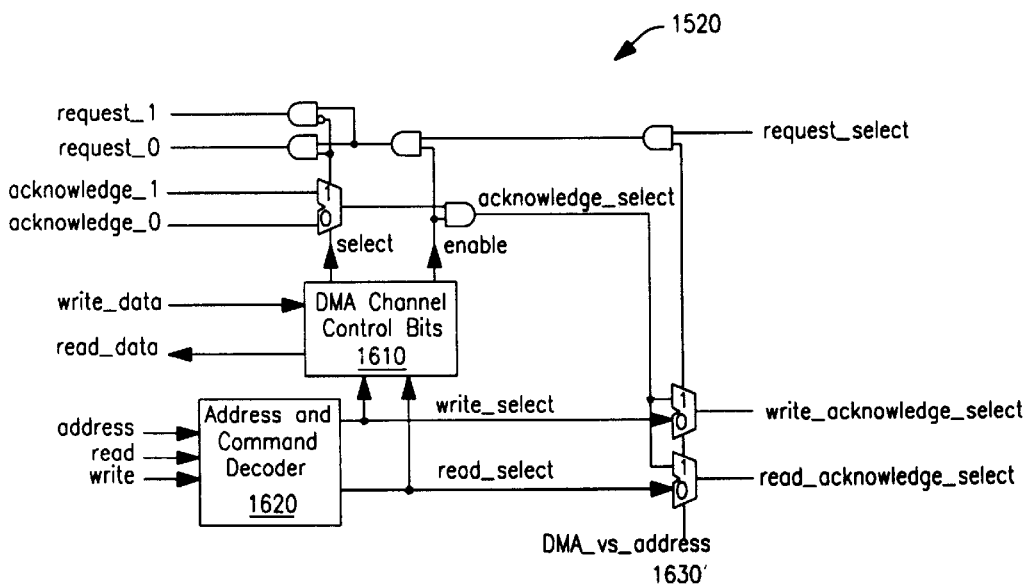
FIG. 16 is a block diagram of one embodiment of a selector channeling.

FIG. 16 shows the logic within a DMA interface and address and command decoder block 1520 that is used to choose which channel is used. The signals labeled "select" and "enable" are from the channel control bits internal to that block. The signal labeled "DMA_vs_address" 1630 is a static configuration signal for each of these blocks that selects whether the function at the interface into the programmable logic is for DMA or for a decoded address. The internal signals that are selected between are shown as "acknowledge_select", "write_select" and "read_select". The signal interfacing from the programmable logic is shown as "request_select" and the signals to the programmable logic as "write_acknowledge_select" and "read_acknowledge_select". The signals interfacing to the bus are named the same as in FIG. 15.

2.7. External Memory Access

This method allows several programmable address and command decoders and a memory interface slave to cooperate in accessing space defined by the programmable decoders.

There are two alternate examples. In one case the external memory interface has dedicated decoders for any space it is used to access and dedicated decode outputs for each decoder. In the second case, each memory interface has another set of address, data and control signals.

This method reduces the number of additional external interface signals required to interface to additional external memory devices. The address, data, and read and write control signals of a single memory control interface slave may be used in conjunction with decoders distributed throughout some associated programmable logic. This also allows the added decode-signal to be routed to any of the programmable logic pins.

The system includes an internal system bus and a memory interface unit that may respond to that bus. The memory interface has signals to communicate with, and control an external memory device. The system also includes a section of programmable logic and programmable address and command decoders distributed throughout that logic. The bus and programmable decoders are extended to include an additional bus signal from any of the decoders that communicates to the memory interface unit. When this signal is asserted it causes the memory interface unit to perform an external memory transaction similar to one it would decode itself with the exception that it will not assert the standard chip enable signal. The external address, data, read and write signals of the memory interface unit are driven with the transaction information from the internal system bus. The chip enable for the decoder that requested the transaction may be connected through the programmable logic within which it resides via any available external interface pin to the selected memory device. A control register bit for each command decoder is used to determine if it will request that the memory interface unit perform the transaction. The programmable logic retains control of the overall timing of the transaction via the wait signal on the internal system bus. It may also take direct control of any signal of the external device by using the programmable logic to provide its own signal. The memory interface unit may also be busy using its external pins to complete a previous write transaction when a decoder determines it needs to make a request. In this case the memory interface unit signals the decoders with another added bus signal that it is busy. This signal is not asserted during the last clock cycle of this piped write cycle, signaling the decoders that their transaction may start during the next clock cycle.

Figure 17:
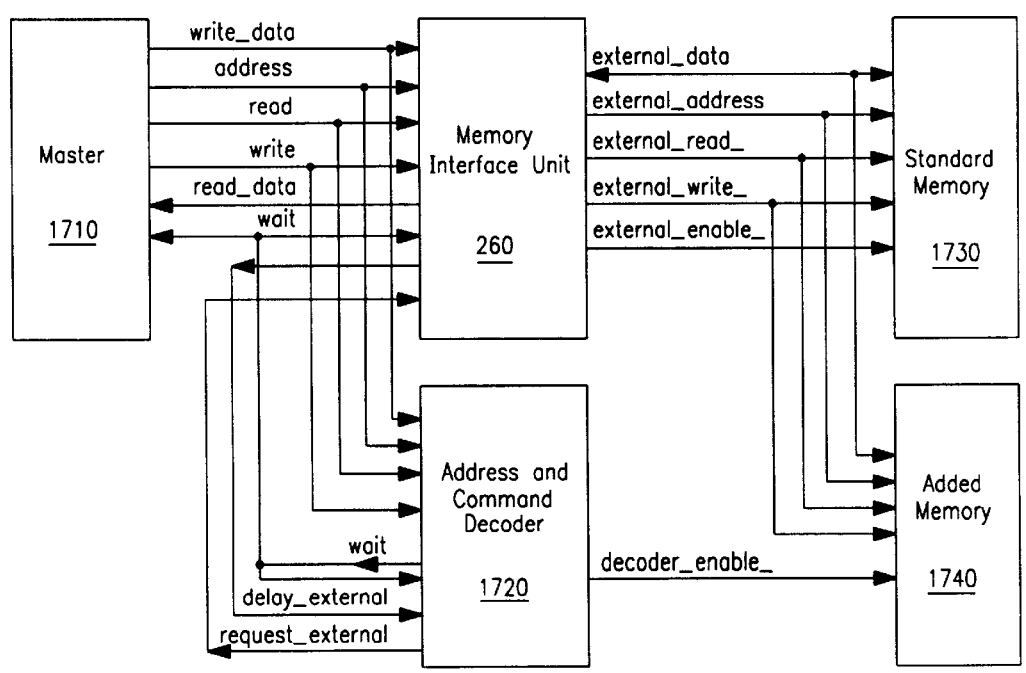
FIG. 17 is a block diagram of one embodiment of a external memory extensions.

FIG. 17 shows the signal flow involved. A bus master 1710 drives the internal system bus signals "address", "write_data", "read", and "write" and receives the "read_data" signals. The decoders 1720 and the memory interface unit 260 receive the internal system bus signals. Decoders 1720 send the "request_external" signal across the bus to the memory interface unit 260. The external memory interface will then forward internal system bus signals to its corresponding external signal pins. These signals are named "external_address", "external_data", and the negative asserted "external_read_", and "external_write_". The memory interface unit 260 also has a chip enable output signal, labeled "external_enable_" that is not asserted during transactions initiated via the "request_external" signal. The memory interface unit 260 will provide data that is read back on the internal system bus signals labeled "read_data". The decoder 1720 may also assert the "wait" bus signal to extend the transaction duration to at least two clock cycles, after which the programmable logic section may be used to further extend the transaction. All operations on the bus are held from completion while "wait" remains asserted.

The "delay_external" signal to the decoders is asserted when the memory interface unit cannot immediately respond to the decoder's request. The decoder also generates the signal that is routed via programmable logic to any available pin, labeled "decoder_enable_". Two external memories 1730, 1740 are shown. The one labeled, "Added Memory" 1740 is accessed by this programmable decoder extension. The one labeled, "Standard Memory" 1730 is accessed via a decoder dedicated to the memory interface unit. Additional memories may be added as needed.

3. Configurable System Logic Matrix

In the following sections, the CSL matrix is described from two complementary points of view, namely the block level view and the signal-flow view.

3.1. Internal Structures
3.1.1. Overview

When integrating programmable logic with a CPU or other on-chip system-level components, it is necessary to provide mechanisms for connecting system-level resources to the CSL. System-level resources may include but are not limited to system data, address, and control signals, pipelining registers, buffering, and miscellaneous logic for interacting with system-level components such as the CPU.

It is difficult to achieve satisfactory system-level integration of a homogeneous CSL simply by connecting system-level signals to the edge of the CSL. This approach, while simple, fails in a number of respects for homogeneous CSLs. For example, it fails to prevent undesirable signal skew of system-level signals in different parts of the CSL.

To achieve satisfactory system-level integration of a homogeneous CSL, it is necessary for some of the system-level circuitry to co-reside with the programmable resources in the interior of the CSL. Different arrangements of system-level circuitry and programmable resources exhibit different combinations of benefits and costs.

This method establishes a hierarchical distribution of system-level circuitry with the programmable resources in a homogeneous CSL, in such a way as to gain the benefits of hierarchical organization while retaining the benefits of a homogeneous array.

A homogeneous CSL consists of a more or less regular array of similar units of programmable logic resources. These units are called tiles, because they correspond to design units of physical layout, which are then tiled to form an array.

In a homogeneous CSL, the tiling is almost completely regular. Slight variations may exist from tile to tile to achieve different interconnect recombination. More substantial variations occur at the edges of the array, typically to optimize the connections of the CSL to bonding pads at the perimeter of the chip.

In addition, homogeneous arrays may have one or more columns or rows of special tiles in interior of the array dedicated to distribution of power, ground, or clock signals. The presence and organization of these special tiles is irrelevant to the functional and topological organization of the programmable resources in the CSL.

This method organizes the tiles of the CSL into a semi-homogeneous array. The array is divided into multiple sub-arrays, called banks, where each bank is divided from the other banks in the CSL by a row or column of special breaker tiles. The division between banks is not absolute. The breaker tiles are designed such that the fabric of programmable interconnect is topologically continuous from each bank to its neighbor. For one embodiment, interconnect long lines, which span the entire width or height of a bank do not cross the breaker tiles. Instead, each long line is confined to a single bank.

The breaker tiles contain programmable connections between long lines in adjacent banks. Long lines in adjacent banks are electrically connected through a programmable connection in the breaker tiles. Together with the unbroken fabric of other programmable interconnects across bank boundaries, the breaker tiles allow the same degree of homogeneity as existing programmable logic architectures. The breaker tiles also contain system-level circuitry such as system data, address, and control signals, pipelining registers, buffering, and miscellaneous logic for integrating the CSL with system-level components such as the CPU. The breaker tile contains programmable connections between this system-level circuitry and the programmable interconnect in adjacent banks. The breaker tiles are joined together to act as a hierarchical network for distribution and collection of system-level signals such as address and data. The breaker tiles may also contain structures for distributing power, ground, and clock signals to the CSL.

Pipeline registers at each bank boundary exist for common timing for different sized die to simplify system level timing.

This method retains the benefits of a homogeneous organization, and allows the application of well understood placement and routing algorithms.

This structure brings system-level circuitry in close topological proximity to programmable logic throughout the CSL. The maximum physical distance between pipelining registers and any given programmable resource is limited by the size of the bank. By choosing an appropriate bank size, different cost/performance tradeoffs are possible. This structure increases the predictability of the timing of system-level signal paths in the CSL, which simplifies software algorithms and typically increases the overall system performance for designs implemented in the CSL. This structure scales very well with different array sizes. The average distance between system-level circuitry and programmable resources stays constant as array size grows. This method enables the programmable separation of the banks into relatively isolated resource pools that can be operated on independently by placement, routing, and other algorithms. This divides what is typically a large and difficult problem into several smaller and simpler problems. As a result, algorithm run times are significantly reduced.

This method reduces the burden that the tiles in the bank bear for supporting integration of system-level signals. By concentrating the system-level connections in the breaker tiles, the other tiles in the bank are relieved of the need to support high-performance integration with circuitry that is physically or topologically remote. This simplifies the design of the other tiles.

3.1.2. Two-dimensional Bank Organization

Figure 18:
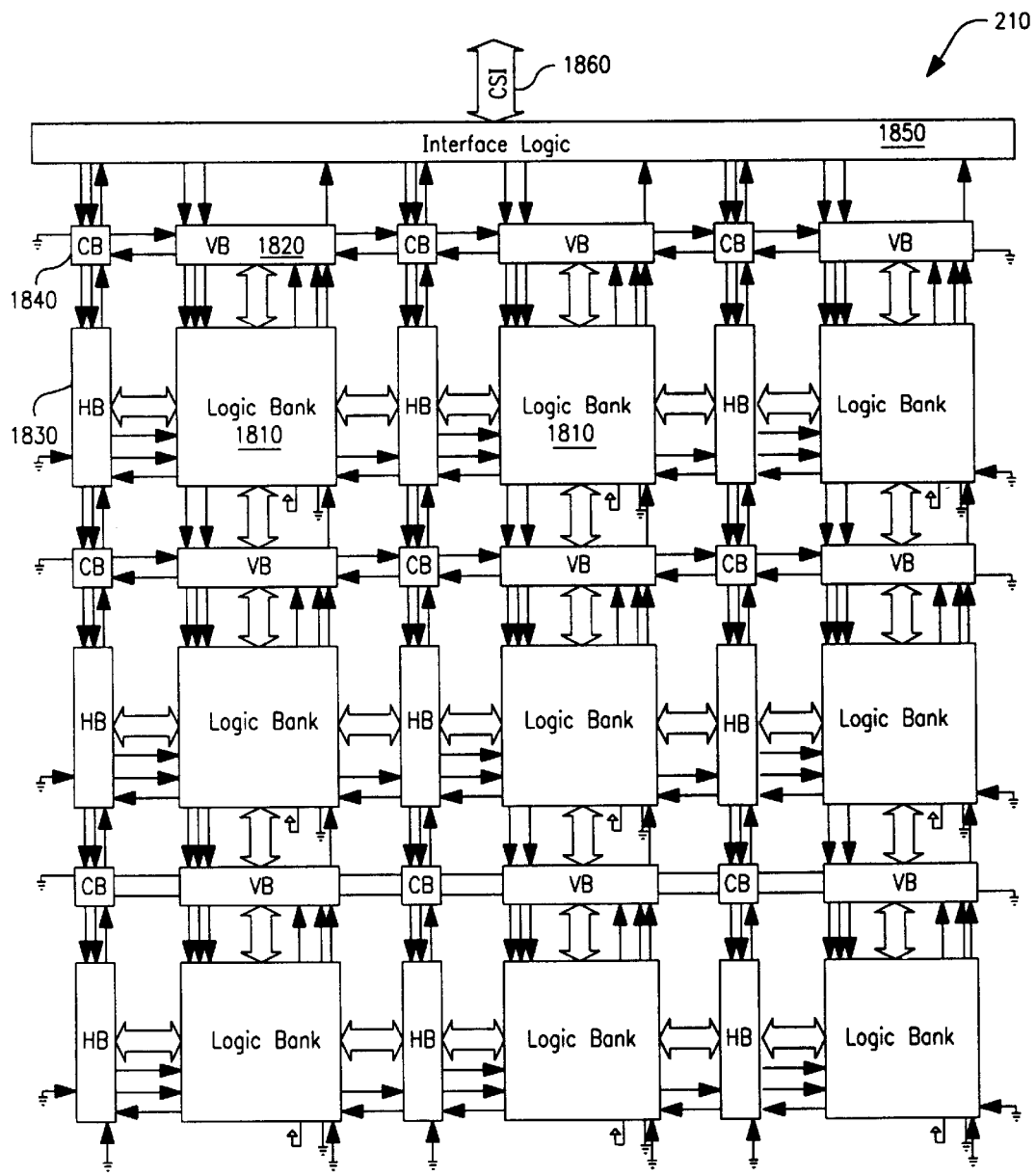
FIG. 18 is a circuit diagram of one embodiment of a CSL matrix.

FIG. 18 shows a block diagram of a 3×3 CSL matrix 210. A CSL matrix 210 can be built with any number of rows and any number of columns of logic banks. A logic bank 1810 contains user programmable logic and the necessary logic to distribute the CSI system level signals. Some forms of general interconnect, including long lines that span a logic bank, exist to connect the programmable logic resources within and among the logic banks.

For concrete illustration, we assume the existence of general programmable interconnect such as horizontal and vertical long and short lines across the CSL.

There is a horizontal breaker 1830 on the left edge of each logic bank 1810, a vertical breaker 1820 on top, and a corner breaker 1840 in the upper left corner of each logic bank 1810. On the top of the 2-D array of logic banks 1810 there is the interface logic 1850.

On one side of the interface logic circuit 1850 is the CSI bus interface 1860. The interface logic 1850 contains circuitry to handle the distribution and collection of system signals, including CSI bus signals and side-band signals. (See section 2.1.1).

The address bus is distributed such that there is a copy going down every column of horizontal breakers 1830, which for one embodiment distributes the address signals to the logic bank 1810 on the right.

A copy of the write data bus goes down every column through the vertical breakers 1820 and the logic banks 1810. For one embodiment, a registered version of the bus is generated in every vertical breaker 1820 and passed to the logic bank 1810 below.

For one embodiment, a version of the read data bus runs upward from bottom to top of every column of logic banks 1810. It is registered and combined with the incoming read data bus signals from the logic bank 1810 below. All columns of data read bus are then combined at the interface logic 1850.

For one embodiment, the address bus, write data bus, and read data bus are 32-bit busses. In order to facilitate the placement of user configuration logic, for one embodiment there is a 32-bit wide auxiliary read data bus running through each row of logic banks 1810 and its corresponding horizontal breakers 1830. This bus can be used as an extension to the data read bus or even be used as separate user data bus that is not any part of the system bus.

Eight address decoder outputs feed from a logic bank 1810 to the vertical breaker 1820 above, as an address selector is distributed in both parts. The selector outputs are then distributed to the logic bank below via the general interconnect.

A set of global signals is distributed similarly to the data write bus.

A copy of a set of control write signals goes down every column of horizontal breakers 1830 through the corner breaker 1840. A buffered version turns the corner into the vertical breaker 1820 and is distributed to the logic bank 1810 below through the general interconnect.

A set of control read signals is collected from a logic bank 1810 via the general interconnect, processed in the vertical breaker 1820 above and turns corner in the left corner breaker 1840, combining with the control signals from below before going up. Control signals from every column of corner breakers 1840 are then combined in the interface logic.

In order to make the CSL scalable and meet timing requirements, there is a 2-D wait resolution mesh mechanism to handle the system wait signal.

Although specific orientations are described above with respect to the routing of busses and signals, it is to be understood that alternative routing may be implemented and is within the scope of this description.

Figure 19:
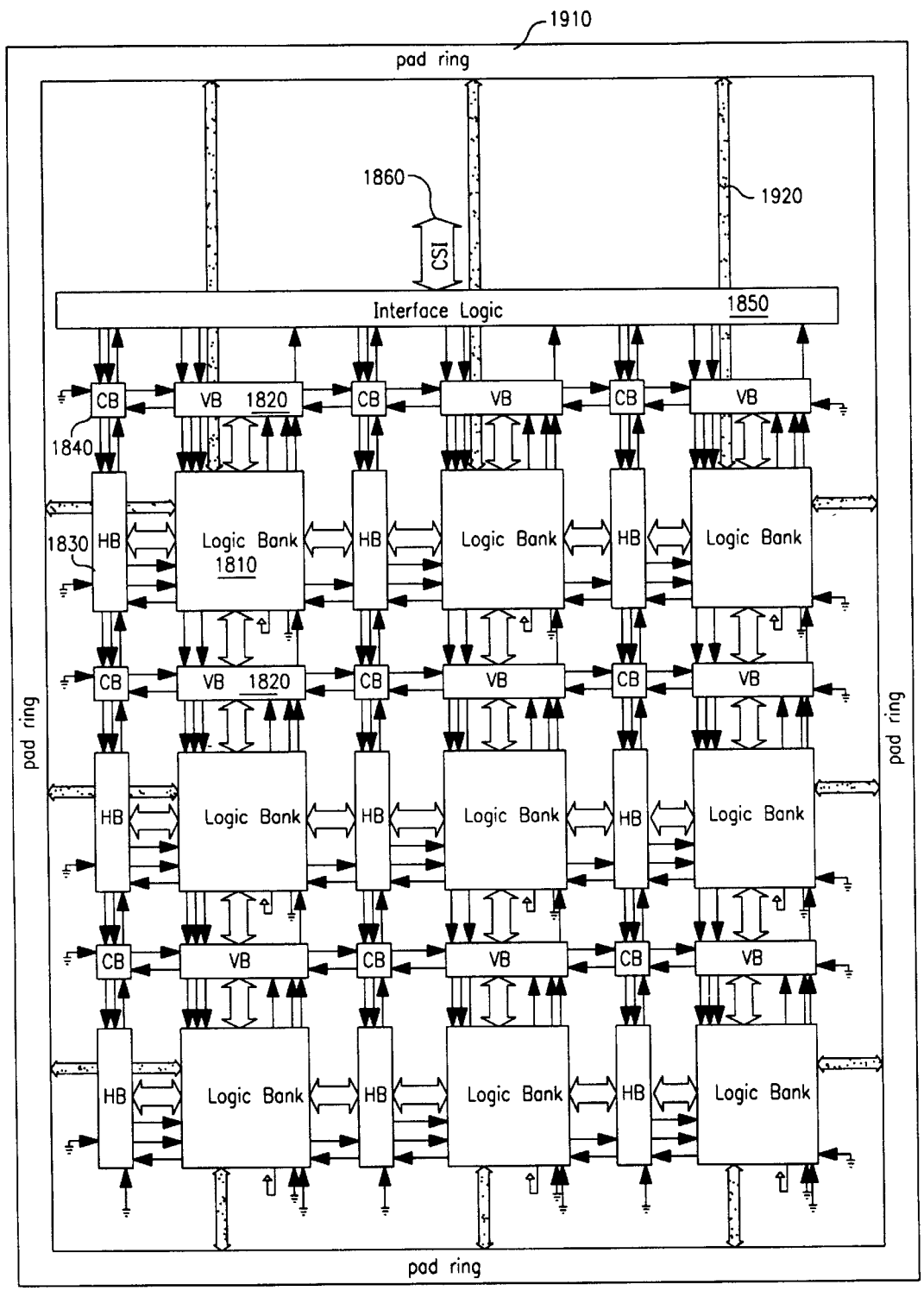
FIG. 19 is a circuit diagram of one embodiment of a CSL matrix and PIO.
Figure 20:
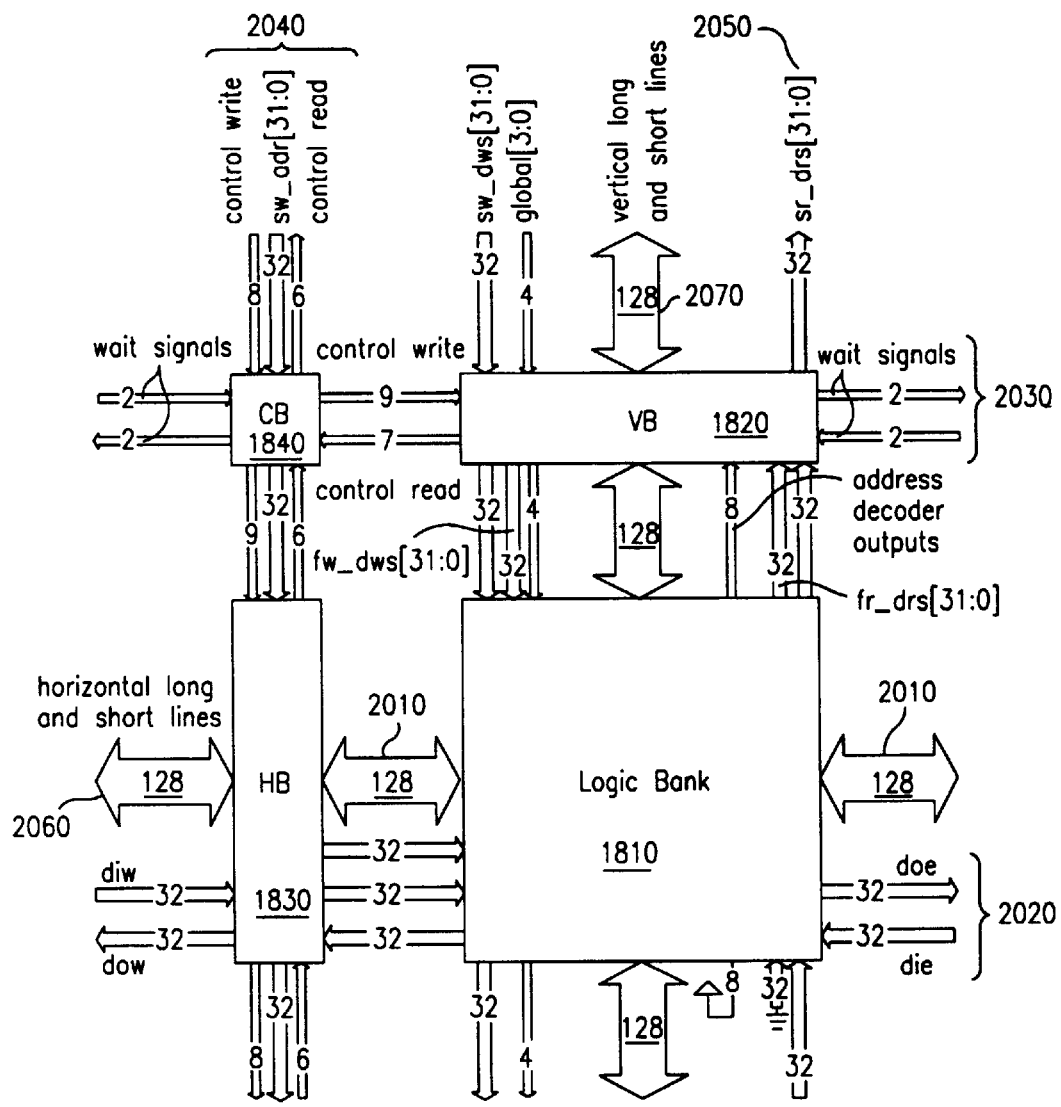
FIG. 20 is a circuit diagram of one embodiment of a Relationship among logic bank and breakers.

On the CPSU chip, as in most other chips, there is a ring of I/O pads 1910 on the perimeter. For one embodiment, a programmable I/O (PIO) pad 1910 has 3 wires connected to the internal core logic, namely the data input, data output, and output enable. FIG. 19 shows one embodiment of how the pad ring 1910 is connected to the logic bank 1810 at the edges of the array. For details, see FIG. 27.

Figure 21:
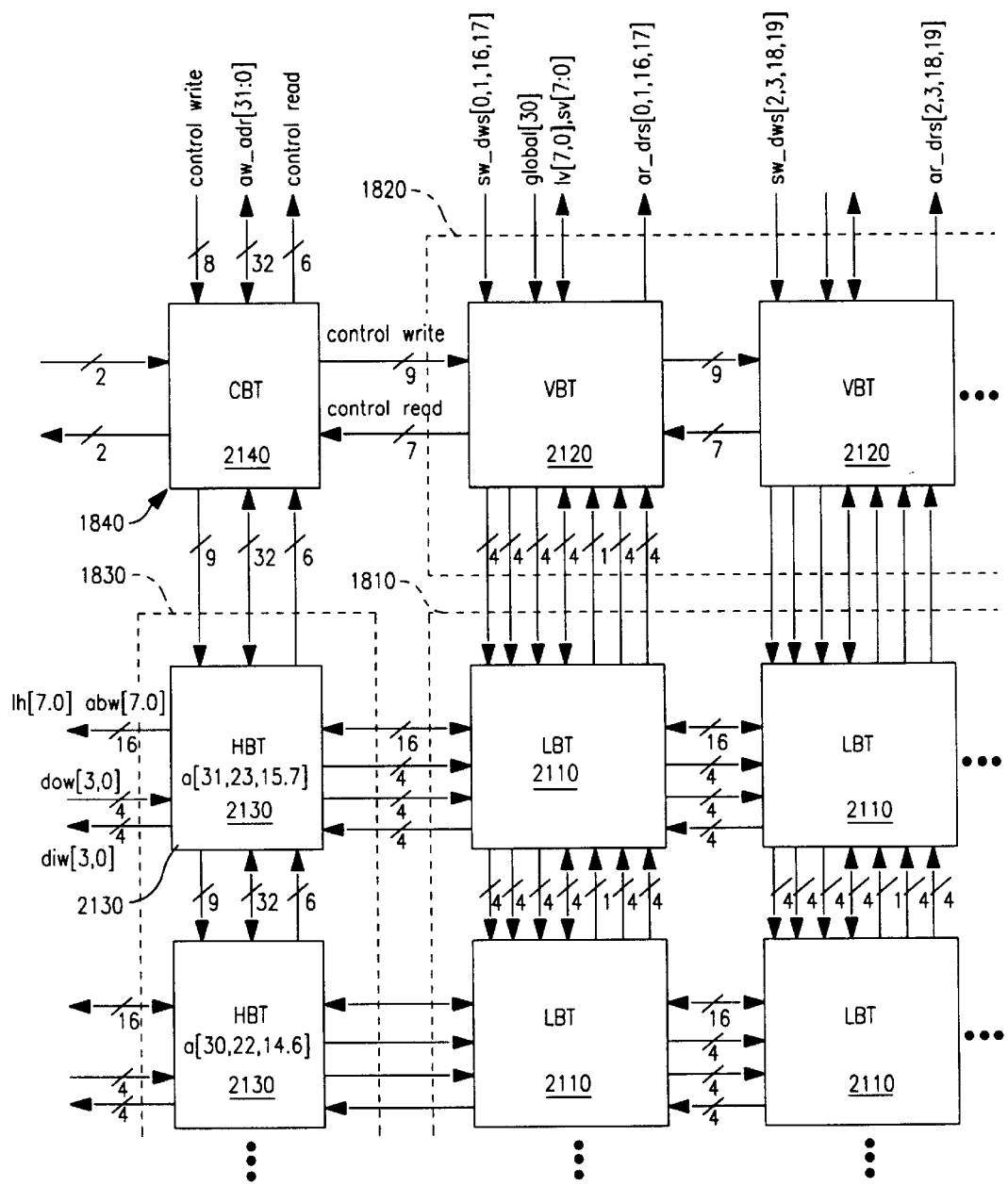
FIG. 21 is a circuit diagram of one embodiment of a tile view of logic bank and breakers.

FIG. 21 shows more details of the logic bank 1810, vertical breaker 1820, and horizontal breaker 1830. In one embodiment, a logic bank 1810 consists of a 8×8 (row× column) array of logic block tiles 2110, a horizontal breaker 1830 consists of a 8×1 array of horizontal breaker tiles 2130, and a vertical breaker 1820 consists of a 1×8 array of vertical breaker tiles 2120, while a corner breaker 1840 consists of only one corner breaker tile 2140. To accommodate I/O pad connections, a logic bank 1810 on the south (north) edge can have an extra row of I/O block tiles on the south (north). Similarly, a logic bank on the east (west) edge can have an extra column of I/O block tiles on the east (west). A logic bank on the corner thus has both an extra row and an extra column of I/O block tiles. Additional horizontal breaker tiles 2130 and vertical breaker tiles 2120 are optional, depending on the tradeoff of extra interconnect flexibility and die size. Note that such I/O block tiles 2120, 2130 behave very much like logic block tiles 2110, and thus inherit all the connectivity properties designed for the general programmable interconnect.

As there are 8 rows of tiles 2110, there are 4 bits of the address bus per row such that all 32 address bits are accessible inside each logic bank 1810. One embodiment interleaves the address bits such that bundle of index k contains a[k, k+8, k+16, k+24]. For another embodiment, bundle k contains address bits a[8*k, 8*k+1, 8*k+2, 8*k+3].

3.1.3. Logic Block Tile

Figure 22D:
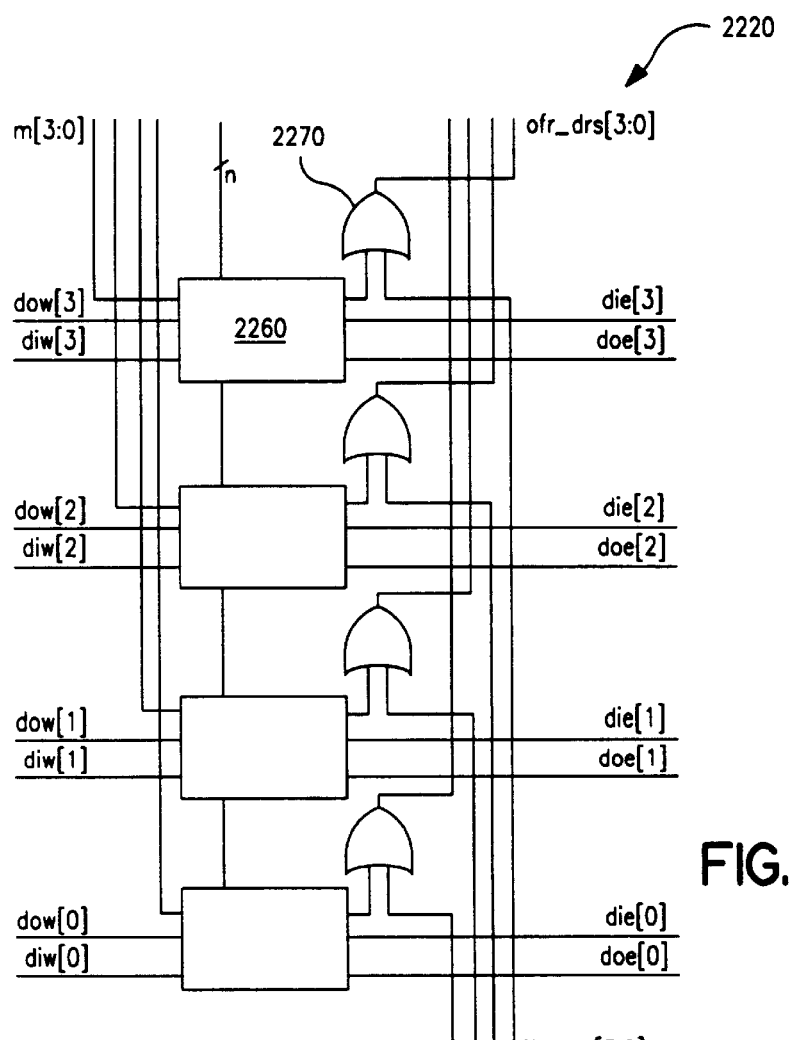
FIG. 22 is a circuit diagram of one embodiment of a logic block tile.
Figure 22E:
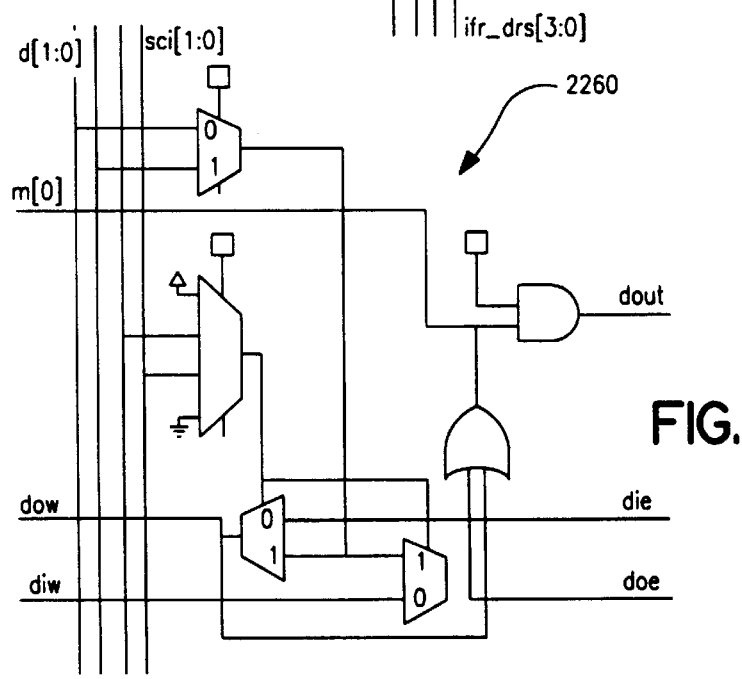
Figure 23A:
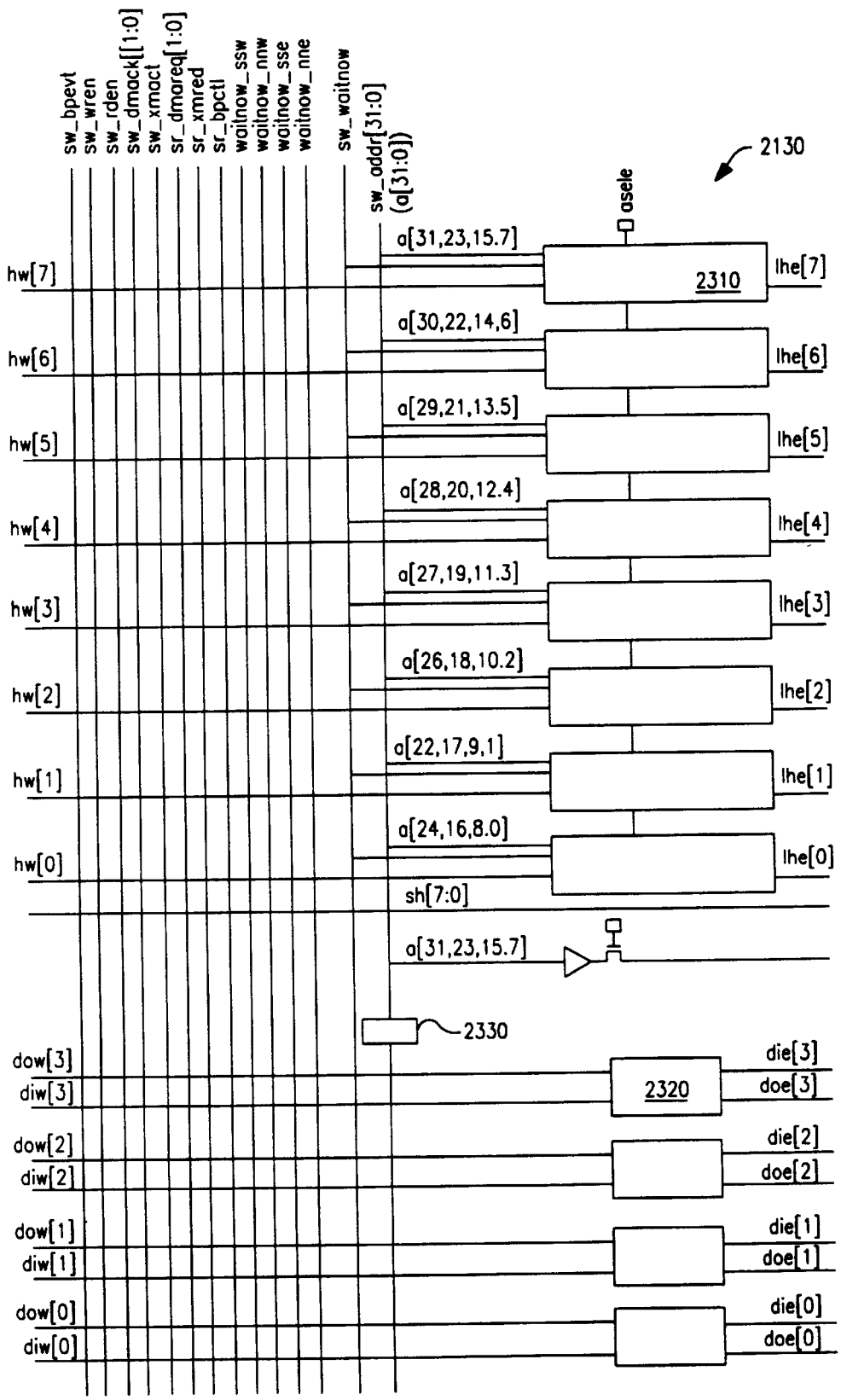
FIG. 23 is a circuit diagram of one embodiment of a horizontal breaker tile.
Figure 23B:
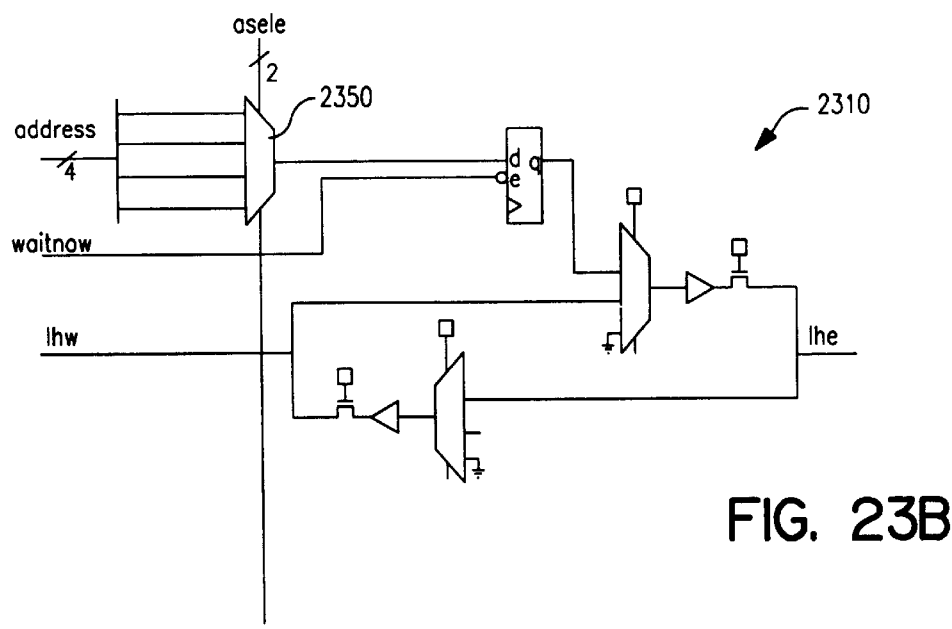
Figure 23C:
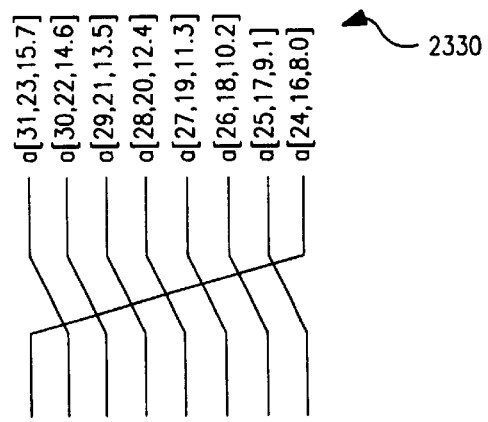
Figure 23D:
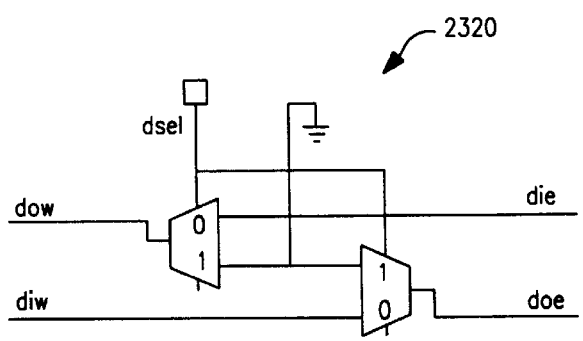

As shown in FIG. 22, a logic block tile 2110 consists of 3 blocks: address decoder 2230, data path 2220, and a programmable logic and interconnect block 2210.

The address decoder 2230 is part of a address decoder chain spanning a column of 8 address decoders within a logic bank 1810. In combination, the address decoder chain can decode any 32-bit address value and generate a match signal. An address decoder 2230 compares each of the 4 address bits in parallel and then combines the 4-bit result with the incoming matchin signal through a 5-input AND gate 2250, generating the matchout as output. The per-bit comparison is performed by a match/ignore circuitry with as few as 10 transistors as shown. Two configuration bits determine whether the output is always true (match0N=0, match1N=0), always false (match0N=1, match1N=1), true if the address bit "a" is 1 (match0N=1, match1N=0), or true if address is 0 (match0N=0, match1N=1). Hence, an address decoder chain can be configured to match any 32-bit address value, where each bit value is either a ONE, ZERO or DON'T CARE.

The data path 2220 contains an array of four data path elements 2260, with each element handling one bit of the data read bus. For example, data path element index 0 2260 receives its input from horizontal path signals die[0], diw[0], and generates output to horizontal path signals doe[0], dow[0]. Moreover, it generates output dout[0] to feed a OR gate 2270, which combines this signal with the incoming ifr_drs[0] signal to generate the outgoing ofr_drs[0] signal. For one embodiment, the OR gate 2270 is part of a chain that spans the entire column of a logic bank. In parallel is a four-bit data read bus sr_drs[3:0] that feeds through the entire logic bank and is combined with the registered version of ofr_drs[3:0] in the vertical breaker tile (see Section 3.1.5).

Each data path element 2260 can be configured to either inject a data value into both eastward and westward data injection muxes to drive signals doe and dow, or allow signal die to drive dow and signal diw to drive doe as if the injection muxes were a feed-through. The output signals of doe and dow are OR'ed together to generate an output signal "m". Signals m[3:0] feed the block of programmable logic and interconnect. These signals may then be transformed and/or transmitted in any fashion allowed by the specific implementation of the user configurable logic and interconnect.

The "m" signal is also AND'ed with a configuration element bit to enable its value to appear on the output dout. As the data read bus is an OR bus, this enable bit effectively blocks the "m" signal from affecting the data read bus value. As one of many possible implementations, the injected data value is selected from one of two possible sources d[1:0] feeding a 2-to-1 mux, and the common injection mux select signal is controlled by the output of a 4-to-1 mux with four signals including VCC, GND and two signals sel[1:0]. The data sources d[1:0] and select sources sel[1:0] are common to all 4 data path elements. They are output signals from the block of programmable logic and interconnect.

In FIG. 22, the block of programmable logic and interconnect 2210 is shown to connect to 2 sets of long lines lh[7:0] and lv[7:0] extending in four different directions, and 4 sets of short lines shwt[7:0], she[7:0], svn[7:0], svs[7:0] in all four different directions. The block 2210 also takes 4 bits of pipelined write data bus and 4 bits of "m" signals as inputs, while generating 4 (n=4) signals feeding the data path. A long line is a wire that spans the entire row or column of a logic bank 1810. There may be multiple points inside the logic/interconnect block 2210 at which a long line may be driven. A short line is a wire that connects a logic/interconnect block to an adjacent block on its east, west, south or north side. To those who are skilled in the art, it should be clear that there are many other possible variations of the logic/interconnect block that are compatible with the system bus distribution scheme described here.

3.1.4. Horizontal Breaker Tile

As shown in FIG. 23, a horizontal breaker tile 2130 consists of circuits related to the address, data and control buses. There is an array of 8 horizontal connectors 2310, a 4-bit address driver 2350, an address braider 2330, an array of 4 horizontal data path elements 2320, and feed-through paths 2340 for control signals.

It is convenient to group the 32-bit address signals (sw_adr[31:0] or a[31:0] for short) into 8 interleaved bundles. For one embodiment, the bundling is such that a0, a8, a16, a24 (a[0,8,16,24]) are in bundle 0, a[1,9,17,25] are in bundle 1, a[2,10,18,26] are in bundle 2, a[3,11,19,27] are in bundle 3, a[4,12,20,28] are in bundle 4, a[5,13,21,29] are in bundle 5, a[6,14,22,30] are in bundle 6, and a[7,15,23,31] are in bundle 7. For another embodiment, alternative ways of bundling may be used.

Each of the 8 horizontal connectors 2310 is connected to its own set of address bundle and long lines, but shares the same configuration memory element (asele) of the horizontal breaker tile 2130. For example, address breaker element index 0 2310 is connected to address bundle 0 (a[0,8,16,24]), and horizontal long lines lhe[0] and lhw[0].

Within a horizontal connector 2310, there is a 4-to-1 mux 2350 selectable by asele. One of the four address input signals feeding the mux 2350 selectable by asele as output feeds a pipeline register enabled by inverted waitnow, and then conditionally drives the east long line lhe. The pipelined address injection muxes can also be configured such that either lhe drives lhw or lhw drives lhe so that lhe and lhw can effectively work as two segments of a horizontal long line spanning across the horizontal break tile.

Other possible designs of horizontal breaker may be used. See Section 3.1.8.

3.1.5. Vertical Breaker Tile

Figure 24A:
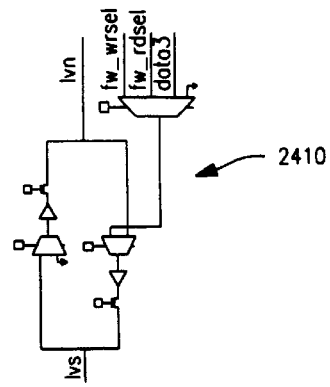
FIG. 24 is a circuit diagram of one embodiment of a vertical breaker tile.
Figure 24B:
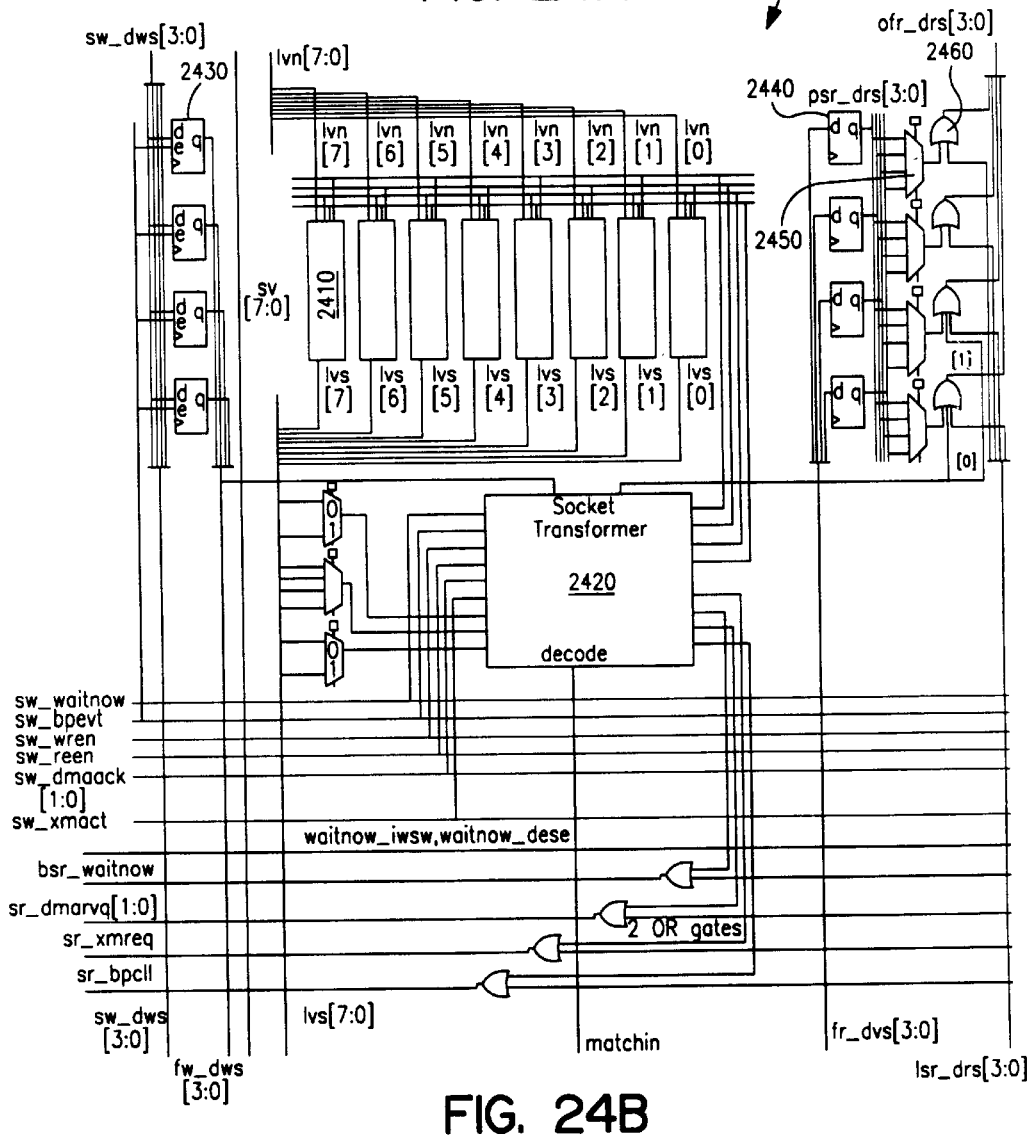

FIG. 24 shows one embodiment of a vertical breaker tile consisting of circuits dealing with the write data bus, the read data bus, the control busses and an array of 8 vertical connectors 2410.

For one embodiment, there is a set of four pipeline registers 2430 enabled by inverted waitnow for the 4-bit subset of the write data bus. The pipelined write data bus output signals are the only write data bus signals accessible to user programmable logic within CSL.

The 4-bit subset of the data read bus coming from the logic block tile below is fed as data to a set of 4 pipeline registers 2440. Each registered output can be selected as the output of any of the four 4-to-1 muxes 2450, where the output of such a mux 2450 is OR'ed 2460 together with the corresponding incoming pipelined read data bus. The purpose of such muxes 2450 is to allow arbitrary 4-way permutation of the assignment of read data bus signals to facilitate placement and routing of user programmable logic. Note that the corresponding OR gates 2460 for bits 1 and 0 are 3-input OR gates, where the additional inputs are outputs cfr_drs[1:0] from the bus state transformer (See FIG. 25).

Each vertical connector 2410 can be configured to either allow lvn to drive lvs, lvs to drive lvn, or inject a data value from the output of a 4-to-1 mux. As shown in FIG. 24, the four source signals common to all 8 vertical connector data injection muxes are fw_wrsel, fw_rdsel, fw_waited and fw_bpevt. For one embodiment, while fw_wrsel and fw_rdsel feed all muxes, fw_waited feeds only muxes corresponding to index 0, 2, 4, 6 and fw_bpevt feeds only muxes corresponding to index 1, 3, 5, 7.

From the set of 8 south vertical long lines lvs[7:0], lvs[5,1] are chosen as inputs to the 2-to-1 mux that drives fr_waitnext, lvs[6,4,2,0] are chosen as inputs to the 4-to-1 mux that drives fr_rqsel, and lvs[7:3] are chosen as inputs to the P2-to-1 mux that drives fr_bpctl.

Below the socket transformer 2420, there is an input control bus consisting of 7 signals, namely sw_bpevt, sw_waitnow, sw_rden, sw_wren, sw_dmaack[1:0], and sw_xmact. There is also an output OR-bus consisting of 5 signals, namely bsr_waitnow, sr_dmareq[1:0], sr_xmreq and sr_bptcl. Moreover, there is a subset of the wait-mesh control bus signals, namely, waitnow_iwnw, waitnow_oene, waitnow_iwsw and waitnow_oese that simply feed through.

Figure 25:
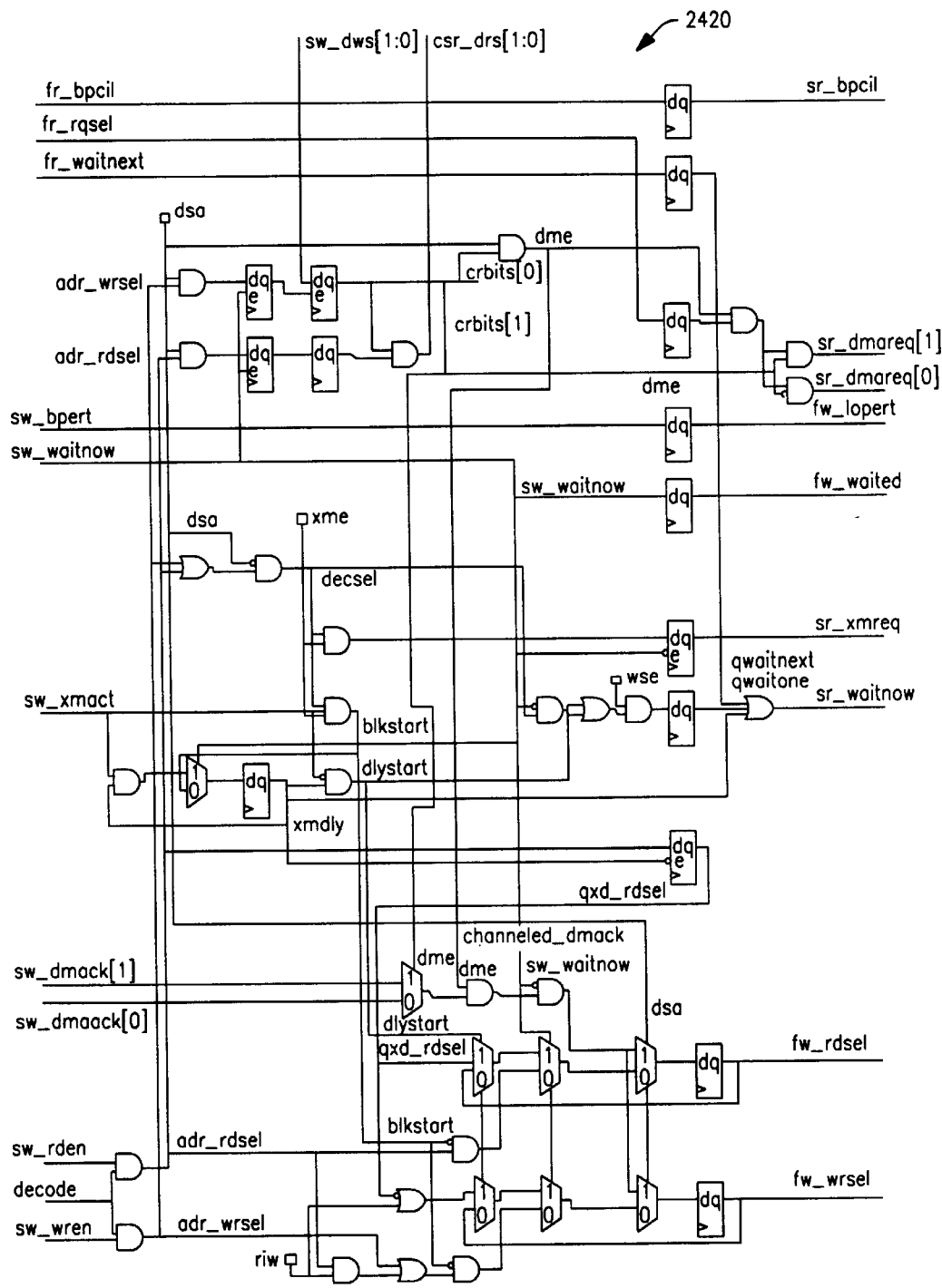
FIG. 25 is a circuit diagram of one embodiment of a CSI socket transformer.

FIG. 25 shows the details of the socket transformer 2420. The socket transformer 2420 supports the service provided by the CSI socket interface. The socket transformer 2420 provides all the necessary pipeline registers, wait state delay control, and signal qualifying logic to transform sw segment signals to fw segment signals, and fr segment signals to sr segment signals.

3.1.6. Corner Breaker Tile

Figure 26A:
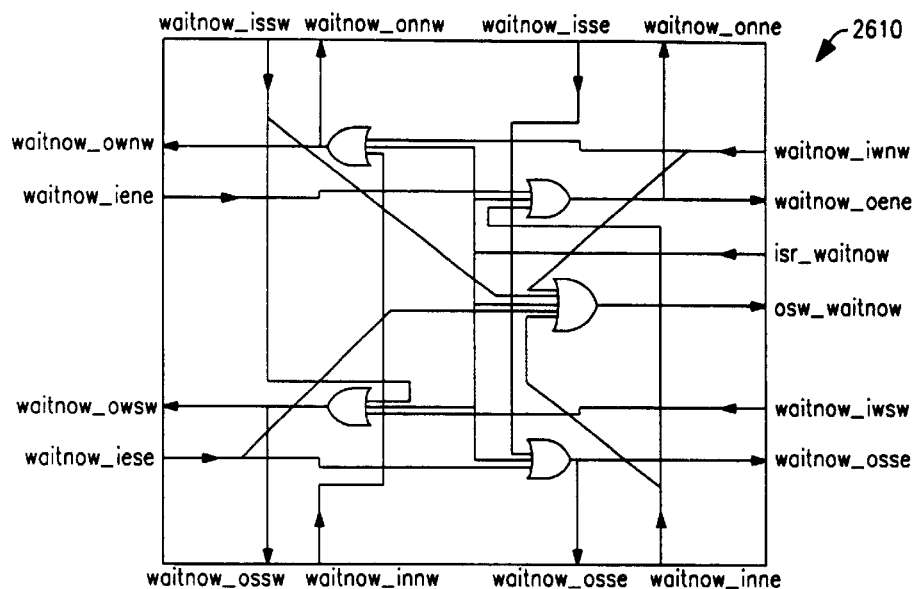
FIG. 26 is a circuit diagram of one embodiment of a corner breaker tile.
Figure 26B:
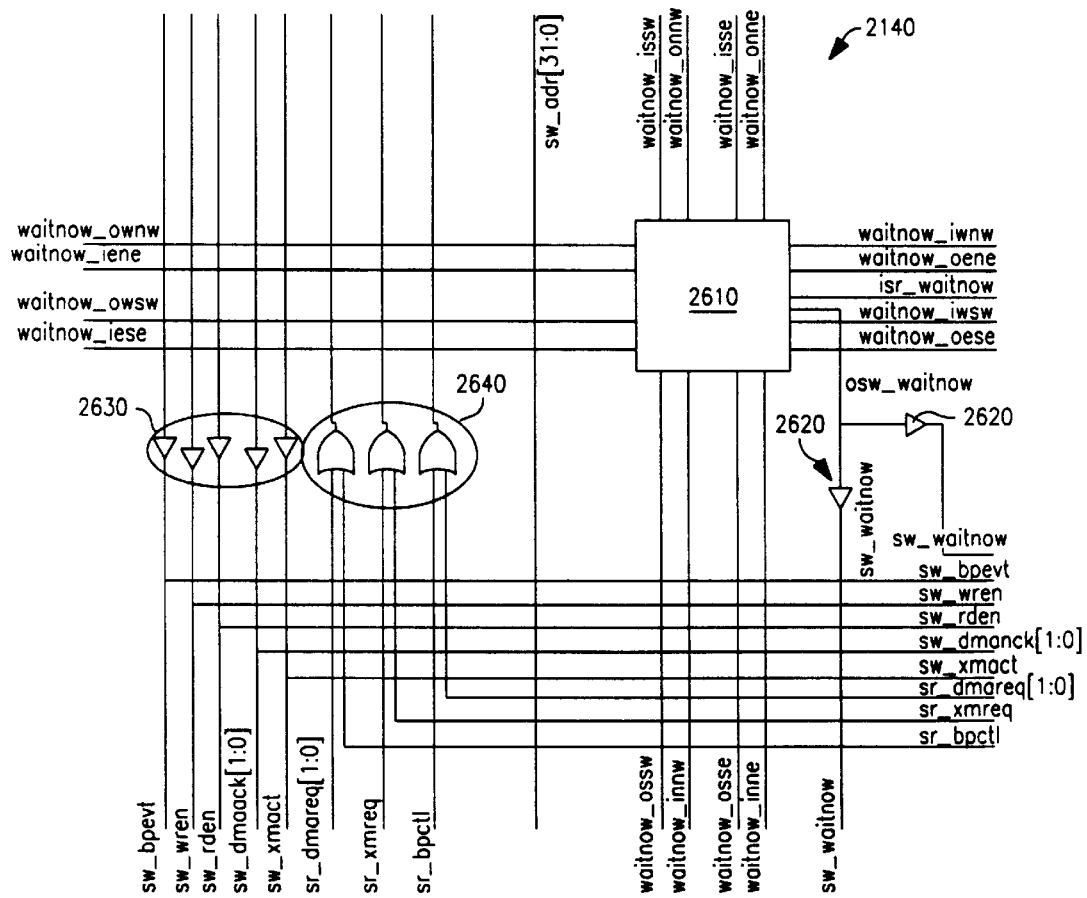

A circuit diagram of one embodiment of a corner breaker tile 2140 is shown in FIG. 26. It consists of a node of chip-wide two-dimensional wait resolution mesh 2610, 2 buffers 2620 for bank-wide distribution of the resolved waitnow signal, buffers 2630 for incoming control bus signals (sw_bpevt, sw_wren, sw_rden, sw_dmaack[1:0], sw_xmact) and OR gates 2640 for outgoing control signals (sr_dmareq[1:0], sr_xmreq, sr_bpctl), and the feed-through address bus (sw_adr[31:0]).

The wait resolution mesh 2610 is a mechanism for emulating a distributed global tri-state line. The wait resolution mesh 2610 can be viewed as a 2-D extension of the OR-bus scheme used in other circuits. The worst case delay is proportional only to the sum of the length and width of the chip. At each node as shown in FIG. 26, local source signal iwait is injected and local destination signal owait is generated. The owait signal is then distributed to the south feeding the horizontal breaker tile 2130, and also to the east feeding the vertical breaker tile 2120, and the entire lower right logic bank 1810 via the vertical connector logic to the vertical long line and to the user programmable logic.

The owait signal is the OR output of 5 input signals, namely the local isr_waitnow and the wait input from four corner directions (waitnow_issw, waitnow_inne, waitnow_iwnw, waitnow_iese). These four signals are respectively the OR combined wait signals from nodes in the north-west, south-east, north-east and south-west regions. The other four OR gate outputs are respectively OR combined wait signals to the north-west, south-east, north-east and south-west regions.

For another embodiment, the same functionality may be implemented by snaking a 1-D OR-bus in a row-major or column-major fashion with a longer delay.

3.1.7. Programmable I/O Tile

Figure 27A:
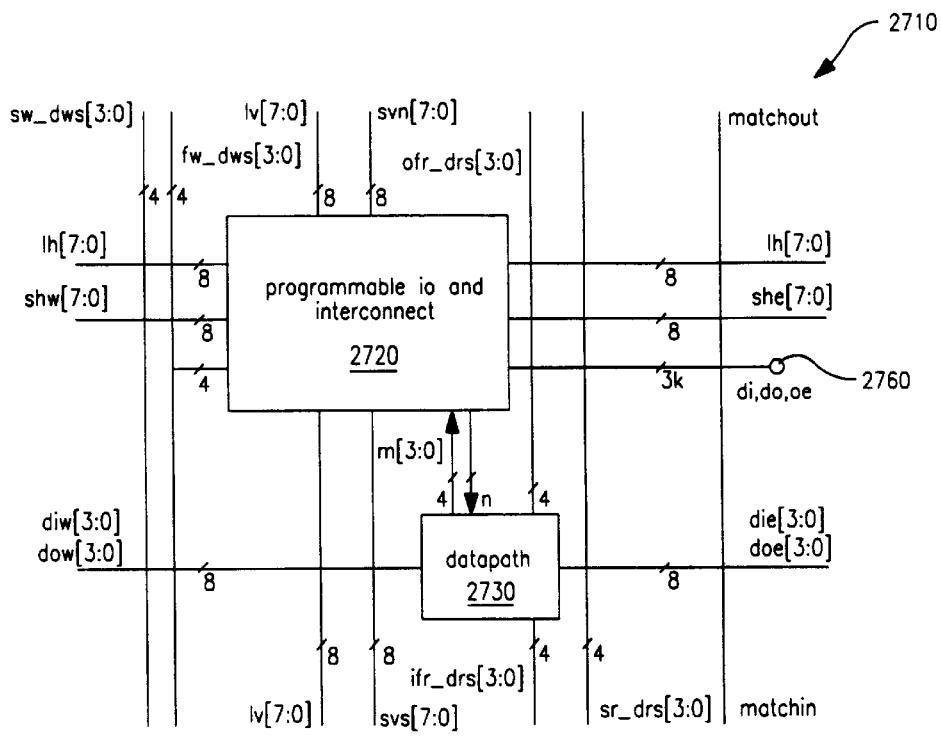
FIG. 27 is a circuit diagram of one embodiment of a I/O block tile.
Figure 27B:
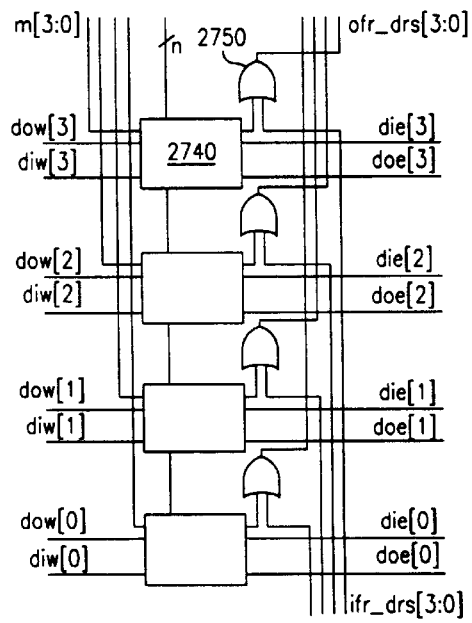
Figure 27C:
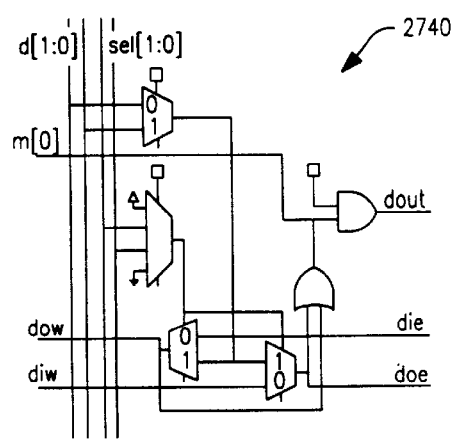

As shown in FIG. 27 is a programmable I/O tile 2710. At this level of organization, it looks very like a logic block tile with the following exceptions. There is no address decoder, but there is a set of signals connected to the corresponding I/O pads 2760. For each programmable I/O cell 2740 inside the block 2720, there are 3 signals connected to the corresponding I/O pad 2760, namely di, do and oe.

3.1.8. Alternative Logic Block Tile and I/O Block Tile

Figure 28:
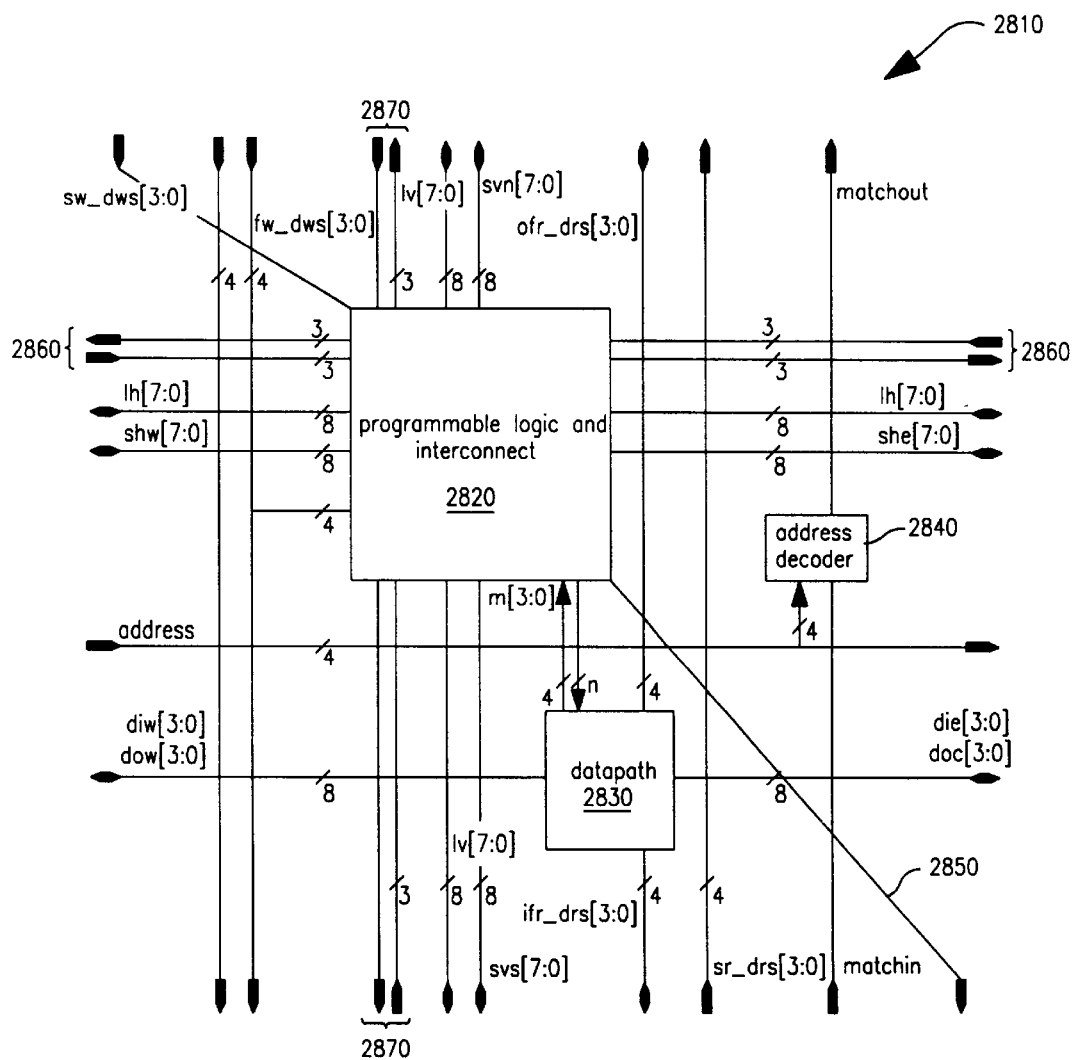
FIG. 28 is a circuit diagram of one embodiment of an alternative logic block tile.
Figure 29A:
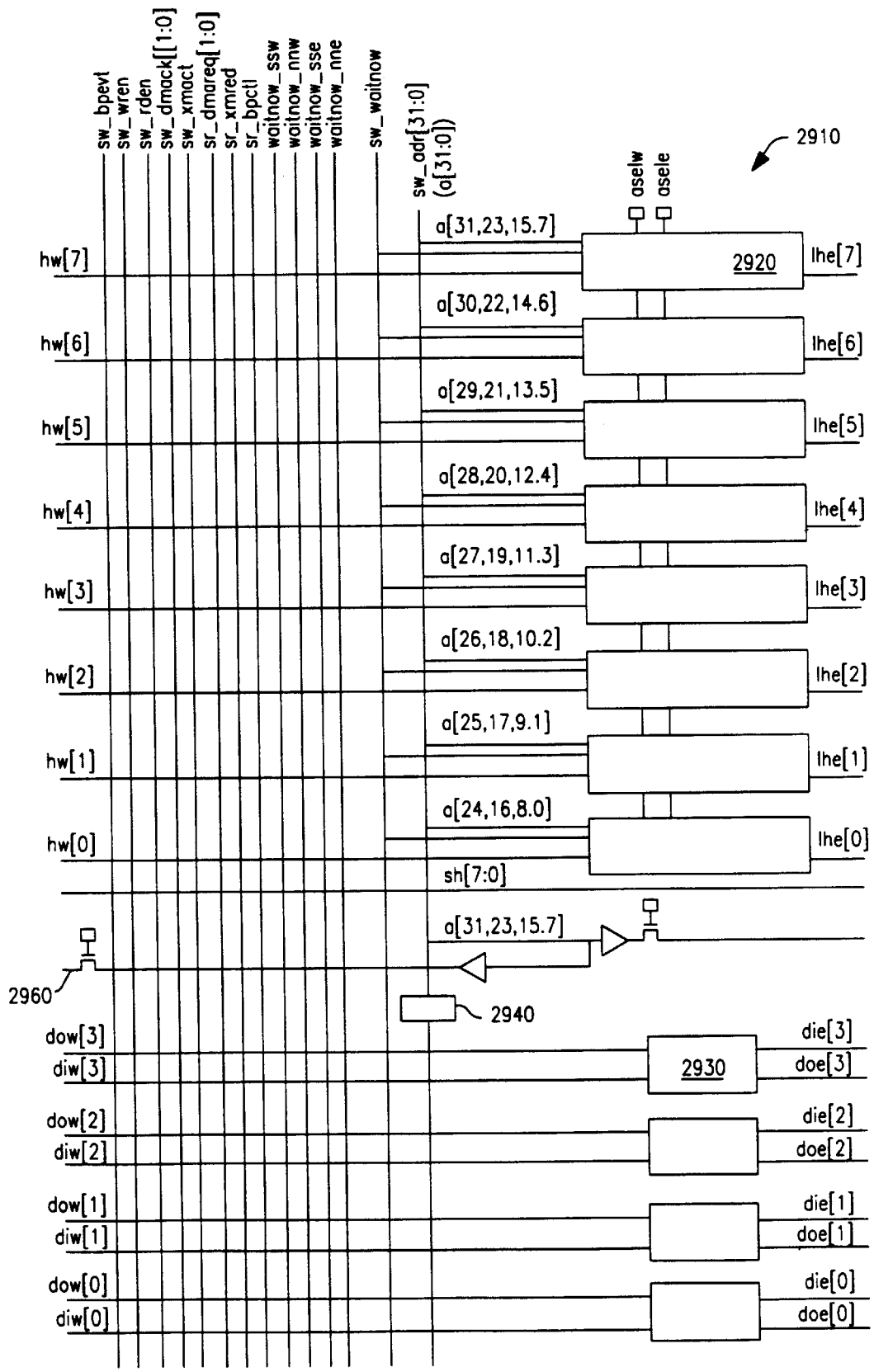
FIG. 29 is a circuit diagram of one embodiment of an alternative horizontal breaker tile.
Figure 29B:
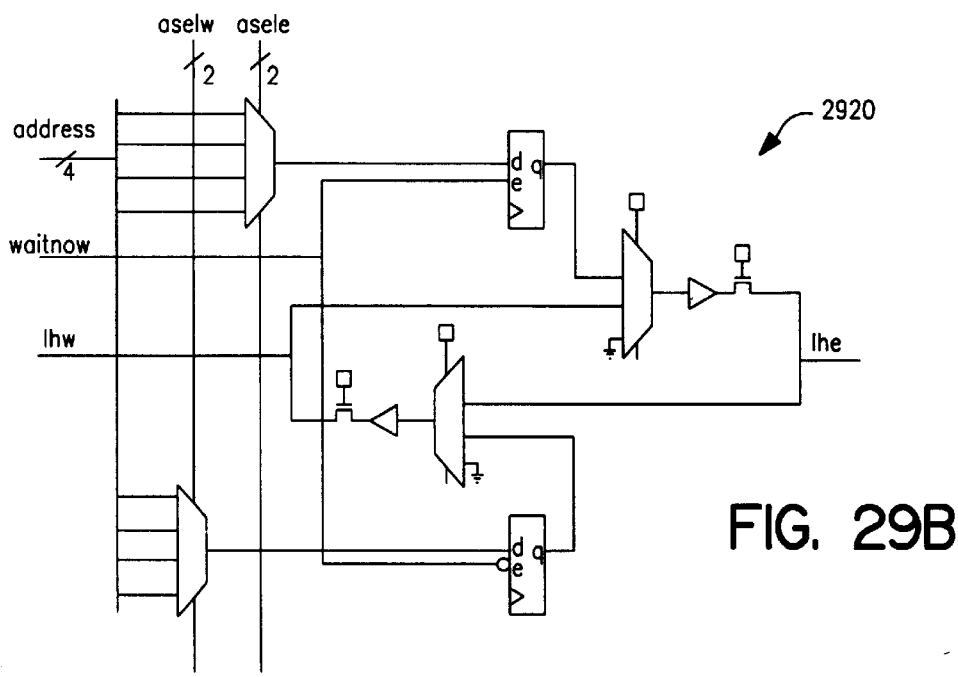
Figure 29C:
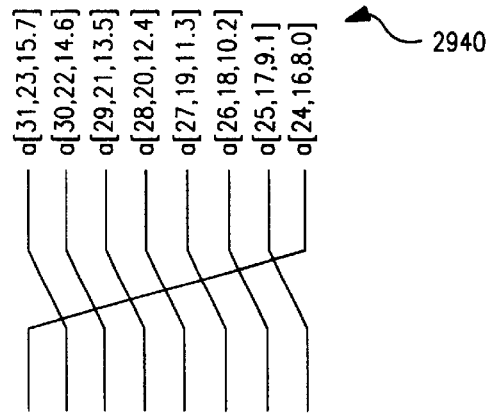
Figure 29D:
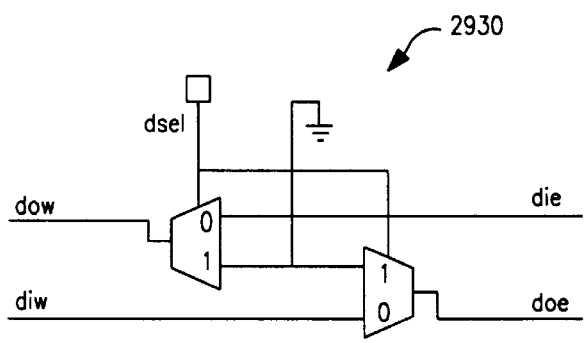

FIG. 28 shows an alternative logic block title 2810. It is more complicated than the one in FIG. 22 due to additional interconnect lines between adjacent blocks. In this illustration there are 3 outputs to the north, 1 output to the south, 3 outputs to the west, 3 outputs to the east, and 1 output to the south-east 2850, 1 input from the north, 3 inputs from the south, 3 inputs from the west and 3 inputs from the east.

Similar addition to interconnect can be added to the I/O block tile.

At the edge of CSL, such additional exterior input and output lines can be used to connect to side-band signals.

Figure 30A:
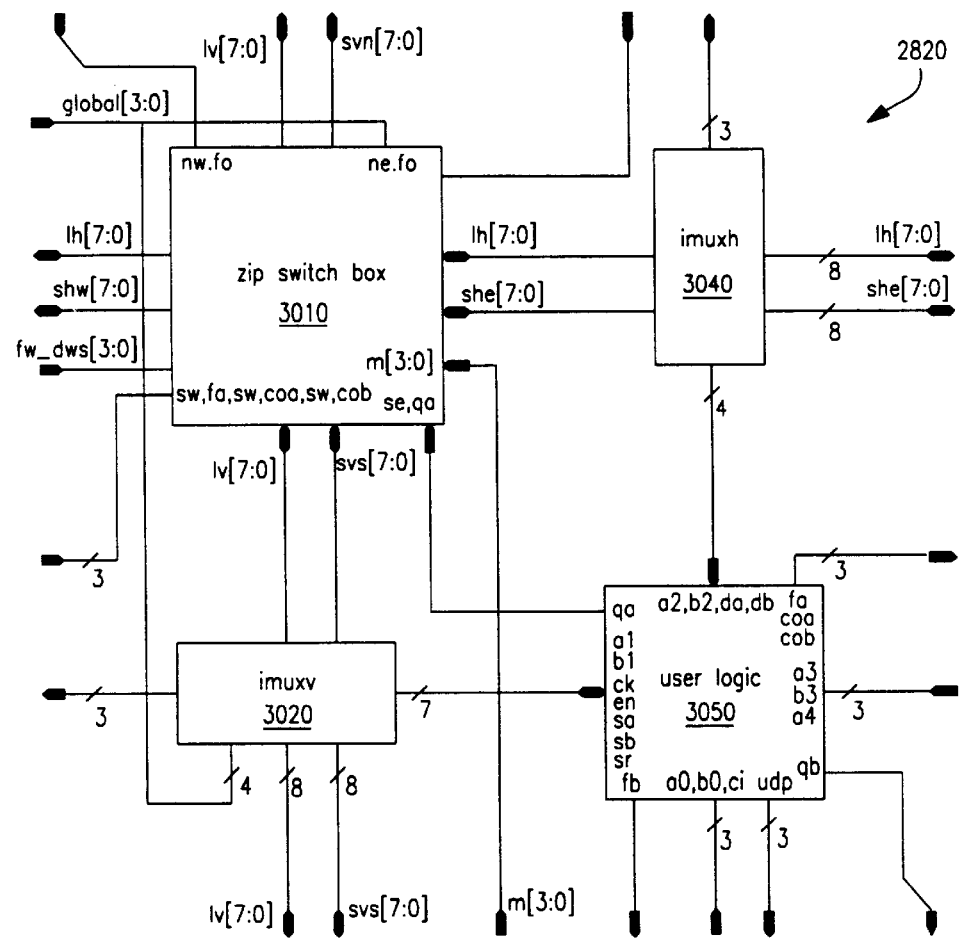
FIG. 30 is a circuit diagram of one embodiment of a programmable logic and interconnect block.
Figure 30B:
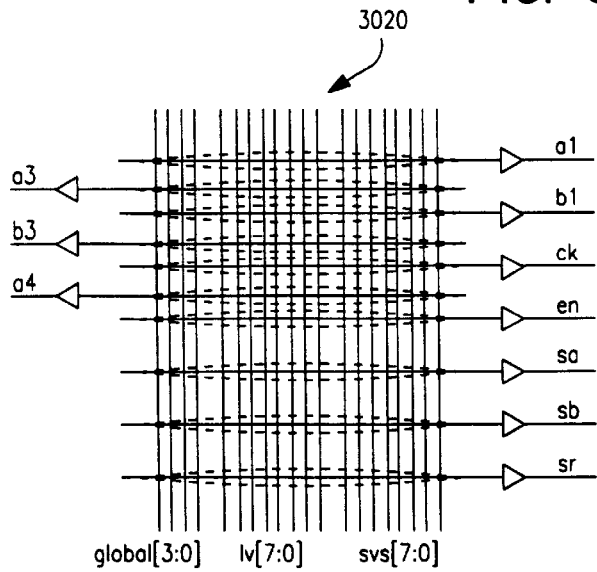
Figure 30C:
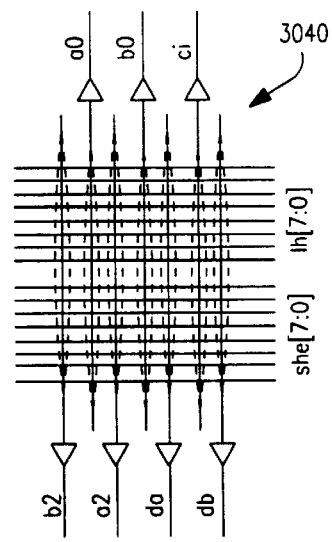

FIG. 30 shows the details of one such block of programmable logic and interconnect 2820. For one embodiment, the programmable logic and interconnect 2820 includes four sub-blocks, namely the user logic 3050, the horizontal input mux array (imuxh) 3040, vertical input mux array (imuxv) 3020, and the zip switch box (zsb) 3010.

The user logic 3050 may contain one or more logic cells, including such conventional elements as 4-input lookup tables, registers, latches or even product-term logic structures. This user logic 3050 receives its block inputs from imuxh 3040 from the north and imuxh from the south of its south neighboring logic block tile, and inputs from imuxv 3020 from the west and imuxv from the east of its east neighboring logic block tile. The user logic 3050 sends its 6 block outputs to the zip switch boxes 3010 in its own and neighboring logic block tiles at its four corner directions of north-west, south-west, southeast and north-east.

The imuxv 3020 contains an array of programmable input muxes followed by buffers, for one embodiment, 7 buffers driving east and 3 buffers driving west. Each input mux can statically select from one or more signals from the global lines (global[3:0]), vertical long lines (lv[7:0]) and south vertical short lines (svs[7:0]) running through that tile.

Similarly, the imuxh 3040 contains an array of programmable input muxes followed by buffers, for one embodiment, 4 buffers driving south and 3 buffers driving north. Each input mux 3020, 3040 can statically select from one or more signals from horizontal long lines (lh[7:0]) and east horizontal short lines (she[7:0]) running through that tile.

The zip switch box 3010 performs switching functions among bidirectional signals. For one embodiment, the zip switch box 3010 switches among the following sets of 48 bi-directional signals: 8 horizontal long lines (lh[7:0]), 16 horizontal short lines (shw[7:0], she[7:0]), 8 verticle long lines (lv[7:0]), 16 vertical short lines (svn[7:0], svs[7:0])), and 10 input signals (the 6 block outputs from neighboring logic blocks and 4 outputs (m[3:0]) from local data path muxes.

3.1.9. Zip Switch Box

Figure 31A:
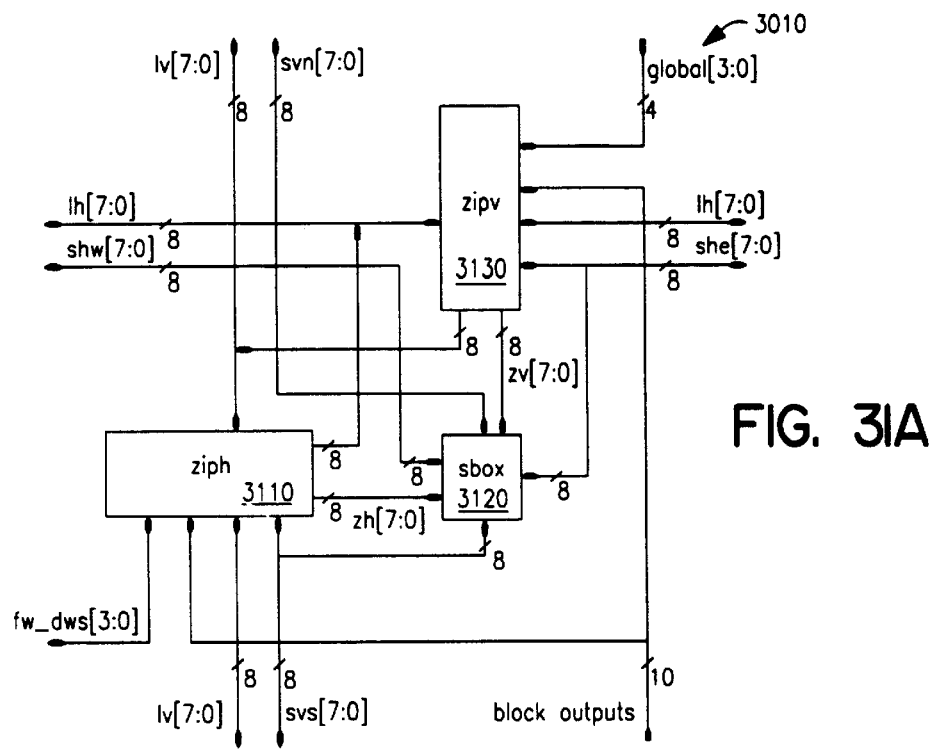
FIG. 31 is a circuit diagram of one embodiment of a zip switch box.
Figure 31B:
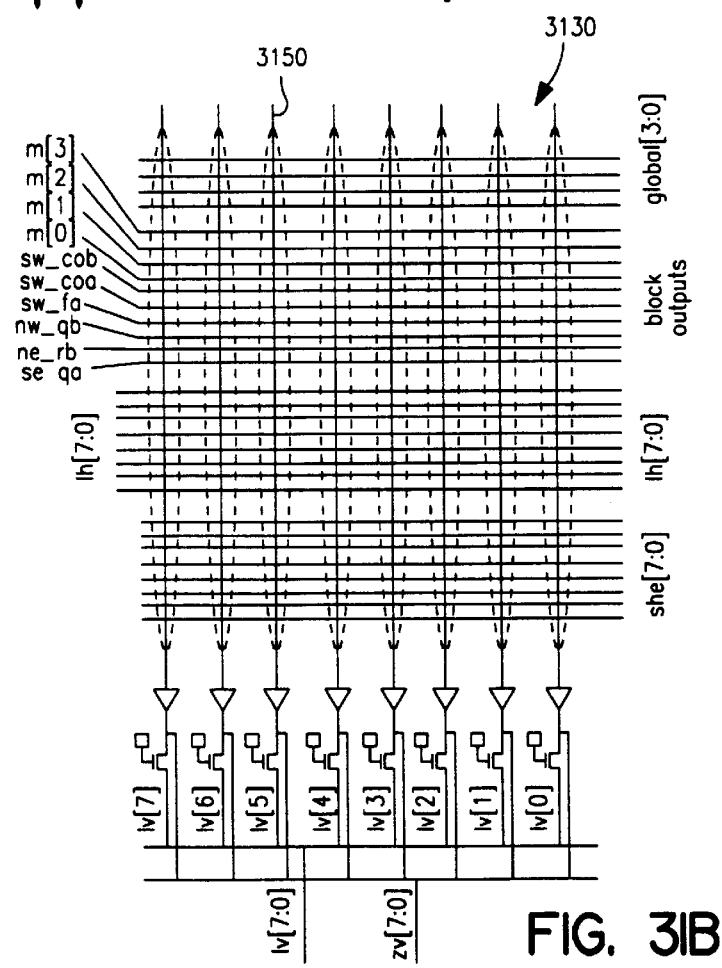
Figure 31C:
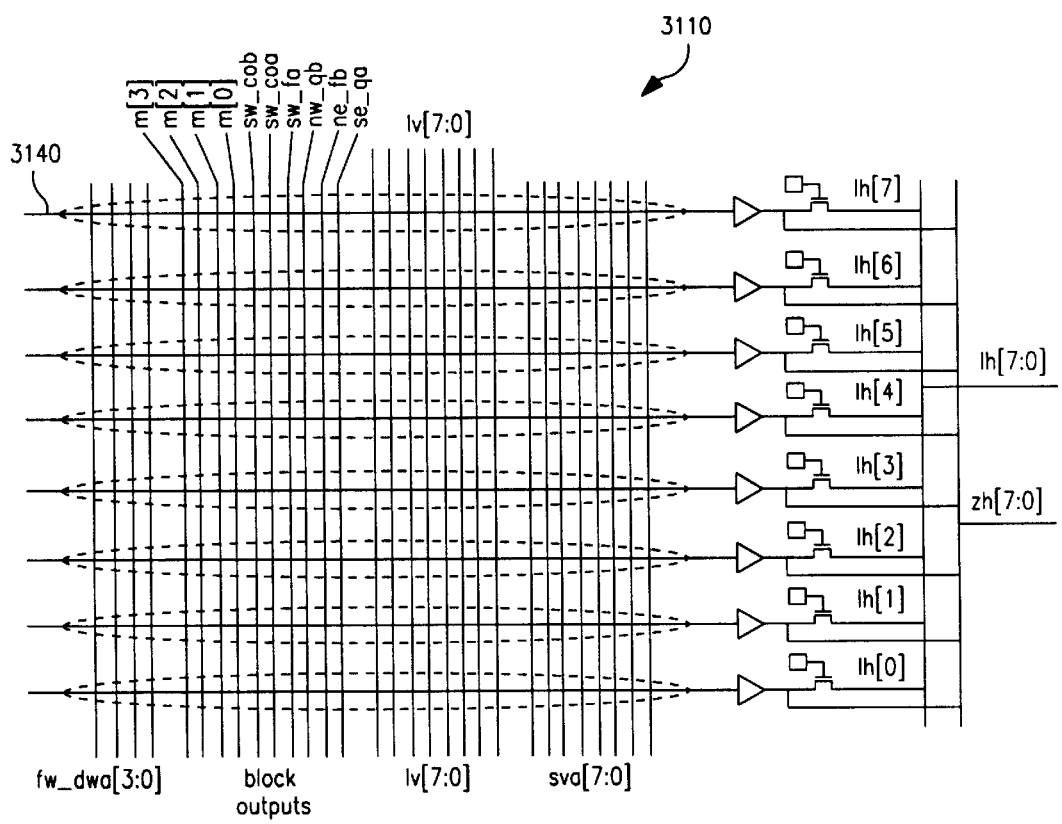

FIG. 31 shows the details of a zip switch box 3010. It is named a zip switch box 3010 because of the existence of the zip lines. A zip line is an input mux followed by a buffer followed by one or more output connections as part of the zip switch box. There are three sub-blocks, namely ziph 3110, zipv 3130, and sbox 3120.

The ziph block 3110 contains an array of 8 horizontal zip lines 3140. Each horizontal zip line 3140 can select its inputs from one or many signals. For one embodiment, each horizontal zip line 3140 can select from 30 signals (lv[7:0], svs[7:0], din[3:0], and the 10 block outputs and datamux outputs). Each zip buffer output may be configured to drive or not to drive its corresponding horizontal long line. The outputs of the ziph block 3110 drive the sbox 3120.

The zipv block 3130 contains an array of 8 vertical zip lines 3150. Each vertical zip line 3150 can select its inputs from one or many signals. For one embodiment, each vertical zip line 3150 can select from 30 signals (lv[7:0], svs[7:0], global[3:0], and the 10 block outputs and datamux outputs). Each zip buffer output may be configured to drive or not to drive its corresponding vertical long line. The outputs of the zipv block 3130 a drive the sbox 3120.

As shown in FIG. 32, the sbox 3120 contains an array of 8 simple ten-way switches 3210. Each such switch 3210 performs switching among a plurality of signals. For one embodiment, the sbox 3120 switches among the following 8 signals in 10 different ways. For switch index k, the input signals are respectively shw[k], she[k], svn[k], svs[k], zh[k], zh[(k+1) mod 8], zv[k], and zv[(k+1) mod 8]. These signals correspond to the ten-way switch signals w, e, n, s, zhw, zhe, zvn, and zvs respectively. The 10 possible programmable connections are w-e, n-s, n-e, e-s, s-w, w-n, zhw-w, zhe-e, zvn-n, and zvs-s. Two implementations are shown 3220, 3230. They both use 10 transistors, the minimum number of pass transistors to allow for the 10 possible independently programmable connections.

3.1.10. Alternative Horizontal Breaker Tile

FIG. 29 is a diagram of an alternative horizontal breaker tile. The major difference between this tile 2910 and the one shown in FIG. 23 is that the address signals 2960 are driven to the logic block tiles on the horizontal breaker tile's 2910 east and west instead of just east.

With this type of horizontal breaker tile 2910 in the CSL, the horizontal breaker tile on the left edge can be simplified to not include horizontal connectors and address drivers.

3.2. System Signal Distribution and Collection

3.2.1. Address Bus

The 32-bit CSI address bus is buffered at the interface logic at the top of CSL to generate a copy of the address bus for every column of horizontal breakers (see FIG. 19). The buffered system address bus on each column feeds through the corner breaker and enters the array of 8 horizontal breaker tiles below. Both the registered and unregistered address busses are available.

The unregistered address bus (sw_adr[31:0] or a[31:0] for short) is only available to the built-in address decoder hardware. Within an horizontal breaker tile (see FIG. 23), the local address subset a[31,23,15,7] is chosen to feed all 8 logic block tiles on the same row as its right-neighboring logic bank. However, due to the address braiding occurring in each horizontal breaker tile, each of the eight address bundles appears exactly once as local address a[31,23,15,7] (see FIG. 21) and thus all 32 address bits are available to the chain of 8 address decoders.

All 32 bits of the registered address bus are available to the logic block tiles on the same row, but only 8 bits at a time, as the 8 selected address bits are injected to the 8 horizontal long lines via the horizontal connectors. As a further restriction, these 8 bits all come from the same position of each of the 8 address bit bundles. As all eight 4-to-1 data injection muxes share the same two configuration memory cells, there are only four choices, namely a[31:24], a[23:16], a[15:8] and a[7:0]. This is exactly why the address bundling is defined as such as it is more usual to use consecutive address bits. Note that for each horizontal long line, the corresponding horizontal connector can be configured to allow injection of the address bit or not.

As addressing braiding does not change the 4-bit bundling definition, in the next row of logic tile, address bits a[31:24], a[23:16], a[15:8] and a[7:0] are still the four possible choices. However, due to braiding, the exact long line where an address bit appears changes. For example, if a[31] is available on lh[7] of a horizontal breaker tile, then a[31] will appear on lh[6] of the horizontal breaker tile below.

For one embodiment, because the address braiding scheme has a cycle of 8 and there is no braiding in the corner breaker tile, the whole pattern repeats itself for every logic bank. This is advantageous for placement and routing of user programmable logic.

As a possible enhancement, it is possible to use a modified horizontal breaker tile 2910 that drives to both left and right tiles as shown in FIG. 29, so that the column of horizontal breakers on the left edge of CSL can be degenerated such that all the address buffers and horizontal connectors can be eliminated.

3.2.2. Address Selectors

For one embodiment, there is one address selector per bank column so that there are 8 address selectors per bank. As shown in FIG. 21 and FIG. 22, the 32-bit address decoder of each bank column is implemented as a cascade chain of 8 four-bit address decoders, one per logic block tile. The last decoder output of the chain is then fed to the north-neighboring vertical breaker tile (see FIG. 24), entering the CSI control bus transformer box (see FIG. 25), combined with other CSI bus signals, generating output signals fw_rdsel and fw_wrsel. These signals are then conditionally injected into the general programmable interconnect via the vertical connectors in the vertical breaker tile (see FIG. 24). Once the select signals enter into the general interconnect, the actual user programmable logic configured to respond to these signals can be placed anywhere in CSL, not constrained to be placed in the same bank column or even the same logic bank, although it is nice if it is to be placed near the signals.

3.2.3. Data Write Bus

The 32-bit CSI data write bus is buffered at the interface logic at the top of CSL to generate a copy of the address bus for every column of logic banks (see FIG. 19). If the bus is a 8-bit data bus version, then the same bit simply appears 4 times as 4 different bits of the 32-bit data bus. For this discussion, without loss of generality, a 32-bit data bus is assumed.

There are both registered and unregistered versions of the data write bus. Only the registered version is available to user programmable logic. The 32-bit data write bus is distributed such that each column of vertical breaker tile and logic block tile correspond to a unique 4-bit subset (see FIG. 21). The unregistered version is used to generate at each vertical breaker for the logic bank below a local registered version (see FIG. 24). Only this copy of the registered version of the data write bus is available to all the user programmable logic within the corresponding logic bank.

Four bits of the registered version of the data write bus are then driven downward for the bank column of logic block tiles, entering into the programmable logic and interconnect structure as shown in FIG. 22 or FIG. 28, and thus into the general programmable interconnect.

If the programmable logic and interconnect structure of FIG. 28 is implemented as shown in FIG. 30, then the four bits of data write bus will enter the zip switch box as inputs to the horizontal zip lines (see FIG. 31), thus connecting to the general programmable interconnect of horizontal and vertical long and short lines.

3.2.4. Data Read Bus

For each column of logic banks, there is a registered version of the system data read bus feeding the interface logic (see FIG. 19). The corresponding bit from each of these copies are OR'ed together inside the interface logic circuit to become the CSI data read bus. If the bus is a 8-bit data bus version, then the same bit simply appears 4 times as 4 different bits of the 32-bit data bus. For this discussion, without loss of generality, a 32-bit data bus is assumed.

There are both registered and unregistered versions of the data write bus. Only the unregistered version is generated by user programmable logic. The registered version is always generated by CSL. The 32-bit data bus is distributed such that each column of vertical breaker tile and logic block tile correspond to a unique 4-bit subset (see FIG. 21).

For one embodiment, the registered data read bus of each column of logic banks is collected from bottom to top. The unregistered version of the data read bus is collected on a per-bank basis through an OR-chain mechanism. The 4 unregistered data read bus signals output by the topmost logic block tile are then registered and then fed to four 4-to-1 muxes before OR'ed together (bit-wise) with the registered version of the data read bus so that any of the 4 signals can eventually appear as the appropriate bit within the 4-bit subset (see FIG. 24).

Each bit of the unregistered version of the data read bus per column is generated by OR'ing together the respective output (dout) of the corresponding data path mux of the logic block tile in the column (see FIG. 22). Each dout output can be configured to inject to the OR chain or not.

The source of dout is either injected from the local programmable logic and interconnect block or another programmable logic and interconnect block via the data path mux chain. Thus, an output signal generated in any column and any row of a logic bank can be injected to any bit of the system data read bus without consuming any general programmable interconnect. The signal is first injected into one of the local data path mux of the same logic block tile, routed along the same row, appearing as dout on every data path element along the chain. At the column where the target bit position is located, the dout signal is enabled to be OR'ed to the unregistered version of the data read bus. In fact, the signal can be injected to any one of the four chains locally and will still be able to get to the correct bit position via the set of four 4-to-1 muxes in the vertical breaker tile.

3.2.5. Data Path Mux Chains

For each logic bank, there are 32 pairs of data path mux chains running horizontally, optionally connected to their corresponding ones in adjacent logic banks via the data path muxes in neighboring horizontal breakers (see FIG. 23). Along each row of logic block tiles, there are 4 pairs of data path mux chains, with each pair corresponding to one bus bit.

In normal operation as a bus, only one active signal is dynamically injected to a pair of data path muxes, with the other output propagating to both east and west, while the other pairs of muxes on the same chain are dynamically selected to be in feed-through mode to allow that signal to propagate. At each data path element, the outputs of the two muxes are OR'ed together to generate the equivalent correct bus signal, whether the active signal source is from the east or the west.

The length of the chain can be chosen very flexibly. As the active value is a logic 1, a logic 0 (GND) signal is used at inputs at the two end points of a chain for proper operation (see FIG. 19). However, any given data path element can be configured to always inject (with the output of the injection mux select mux tied to VCC) a logic 0 to both injection muxes so that it behaves like the simpler data path element of the horizontal breaker tile (see FIG. 23). Moreover, if a data path element along a data mux chain chooses not to participate, it can always be configured to be in feed-through mode.

The data path mux chains not only serve as an extension mechanism to collect system data read bus signals, but also can be used in a stand-alone manner as a user bus, as long as the dout signals are disabled to not affect the system bus.

Since the configuration bits for the 4 pairs of data path elements are not shared, it is possible to configure CSL to support multiple busses of differing widths.

As another mode of operation, the data path mux chain can be configured to serve as auxiliary general interconnect, as the "m" output signals are output from the chain to the programmable logic and interconnect block, and thus entering general programmable interconnect. In the specific case of FIG. 30 and FIG. 31, the "m" signals enter the zip switch box as inputs.

The mux chain pair can also be used as logic, each half of a pair as a priority mux chain. The priority of an injected signal is determined by the relative position of the data path element on the chain. For example, the east propagating priority mux chain has it highest priority element on its east end. For one embodiment, two parallel priority mux chains are operated in parallel, with the east end "m" output and the west end "m" output as the respective final output with two opposite priority ordering.

The priority mux chain needs initialization at both ends. Data path muxes along the chain not participating can also be set to bypass mode.

Those skilled in the art understand that one may replace the OR gates in the mux chain by AND gates, and GND signals at the two ends by VCC signals, to achieve the equivalent functionality through De Morgan's Law.

3.2.6. Control Signals

There are 3 groups of controls signals as classified by their directionality. They are the 6 control write signals (sw_rden, sw_wren, sw_dmaack[1:0], sw_xmact, sw_bpevt), the 4 control read signals (sr_dmareq[1:0], sr_xmreq, sr_bpctl), and the wait resolution signals including sw_waitnow, bsr_waitnow. For details of the wait resolution, see section 3.2.7.

The control write bus is buffered at the interface logic at the top of CSL to generate a copy for every column of corner breakers (see FIG. 19). As the copy goes down each column of alternative corner breakers and horizontal breakers, it is rebuffered at every corner breaker tile before feeding the vertical breakers to the east (see FIG. 26).

At each of the 8 vertical breaker tiles to the east, the control write signals feed the socket control signal transformer, in combination of the decode output signal from the address decoder chain of the same bank column, generates the registered socket control write signals, fw_rdsel fw_wrsel and sr_bpctl. These signals are then injected into the general programmable interconnect via the vertical connectors (see FIG. 24).

For one embodiment, the control read bus signals flow in the reverse direction as the control write bus signals. The signals collected along each column of corner breakers are OR'ed together at the interface logic to connect with system bus. The control read bus is collected as a OR chain as it propagates up the column of alternative horizontal breakers and corner breakers. At each corner breaker tile, the tributary OR chains collecting signals along the 8 vertical breaker tiles from east to west is OR'ed together with the respective chains coming up (see FIG. 26).

At each of the 8 vertical breaker tile to the east, the local control read signals, sr_dmareq[1:0], sr_xmreq, sr_bpctl, are generated by the socket control transformer. These signals are registered signals. The inputs of the socket control transformer either comes from the control write bus or selected south long vertical lines that are part of the general programmable interconnect.

3.2.7. Wait Resolution Mesh

This method allows propagation of a wait control signal that is generated in many locations within a system to be distributed to many locations within that system.

There are two alternate examples. In one case the sources are all collected via a logical OR tree to a single common point and then redistributed. This may require a signal to traverse the system twice. In an other sources are collected on a wired OR signal which is distributed throughout the system also allowing it to be examined throughout the system. A large wired OR is typically very slow or requires large amounts of power.

In this method the wait control signal is propagated in an array structure that allows a source to drive it at any point in the array and provides a logical OR of all sources to th e array at any point in the array. This wait mesh provides this combined wait result with a minimal worst-case propagation path that only traverses the array in one direction. All of the signals and gates involved may be relatively small and low power. For one embodiment, the logical element and interconnect used here to propagate the wait control signal is identical at each point in the array.

For one embodiment, the system logic that handles the wait signal is physically structured as a two-dimensional array where each element of the array is repeated in vertical columns and horizontal rows with vertical and horizontal connections between the elements. At each of these array elements a local wait control request signal may be driven into the element. The composite wait request result of this and all of the corresponding inputs at the other elements of the array is output from this array element. The logical structure local to each of these elements is identical. The logic within each element combines the local wait request signal with directional wait request signals traversing through the array element via logical ORs so that it is sent out in all directions. The directional wait request signals from all directions are also combined within the array element and with the local request via a logical OR and delivered out for local use.

The directional propagation signals that traverse the array between the array elements and the logic within those elements to facilitate that traversal are chosen such that each local request may not be returned to the original array element at which it entered yet is propagated to all other elements. A set of eight directions are used to propagate the wait control. Two signals physically drive out to each of the adjacent column and row array elements thus driving a total of eight directional signals. Similarly two signals are input from each of the adjacent column and row elements. Each of these input signals is propagated across that array element from the column (or row) element on one side to the one on the other side by combining it via a logical OR into the output signal on the other side with the corresponding direction.

Each of the directional propagation signals, which are physically connected in an orthogonal manner, have a logical flow diagonally toward a quadrant. The two signals connecting to an adjacent element, besides connecting on through in the same direction, also connect on through in an orthogonal direction. Each one of the two signals vector out in one of the other two directions by being combined via a logical OR with the other signals propagating in that direction. The eight directions are two in each of the four adjacent physical directions where each of those has one of the two quadrants in that direction associated with it.

At the edge of the array, the inputs may all be tied to a logical zero.

This is illustrated for a corner breaker tile in FIG. 26, where the point of the compass are used to refer to directions. The four quadrants are NE, NW, SE, and SW. The four physical connection directions are N, S, E, and W. The eight logical directions are NNE, ENE, ESE, SSE, SSW, WSW, WNW, and NNW.

The signal names are formed by prefixing the general signal name "wait" with an "I" or "O" on inputs and outputs of this element respectively and one of the eight directions of propagation. The local array element copies do not have a direction associated with them.

3.2.8. Sideband Signal Distribution

As described in Section 0, there are system sideband signals that are coupled to CSL. Since these signals are not timing critical, it is sufficient to connect them to CSL at the edges. There are many possible ways of connection. The sideband signals can be connected to the long or short lines at the edges that would otherwise be unconnected (see FIG. 19 and FIG. 21). Alternatively, if the logic block tile is implemented as shown in FIG. 28, unused local signals of logic block tiles at the edges can be connected to sideband signals. For one embodiment, if the number of sideband signals is relatively small, as in the case with an 8032 CPU, it is sufficient to connect sideband signals just to the unused imuxh outputs and unused inputs of the zip switch box of the logic tiles on the top edge. There is a total of 24 lines out of and 8 lines into CSL per bank, so that incoming sideband signals have more than one way of coming in, and outgoing sideband signals have more than one way of going out of the CSL.

3.3. CSL Configuration

3.3.1. CSL Configuration Memory as System Addressable Memory

The configuration memory space is randomly addressable as part of CSI system address space. Hence, it does not require any dedicated hardware to perform CSL configuration. Configuration process becomes an infinitely flexible software process in which the on-chip CPU simply writes the configuration data to the appropriate configuration memory locations.

For one embodiment, the configuration memory is structured similarly to a conventional SRAM memory array with word and bit lines. To save silicon area, the system data write and system data read bus is reused for the purpose of CSL configuration.

In case the configuration memory is unused for configuration, it could be reused as general purpose RAM to increase on-chip RAM capacity. Depending on the particular implementation, some additional constraints may apply.

3.3.2. Partial Reconfiguration of CSL

If not properly designed, during the CSL configuration process some wires may float and cause a high current condition and the chip may fail. In order to prevent this undesirable situation, there is a global enzip signal that controls the state of such wires. At power up, the processor writes a '0' to some control register location, which is memory mapped in the CSI address space, causing the globally distributed signal enzip to be false, and thus forcing all relevant lines to GND. After CSL configuration is completed, the processor writes a '1' to the same control register location, before normal CSL user mode begins.

Figure 33A:
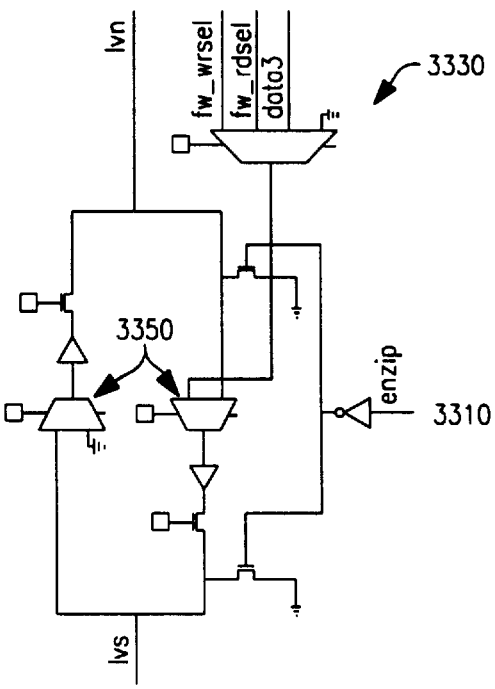
FIG. 33 is a circuit diagram of one embodiment of a per-bank enzip signal that enables partial dynamic reconfiguration.
Figure 33B:
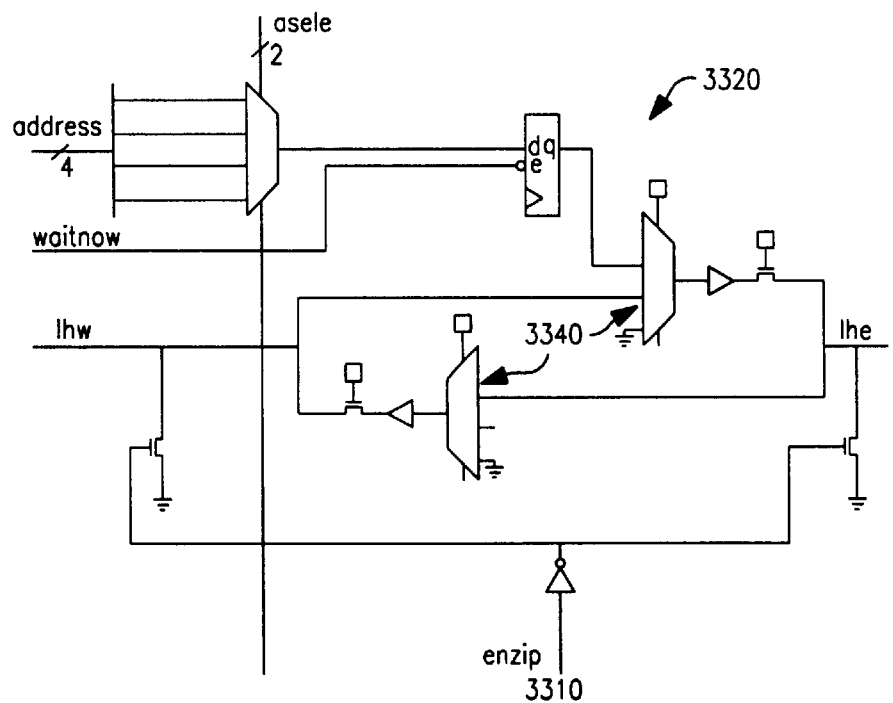

FIG. 33 illustrates the use of the enzip signal 3310. With respect to CSL, for one embodiment, there are two kinds of locations that the enzip 3310 affects. They are the data injection muxes 3340 of the horizontal connector 3320 a horizontal breaker tile driving the horizontal long lines, and the data injection muxes 3350 of a vertical connector 3330 of a vertical breaker tile driving vertical long lines.

In order to facilitate partial reconfiguration, one can extend the above concept of CSL configuration. Instead of just one global enzip signal 3310, there is an additional per-bank enzip signal so that logic within one logic bank can be reconfigured without affecting the normal operation of logic in other logic banks. In particular, horizontal long line connector data injection muxes 3340 driving Ive, and vertical long line connector data injection muxes 3350 driving lvs are controlled by the same bank-based enzip signal 3310. During CSL configuration, enzip is '0', and thus the long lines are forced to GND.

4. Processor Adaptation

Methods for adapting an 8032 microprocessor to a multi-master system bus are described here. The following four sections describe circuit modifications that were made to the processor's state machine, address generator, internal register accesses, and external memory references in order to adapt its interface to the CSI bus.

These methods may be adapted to another type of processor. The examples below are with reference to the 8032 MCU, but one skilled in the art can extend these methods to other types of processors.

These modifications combine to give the 8032 a uniform 32-bit address space, multi-master bus operation, and maximum performance during external memory cycles.

4.1. Holding a Bus Cycle

This method adapts an 8032 type MCU, originally designed to operate as a solitary master with fixed response time, to work in a multi-master shared bus that has a "wait signal controlled" variable response time.

There are several alternate methods for achieving multi-mastership. One is to alternately allocate a machine cycle of a fixed number of clock cycles (twelve cycles in the case of a standard 8032 MCU) to a DMA controller, which is usually entirely integrated with the MCU. In another case, the MCU includes a control register that allows the number of four-clock machine cycles for external memory references to be specified. One embodiment described below provides a bus wait signal that is used to delay the generation of a bus cycle completion signal to the 8032's internal state machine, thus allowing for a variable number of clocks to complete a bus cycle.

This allows the 8032 to share a bus with several other bus master devices and to work efficiently with external slave devices of various speeds.

The internal state of the MCU machine cycle is monitored to determine when a bus command should be issued. When the clock cycle on which the new command should be issued is reached, if the bus can not yet issue the command the internal state of the MCU is held static until the clock cycle on which the command may be issued. The point at which a command may be issued may then be delayed. An arbitrator may then be introduced to control which of any number of devices will be allowed to issue the next command on the bus.

The internal state of the MCU machine cycle is monitored to determine when a response is needed. When the clock cycle on which a response is needed to proceed is reached, if the response data is not yet available the internal state of the micro-controller is held static until the clock cycle on which it does become available. The bus responses may be delayed an arbitrary number of clock cycles by each device responding yet no extra cycles are wasted for any particular response.

Figure 34:
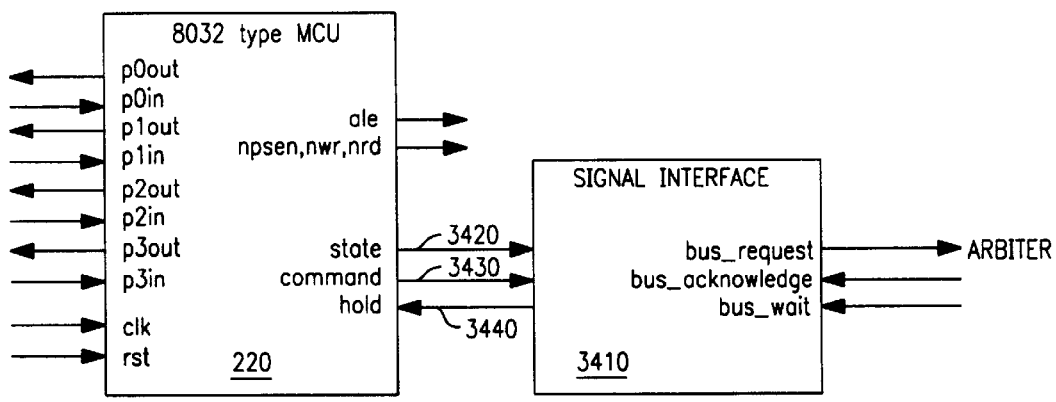
FIG. 34 is a block diagram of one embodiment of a wait state adaptation of 8032 to CSI bus.

FIG. 34 shows one embodiment wait state adaption of an 8032 microprocessor. The added "state" signals 3420 are the ones monitored to indicate the state of the clock in the current machine cycle. The added "command" signals 3430 are the ones monitored to indicate whether and what type of transaction must be issued on the bus. The added "hold" signal 3440 may be used to stop the clock, to re-circulate the register values, or in some other way combined with the existing control signals to maintain the current state of the MCU 220. These signals 3420, 3430, 3440 are passed to a signal interface 3410. The signal interface 3410 is coupled to the arbiter (not shown). The "bus_request" signal indicates to an arbiter that the bus is required for a transaction. The "bus_acknowledge" signal indicates that the bus may be used to issue a command. The "bus_wait" signal indicates that the current transaction is not yet completed.

4.2. Address and Command Translation

This method allows several smaller command specific address spaces to be mapped into a larger shared address space in a flexible manner.

There are three alternate examples that translate from a single unified address space. In one case a 16-bit address is extended with an additional register with 8-bits. In another case, four fixed source address ranges of 14-bits each within a 20-bit address space are extended with 7-bits from a register. In the last case, a source range defined by a base and limit comparison register is modified by addition with an offset register.

The method described separately extends each of the address spaces for code, data and direct registers of the 8032 type MCU into a single larger address space. A priority ranked decode of each source address space to be translated allows several different source address ranges, that may or may not overlap, to be converted to a different destination address range. This translation is very fast because the address decode and replacement operations may be done in parallel, magnitude comparisons are avoided in the decode, and addition is avoided in the replacement.

Three different source address spaces of an 8032 type MCU are translated by this method. The code and external data addresses, each a 16-bit space, and the direct registers, an 8-bit space. The source address is decoded in parallel for several source translation zones, eight for one embodiment.

Each decode is executed by comparing the high order eight bits to a value set for each zone, masking off any lower order comparisons according to a compare size set for that zone, and combining the result of the individual bit comparisons, masks and an enable for each zone.

The decode results are then handled in a priority order such that the address replacement defined for the highest priority decode will be the only one performed. The address replacement is done by substituting just the address bits used for the decode described with a destination address and further appending higher order destination address bits. The low order address bits within the zone that are not involved in the decode are passed through unchanged. The decode and replacement address bits as well as the size and enable may be either fixed or are user defined values. Two alternative bytes are used for the high eight address bits of code address depending on whether the address is an operation code or an operand, which are the first byte and successive bytes of an instruction. This allows these bits to be used to provide additional transaction type information on the address lines when used with suitable destination decoders.

Figure 35A:
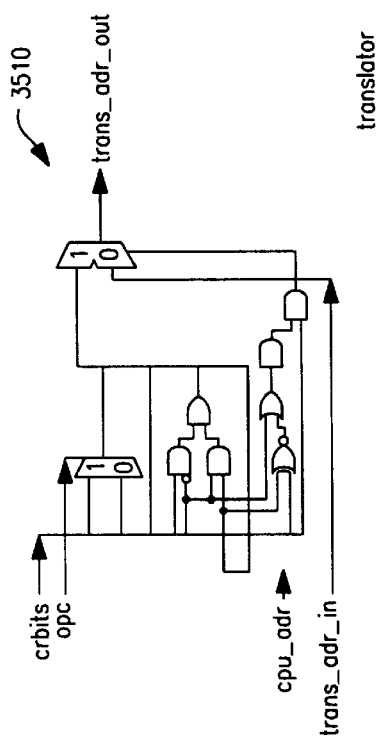
FIG. 35 is a block diagram of one embodiment of an address mapper.
Figure 35B:
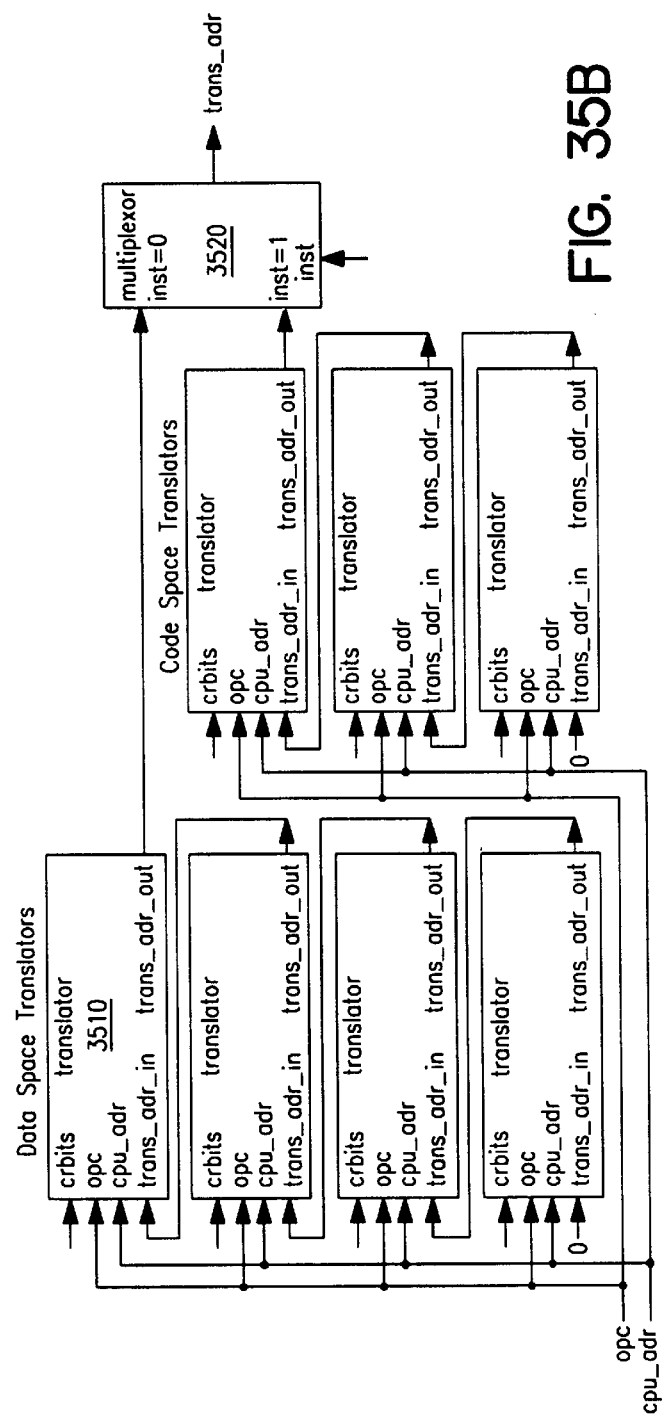

FIG. 35 shows one embodiment of address and command translation for the code and data addresses. The "cpu_adr" signals provide the source address while the "inst" signal indicates whether the source address is from code space or from data space. The "opc" signal further indicates when it is code whether it is an operation code if asserted versus an operand if not. The "crbits" signal collectively indicates all control values including the decode zone size and location, enables and the target address replacement values. The "trans_adr" signal is the final translated address while the "trans_adr_in" and "trans_adr_out" are the successive translation results from each stage.

FIG. 35 shows one of the parallel address translators 3510 and the replacement multiplexor 3520. There are seven instances of the translator 3510. FIG. 35 also shows one embodiment of how the translators 3510 are combined to establish priority and code versus data distinction.

4.3. Export of Special Function Registers

This method allows direct address register references that were originally designed to be handled internally by an MCU to be sent outside the MCU, allowing the operations of special function registers to be extended or modified in a flexible manner.

There are three alternate examples. In one case the functions of the existing internal special function registers are modified in a fixed manner entirely integrated with the MCU. In another case, additional special function registers are defined in a fixed manner, also entirely integrated with the MCU. In the last case, for users unable to fully integrate their design extensions within the MCU, the external memory data references are used rather than direct register references.

This method allows a system designer to take advantage of the faster and simpler direct register references in extending the functionality of an 8032 type MCU without having to either modify the MCU or to integrate it within the MCU. Further, in combination with a bus oriented programmable logic system, this allows the elimination of dedicated routing for both the input and output paths of each bit of all of the standard port interface special function registers, thus saving the routing overhead for a total of 64 interface signals.

An export table containing a single user defined programmable bit for each direct register location that may be referenced is added. The bit indicates whether a reference to that location should be allowed to complete internal to the MCU or if it is to be "exported", sent outside the MCU. The internal state of the MCU is monitored to determine when a direct register read or write is to be made and what address is being used. The address is used to reference the export table. When the corresponding location is to be sent outside, a special bus cycle is generated outside the MCU to either write or read the corresponding externally defined register. The internal transaction is blocked. The state of the MCU is held at the current state whenever the external reference has not been completed. The internal write data is provided to the external bus and the external read data is provided to the internal bus.

Figure 36:
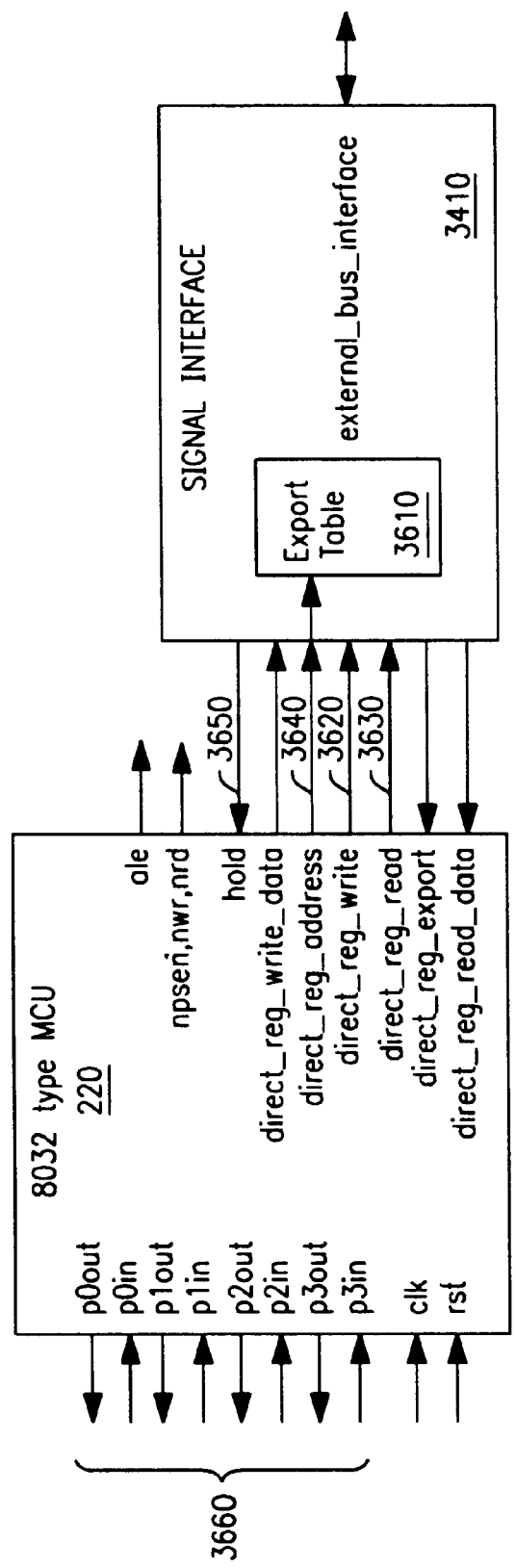
FIG. 36 is a block diagram of one embodiment of exporting of special function registers of 8032.

FIG. 36 shows one embodiment of register exportation. The added "direct_reg_read" 3630 and "direct_reg_write" 3620 signals are monitored to indicate that a read or write of a direct register is being made. The added "direct_reg_address" 3640 signal is monitored to indicate which register is being referenced. For one embodiment, an export control table 3610 implements an area where in some other address space the user may write and read the values and it is read only, one bit at a time in the direct register address space. For one embodiment, the export control table 3610 is implemented as a dual-port RAM.

This table 3610 may also be implemented as a ROM in the direct register space, in another logical form, or in some combination of forms. The added "direct_reg_export" signal indicates that either a direct register read or write is taking place and that the addressed register is to be exported. The added "direct_reg_write_data" and "direct_reg_read_data" signals are used to transfer the register data on a write or a read respectively. All of these added signals are then used to generate an appropriate bus transaction outside the MCU 220. The "direct_reg_export" signal is also used inside the MCU 220 to control the local source and destination of the register data. The added "hold" signal 3650 is used to keep the MCU 220 in its current state while it waits for the transaction to proceed.

All of the signals of the four ports 3660, shown in FIG. 36 as 8-bit bus signals "p0out", "p0in", "p1out", "p1in", "p2out", "p2in", "p3out", and "p3in" may be eliminated and their interface functionality recreated within logic connected via the "external_bus_interface".

4.4. Bypassing CSI Bus

Figure 37:
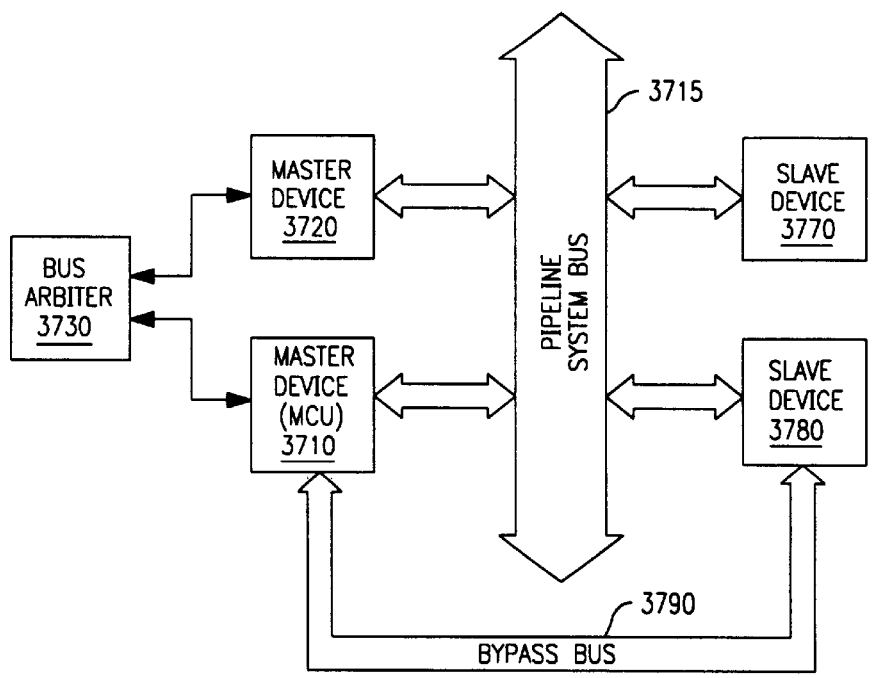
FIG. 37 is a block diagram of one embodiment of bypassing a CSI bus.

This section describes a method to eliminate latency in inter-device communication within a pipeline system architecture. This method enables an MCU to communicate with a slave device, in this case a memory, without incurring any latency in a context of a pipelined architecture. It thus allows a non-cache MCU to fetch code or data without any wait states and make maximum use of the MCU bandwidth. FIG. 37 shows one method of bypassing the CSI bus.

In a pipeline system, a certain number of pipeline stages lie between any bus devices, master 3710, 3720 or slave 3770, 3780. Sending or receiving data through such an architecture adds latency (clock cycles) to the communication. For any MCU 3710, or device not equipped to function within the constraints of a pipeline system, it means a number of additional clock cycles are added to the read or write access time of the device, thus decreasing its effective throughput. Through the use of a dedicated bus 3790 between two devices 3710, 3780, this latency can be eliminated. This bypass bus 3790 as shown in FIG. 37 bypasses the pipeline system bus 3715 and allows communication between the two devices 3710, 3780 at their optimal rate.

To keep the sequence of events (read and write transactions) in order, any access present on the bypass bus 3780 is replicated on the system bus 3715. Those accesses are identified as such, in order for the recipient of the transaction not to execute the same event twice. This task can be accomplished through the use of an additional control line on the bus 3715, for example. This replication on the main system bus 3715 is also useful for debugging purposes.

Another implication of the ordering is that the master device 3710, 3720 arbitrates for the pipeline system bus 3715 even though the effective transaction resides on the bypass bus 3790. Once granted, the master device 3710, 3720 can start the bypass access and also put the equivalent tagged transaction on the pipeline system bus 3715. Until the pipeline system bus 3715 is granted to the master 3710, 3720, the bypass transaction is held. This is only true when multiple master devices 3710, 3720 share the use of the pipeline system bus. In the case where only one master is present, the issue of ordering disappears, and the master device need not arbitrate for the pipeline bus when it uses the bypass bus.

5. Other CPSU On-Chip Resources

A Configurable Processor System Unit, CPSU is a device that integrates a multitude of functions and technologies on a monolithic integrated circuit device. At least one or more of the following type of functions are integrated on a single silicon substrate to constitute a CPSU device: a central processing unit, an interconnect bus, and configurable system logic, or CSL, commonly known as Programmable Logic. This section describes several categories of integrated on-chip functions that improve CPSU's usability and performance.

Adding on-chip volatile or non-volatile memory provides the microprocessor an option to execute code from internal memory, hence reducing power and increasing performance. On-chip non-volatile memory in the form of PROM, or other erasable technologies, is optionally integrated to provide a pre-canned boot-up algorithm that manages the configuration of the CSL matrix and initialization of CPSU system registers.

A CPSU device with an integrated central processing unit, an interconnect bus, and configurable system logic is very flexible and can be configured to provide an external memory interface by simply programming the appropriate logic into the CSL matrix. The pattern for customizing the CSL, referred to as a bit-stream, usually resides in an external non-volatile memory device connected to the CPSU. This represents a problem since the bit-stream for establishing an external memory interface resides in the same external device that the CPSU will be connected to. An on-chip memory interface unit, MIU, overcomes this problem while providing several other services that are described below.

As systems get more and more integrated on a single silicon substrate debugging becomes increasingly difficult due to inaccessible pins. For one embodiment in-circuit debugger hardware is incorporated into the CPSU. The debugger hardware, consisting of a JTAG interface unit and a hardware breakpoint unit, provides controllability and observability to logic in the CPSU.

Another improvement to the CPSU, which provides significant bandwidth increase when moving large blocks of data, is the integration of a Direct Memory Access controller, DMA. The CSI bus has been designed to interface with a DMA controller. The circuits and techniques describing this handshake have been described in previous sections.

5.1. Random Access Memory

On-chip RAM has several system benefits: system part count reduction resulting in reduced board space and cost, enhanced system performance and lower power, and improved security in certain applications. Although on-chip RAM in itself is not unique and there is substantial prior art that describes its usage alongside a microprocessor, the embodiment of this invention describes a specific method for connecting RAM, CPU, and CSL through a shared system bus. By connecting these three resources together through a shared system bus, or CSI, not only can the CPU access the RAM to execute code or fetch data, any other device residing inside in the CSL matrix can access the RAM as well. FIG. 2 illustrates the connection of user RAM to a shared CSI system bus.

5.2. Non-volatile Memory

On-chip non-volatile memory in the form of PROM, or other erasable technologies, is optionally integrated into the CPSU to provide canned algorithms that configure an SRAM based CSL matrix and initialize the CPSU system registers upon power-on. Additionally the non-volatile memory can be programmed to provide a host of other services such as debug monitor routines and user application code. Alternatively the on-chip memory's code may instruct the CPU to fetch and execute secondary code segments from off-chip external memory devices or other host interfaces. The possibilities are limitless and in each case they are feasible through customization of this memory's code.

The non-volatile memory resides on the system bus as described in FIG. 2, and for one embodiment is located at system address Hex 0000. Upon exiting the Power-on-reset state most microprocessors including the 8032 MCU start executing code from memory at address location Hex 0000. The binary machine code that resides in this memory establishes the unique requirements that initialize the CPSU and prepare it for the application program. This is also known as Boot code.

The external memory timing is variable, allowing the CPSU 110 to optimize or slow down accesses to fit the particular AC electrical characteristics of different memory devices 3820. The MIU 3810 can also interface with an external serial sequential-access PROM memory, similar to those used to configure SRAM-based field-programmable gate arrays.

The address, data, and control pins of the MIU are also controllable from other peripheral functions 3830, including the Configurable System Logic (CSL) matrix, allowing access to external peripherals or memory devices. The MIU 3810 uses minimal handshaking logic from within the CSL matrix.

For one embodiment, an eight-bit register inside the MIU provides control over serial-mode initialization and over device programming for an external, FLASH- or EEPROM-based, sequential-access serial PROM. For one embodiment, the register has the following information:

| 7 | 6 | 5 | 4 | 3 | 2 | 1 | 0 |
|---|---|---|---|---|---|---|---|
| SDIN | CLKDIV | SDOUT_EN- | SDOUT | CLK | CE- | SER_EN- | RESET_OE- |

It is not necessary to have on-chip non-volatile memory in the case where an off-chip non-volatile memory exists. However, in some applications, whether it is for security, for lower cost, or for field upgrade-ability, the on-chip non-volatile memory provides significant system advantages.

5.3. External Memory Interface Unit

An external memory interface provides many important functions for the CPSU. The pattern of 1's and 0's for customizing the CSL as well as the CPU program usually resides in an external non-volatile memory device connected to the CPSU. The memory interface unit provides a connection between on-chip CSI system bus and external serial or parallel byte wide memory.

In the case where the amount logic in one CPSU device's CSL matrix is insufficient, provision for multi-CPSU logic expansion is made. The expansion port is the memory interface unit operating in a single master, multi-slave environment.

Additionally, significant manufacturing test time reductions are made possible through a test mode operation in the memory interface unit.

5.3.1. Serial and Parallel External Memory Interface

A method is described that enables a system memory interface to communicate with parallel as well as serial static memories. It allows a system to interface to different types of external static memories, parallel or serial with the same controller.

Figure 38:
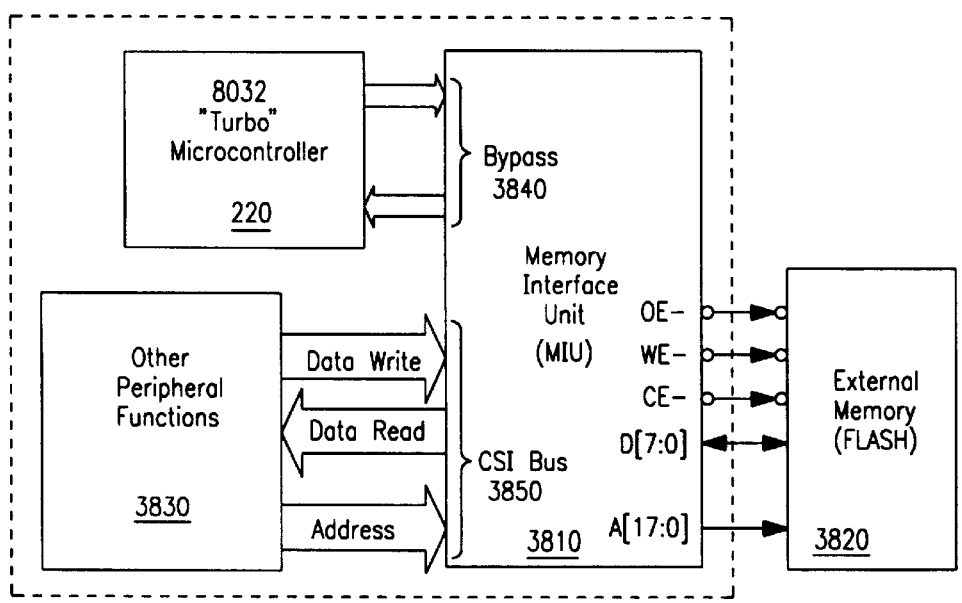
FIG. 38 is a block diagram of one embodiment of a Memory Interface Unit (MIU).

FIG. 38 highlights the Memory Interface Unit (MIU) 3810, which provides a flexible direct interface between the CPSU device 110 and external memory 3820. The MIU 3810 primarily provides access to an external memory device 3820—for one embodiment a 256K×8 Flash PROM—that contains the device initialization data and the user's program code. Other types of memory, such as static RAM or EPROM, can be substituted for the Flash PROM.

As shown in FIG. 38, the MIU 3810 provides a direct connection between the 8032 microcontroller 220 and the external memory 3820. By using a bypass bus 3840, and bypassing the internal CSI bus 3850, the CPSU 110 maintains timing compatibility with the original 8032 microcontroller 220 implementation.

RESET_OE—drives the RESET/OE—enable pin of the external serial memory via the MIU's OE—pin. This bit is set by a Power-On or System Reset event.

SER_EN—drives the write-enable input of an external FLASH- or EEPROM-based serial PROM for programming. This bit is set by a Power-On or System Reset event.

CE—drives the chip-enable input of the external serial PROM. This bit is set by a Power-On or System Reset event.

SDOUT is the external serial memory data. This bit is only used when programming an in-system programmable, external, serial PROM. This bit is unaffected by a reset.

SDOUT_EN—is the external serial memory write data output enable. In serial write mode, this bit provides direct control over the three-state enable line of the output data buffers. This bit is cleared by a reset.

SDIN is the serial memory read data. In serial write mode only, this bit corresponds to D0 of the external data bus. It enables software to read the acknowledge status while programming the serial memory. This bit is read-only.

5.3.2. Multi-CPSU Systems

A multi-CPSU system provides CSL logic expansion when the logic capacity inside a single CPSU device is insufficient for a target application.

Figure 39:
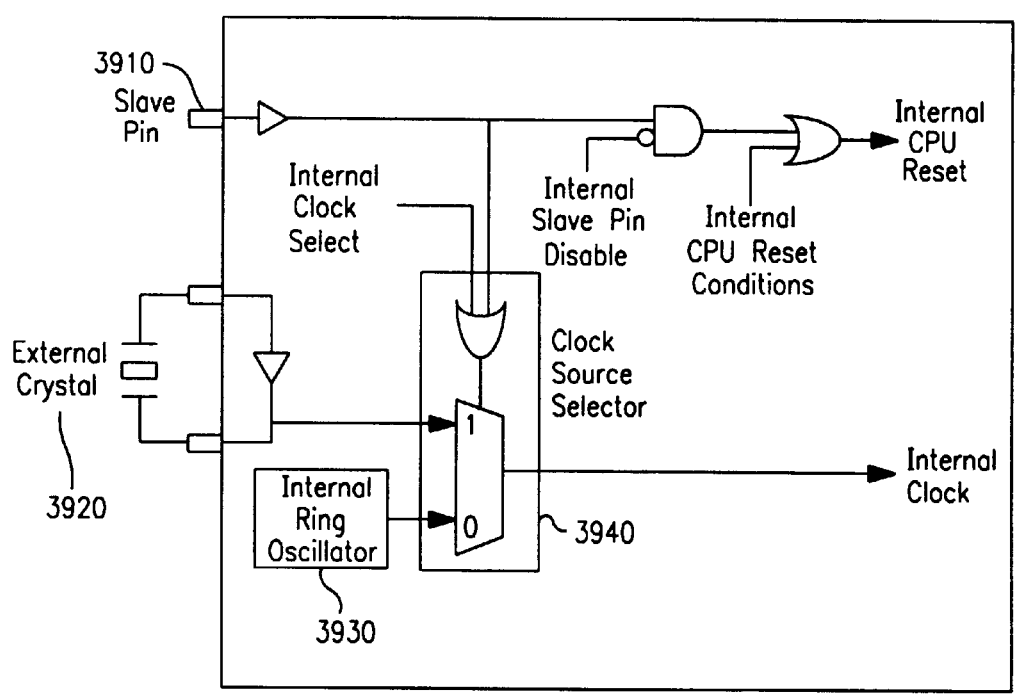
FIG. 39 is a block diagram of one embodiment of a multiple clock source.

In a multi-CPSU system a single master device programs the slave devices. A dedicated pin 3910 (slave pin) indicates whether or not the CPSU 110 operates as a master or slave device as shown in FIG. 39. When this pin 3910 is set, slave operation is enabled and a source selector 3940 selects the external crystal's 3920 CLK-IN pad as the clock source. The master device, for one embodiment, begins operation using its internal ring oscillator 3930 upon powering on and switches to the external crystal's 3920 CLK-IN source before it begins configuring its own CSL matrix. After the master device configuration completes, all remaining slaves connected to the master's memory interface unit are programmed.

The slave pin 3910 is also used to keep the CPU of each slave chip in reset until they are completely configured. Once configured, the slave chip CPUs are released by the master chip through the use of one of the system control registers. One of the bits can be used to disable the effect of the slave pin on the CPU reset.

Figure 40:
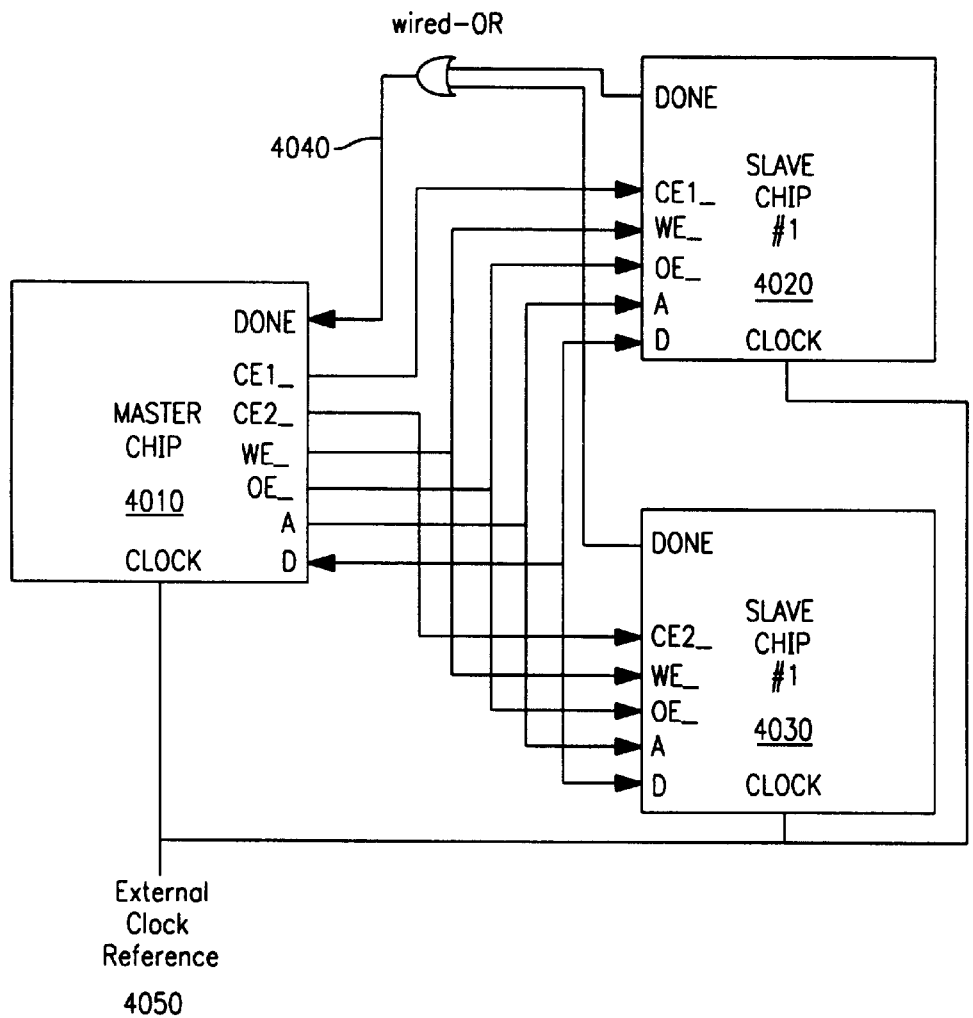
FIG. 40 is a block diagram of one embodiment of a multi-CPSU system showing shared vs. unique signals with multiple slaves.

In a multi-chip environment, one master chip 4010 is used to talk to the external memories as well as all the slave chips 4020, 4030, as in FIG. 40. In such an environment the memory interface unit is unable to adapt its bus timing to multiple devices since these external devices may have variable response time. By adding an additional signal 4040 this problem is circumvented. The signal, DONE 4040, is used to indicate that the slave device 4020, 4030 being accessed has completed the read or write transaction.

For one embodiment, the master and all slave devices are synchronous to each other, and run from a single external clock source 4050. The external signals generated by the master chip 4010, as well as the slave completion indicator, DONE 4040, can then be sampled at the rising edge of the clock and offer maximum system performance.

Figure 41:
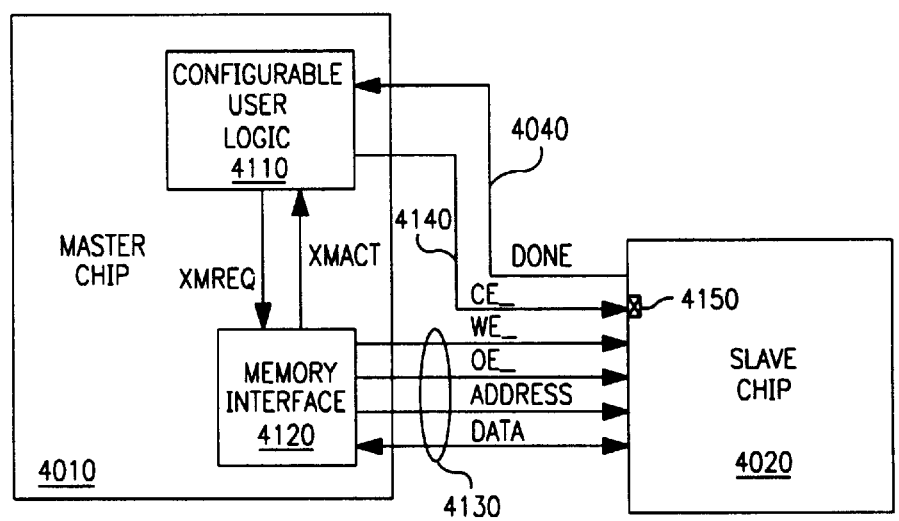
FIG. 41 is a block diagram of one embodiment of a multi-CPSU system showing internal blocks of master handling slave interface.

FIG. 41 shows one embodiment of how a standard memory interface is adapted to this new environment. Each slave device 4020 requires its own chip select signal (CEn__) 4140 (where n is the n-th slave chip) that is being driven by the master chip's 4010 memory interface 4120. The write enable (WE__), output or read enable (OE__), address (A) and data lines (D) 4130 are shared by all slave devices 4020.

Each slave device 4020 generates the completion indicator (DONE) 4040. For one embodiment, the master chip 4010 collects all the DONE signals 4040 and consolidates them internally. For another embodiment, the DONE signals 4040 are connected externally in a wired-OR configuration. Each slave chip 4020 drives the DONE signal 4040 to a low value at all times. During one of the master chip 4010 external transactions, only one chip select line 4140 is active. The slave device 4020 being accessed, upon completion of its part of the transaction, drives the DONE signal 4040 high. As soon as the master chip 4010 sees the DONE signal 4040 go high, it terminates the transaction.

In a multi-chip environment, the master chip 4010 communicates with the slave chip 4020 through its standard memory interface. Using the same address, data and control lines 4130, the master chip 4010 can generate read or write transactions targeted to one of the slave chips 4020. Each slave chip 4020 uses a dedicated chip select pin 4140. These changes are equivalent to adding an external memory. Therefore, the same mechanism used to extend the external memory sub-system, described above, can be used in a multi-chip system.

5.4. System Debugger 5.4.1. JTAG as CSI Master

Figure 42:
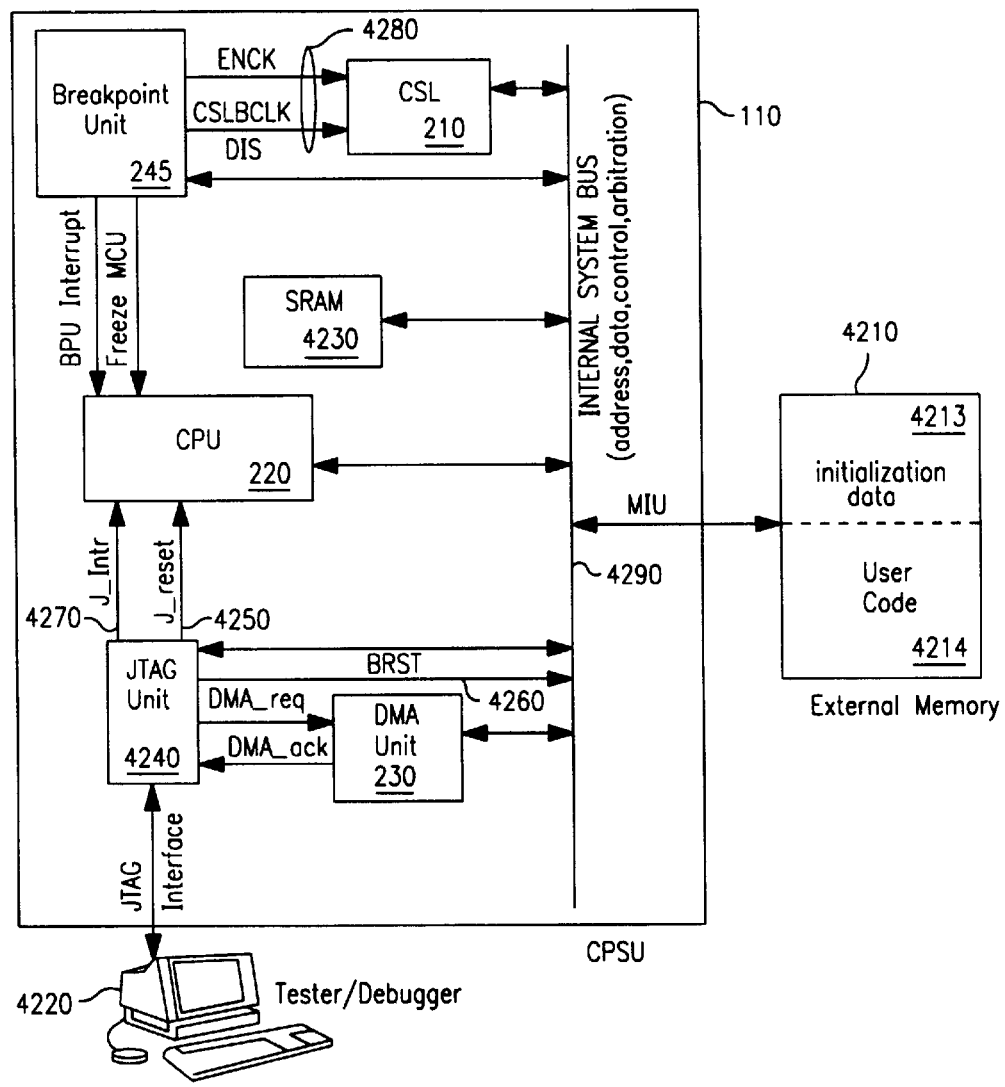
FIG. 42 is a block diagram of one embodiment of a JTAG as bus master.

This method adapts a boundary scan JTAG port that was originally designed to test chip boundaries to operate as a master on the shared internal system bus and have access to all system resources for efficient system debugging. FIG. 42 shows the JTAG as a bus master.

A multi-master/multi slave internal system bus 4290 connects to several building blocks including a CPU 220, DMA unit 230, memory devices 4230, and peripherals. The JTAG unit 4240, as a bus master, is capable of requesting a bus access. When the JTAG unit 4240 gains control over the internal bus 4290, it is capable of accessing any addressable element connected on the system.

A computer 4220 acting as an external tester or debugger can interface with the CPSU device 110 via its JTAG port, using a cable connected between the computer and the target board as shown in FIG. 42.

The JTAG unit 4240 can access all addressable system resources by becoming the bus master on the internal CSI bus 4290. Serving as a bus master, the JTAG unit 4240, for one embodiment, converts serial bit streams into parallel registers whose contents are placed on the address, data and command buses to emulate CSI bus transactions. A JTAG unit 4240 also directly accesses internal MCU registers and CSL configuration data with visibility to functions not accessible from application programs.

Furthermore, the JTAG unit can hold the MCU 220 in reset by asserting the J__RESET 4250 command or hold the entire system in reset using the BRST__line 4260. The JTAG unit 4240 also interacts with the MCU 220 using an interrupt handshake mechanism (J__INTR) 4270.

The JTAG unit 4240 serves as a bus slave when interacting with the DMA unit 230. It first becomes master on the CSI bus 4290, programs the DMA unit 230 to transfer data to or from the JTAG unit 4240, and then relinquishes the CSI bus 4290 to the DMA unit 230. After configuring the DMA unit 230, the JTAG unit 4240 interfaces with the DMA unit 230 as a slave device using the DMA unit's 230 request and acknowledge signals. There is considerably less overhead in this type of data transaction since the JTAG unit 4240 does not need to provide address or control information during DMA operations.

5.4.2. Hardware Breakpoint Unit

Serving as a bus master, the JTAG unit 4240 is able to set breakpoint events within the breakpoint unit 245, which is also a slave connected on the CSI bus 4290. For one embodiment, the breakpoint unit 245 supports two independent breakpoint conditions. The breakpoint unit 245 monitors user-specified combinations of address, data, control, or DMA signals as breakpoint events. The user can also count logic conditions occurring inside the CSL as breakpoint events. A breakpoint specification can count up to 64K incidents as the matching condition for a break event.

Once a breakpoint condition occurs, then depending on its current configuration, the MCU 220 freezes at the end of the current instruction or receives a breakpoint interrupt and branches to execute debugger interrupt routines. Following a breakpoint freeze, CSL clocks or global signals can be blocked to aid system debugging. The ENCK and CSLBCLK__DIS signals 4280 can freeze CSL clocks when a breakpoint freeze condition happens. For one embodiment, a user may specify which CSL clocks or global signals are affected following a breakpoint freeze.

During a CPU freeze period, the JTAG unit 4240 can poll any addressable location residing inside or outside the CPSU 110 and send all requested information to the computer 4220 for further display and analysis.

At the end of the debugging session, JTAG unit 4240 clears the breakpoint "freeze MCU" condition and the 8032 microcontroller 220 resumes code execution from where it left off. Alternatively, the JTAG unit 4240 can restart code execution from memory location 0000h by issuing a J__RESET command 4250 to the MCU 220.

At any point in time, the JTAG unit 4240 can instruct the MCU 220 to enter a single-step operation and send pertinent display information to the computer 4220.

The JTAG port can also be used to initialize the CPSU 110 or to update external memory devices connected to the MIU port. Using external Flash memory 4210, the JTAG unit 4240 can download a Flash-programming algorithm to the CPSU's internal RAM. The external Flash memory 4210 may include initialization data 4213 and/or user code 4214. The JTAG unit 4240 can interact with the internal MCU 220, allowing the processor 220 to control the actual program/erase/verify algorithms while the JTAG port supplies new data for programming or a new series of commands to the MCU 220.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A configurable processor system unit comprising:
   a processor;
   at least one region of random access memory (RAM) based dynamically configurable volatile programmable logic; and
   a bus coupling the processor and the at least one region of programmable logic;
   wherein the processor, the programmable logic, and the bus are implemented on a single integrated circuit.

2. The configurable processor system unit of claim 1, wherein the bus is an internal, pipelined system bus.

3. The configurable processor system unit of claim 2, wherein the internal, pipelined bus is distributed within the programmable logic.

4. The configurable processor system unit of claim 1, further comprising a bus arbitration logic, and wherein the bus is a multi-master bus.

5. The configurable processor system unit of claim 1, wherein the bus comprises an address bus and a data bus.

6. The configurable processor system unit of claim 5, wherein the data bus is a shared or split read/write data bus.

7. The configurable processor system unit of claim 1, further comprising an address mapper for mapping an address generated by the processor from a processor address space to a system address space.

8. The configurable processor system unit of claim 7, wherein the processor has smaller separate address spaces for code and data, relative to a larger single system address space.

9. The configurable processor system unit of claim 8, wherein the smaller separate address spaces comprise 16-bit spaces.

10. The configurable processor system unit of claim 8, wherein the larger single system address space is a 32-bit address space.

11. The configurable processor system unit of claim 1, further comprising a random address memory (RAM).

12. The configurable processor system unit of claim 1, further comprising a read only memory (ROM) or a non-volatile type memory.

13. The configurable processor system unit of claim 12, wherein the processor and the programmable logic are bootstrapped from a boot portion of the ROM.

14. The configurable processor system unit of claim 13, wherein the processor and the programmable logic are further personalized as part of the bootstrapping.

15. The configurable processor system unit of claim 14, wherein the further personalization is part of a subroutine call by the boot portion of the ROM to an external memory.

16. The configurable processor system unit of claim 1, further comprising an external memory interface unity.

17. The apparatus of claim 16, further comprising a direct connection between the external memory interface unit and the processor bypassing the bus.

18. The configurable processor system unit of claim 17, wherein the direct connection comprises a bypass bus.

19. The configurable processor system unit of claim 1, further comprising a dynamic memory access (DMA) controller.

20. The configurable processor system unit of claim 1, further comprising an in-circuit debugger hardware.

21. The configurable processor system unit of claim 20, wherein the in-circuit debugger hardware comprises a JTAG interface and a hardware debugger unit on a main system bus to provide observability of logic in the configurable processor system.

22. The configurable processor system unit of claim 20, further comprising a JTAG unit.

23. The configurable processor system unit of claim 22, wherein the JTAG unit is a bus master in a debug mode.

24. The configurable processor system unit of claim 23, wherein the JTAG unit can access all addressable system resources when the JTAG unit is a bus master.

25. The configurable processor system unit of claim 24, wherein the JTAG unit serves as a bus slave when interacting with a DMA unit.

26. The configurable processor system unit of claim 1, wherein the programmable logic is a bus slave or a bus master.

27. The configurable processor system unit of claim 1, wherein the at least one region of dynamically configurable programmable logic is reconfigured by the processor.

28. The configurable processor system unit of claim 27, wherein configuration memory cells of the at least one region of programmable logic are addressed as system random access memory (RAM).

29. The configurable processor system unit of claim 28, wherein a configuration information to configure the programmable logic is retrieved from an external memory.

30. The configurable processor system unit of claim 28, further comprising a memory interface unit and a bypass bus, the memory interface unit coupled to the processor via the bypass bus, the memory interface unit for configuring the programmable logic.

31. The configurable processor system unit of claim 1, wherein the processor includes memory-mapped internal registers that are exported to the internal system bus, to be available to other bus masters.

32. The configurable processor system unit of claim 31, further comprising a signal interface for translating addresses permitting the internal registers to be exported.

33. The configurable processor system unit of claim 32, wherein the signal interface further includes an export table including a programmable memory for each direct register location that may be referenced.

34. The configurable processor system unit of claim 1, wherein the programmable logic comprises a semi-homogeneous two-dimensional array of logic banks including an embedded extension of the bus.

35. The configurable processor system unit of claim 1, wherein the at least one region of programmable logic comprises:
   an array of banks, each bank including a plurality of tiles, wherein each tile may be programmed to perform a function.

36. The configurable processor system unit of claim 35, wherein the at least one region of programmable logic further comprises:
   a plurality of breaker tiles arranged between the banks, the breaker tiles for leading signals into the tiles.

37. The configurable processor system unit of claim 36, wherein the breaker tiles comprise:
   a vertical breaker and a horizontal breaker associated with each bank, such that each bank is surrounded by all four sides by breaker tiles.

38. The configurable processor system unit of claim 37, wherein the breaker tiles further comprise a corner breaker tile.

39. The configurable processor system unit of claim 36, wherein the break tiles include system level circuitry and receive and distribute data signals, address signals, control signals to the bank.

40. The configurable processor system unit of claim 36, wherein the at least one region of programmable logic comprises short lines that connect adjacent tiles within a bank.

41. The configurable processor system unit of claim 40, wherein the at least one region of programmable logic further comprises long lines extending across multiple tiles in a bank.

42. The configurable processor system unit of claim 41, wherein the breaker tiles comprise programmable connections between the long lines between adjacent banks.

43. The configurable processor system unit of claim 36, wherein the bus is distributed such that a copy of the bus is distributed to each bank across the breaker tiles.

44. The configurable processor system unit of claim 43, wherein:
   an address bus is distributed down the column of the horizontal breakers;
   a write data bus is distributed down the column of the vertical breakers;
   a read data bus is distributed up the column of vertical breakers.

45. The configurable processor system unit of claim 44, wherein additional global signals are distributed across the programmable logic using the breaker tiles.

46. The configurable processor system unit of claim 35, wherein a bank comprises an 8 tile by 8 tile row by column array of logic block tiles.

47. The configurable processor system unit of claim 36, further comprising additional breaker tiles at an edge of the region of programmable logic, the additional breaker tiles designed to accommodate input/output (I/O) pads for the region of programmable logic.

48. The configurable processor system unit of claim 35, wherein the tile comprises:
   an address decoder;
   a data path element; and
   a block of programmable logic and interconnect (PLAI).

49. The configurable processor system unit of claim 48, wherein the address decoder is for generating a match signal.

50. The configurable processor system unit of claim 48, wherein the data path element is for driving signals into and out of the PLAI.

51. The configurable processor system unit of claim 48, wherein the PLAI comprises:
   a programmable logic block for implementing a function;
   a horizontal input mux array for driving and selecting one or more signals running through the tile;
   a vertical input mux array for driving and selecting one or more signals running through the tile;
   a zip switch box for performing switching functions among a plurality of available signals.

52. The configurable processor system unit of claim 35, further comprising a data path chain for connecting signals to individual tiles within the region of programmable logic.

53. The configurable processor system unit of claim 52, wherein a single active signal from a single tile injected into the data path chain, such that one tile drives the signal.

54. The configurable processor system unit of claim 36, wherein a multi-source distributed signal is driven to the region of programmable logic by an array structure that allows a signal source to drive the array structure at any point, and provides a logical OR function of all sources to the array at any point of the array.

55. The configurable processor system unit of claim 54, wherein the multi-source distributed signal is a wait control signal.

56. The configurable processor system unit of claim 35, wherein the region of programmable logic further includes a configuration memory space used to partially or fully configure or reconfigure the region of programmable logic.

57. The configurable processor system unit of claim 56, wherein the processor can address the configuration memory space as part of the system address space.

58. The configurable processor system unit of claim 56, wherein a bank of the region of programmable logic may be disconnected from other banks and may be dynamically reconfigured without affecting operations of circuits programmed into other banks.

59. The configurable processor system unit of claim 1, wherein the bus is a multi-master shared bus, and the processor includes a hold signal to interact with the multi-master shared bus.

60. The configurable processor system unit of claim 1, wherein specific address spaces addressed by the processor are remapped, such that the processor addresses a single larger address space, that may include areas of the region of programmable logic.

61. The configurable processor system unit of claim 1, further comprising a bypass bus coupling the processor to a memory to reduce memory latency.

62. The configurable processor system unit of claim 61, wherein the processor arbitrates for the bus when using the bypass bus.

63. The configurable processor system unit of claim 1, further comprising an external memory interface unit providing a connection between the processor and an external memory, the connection bypassing the bus.

64. The configurable processor system unit of claim 1, wherein the bus comprises a plurality of segments coupling an arbiter, at least one master device, and the programmable logic together.

65. The configurable processor system unit of claim 64, wherein an arbitration segment of the bus couples the arbiter and the master device for arbitration requests and response signals.

66. The configurable processor system unit of claim 64, wherein a master write segment couples signals from the master device to a bus pipe, and a master read segment couples signals from the bus pipe to the master device.

67. The configurable processor system unit of claim 64, wherein the master write segment collects a plurality of master signals into a consolidated bus.

68. The configurable processor system unit of claim 67, wherein the master write segment comprises multiplexors for collecting individual master signals into the consolidated bus.

69. The configurable processor system unit of claim 64, wherein a slave write segment couples signals from the bus pipe to the programmable logic, and a slave read segment couples the signals from the programmable logic to the bus pipe.

70. The configurable processor system unit of claim 69, wherein the slave write segment couples the signals to selectors and pipe registers distributed throughout the programmable logic.

71. The configurable processor system unit of claim 70, wherein a socket interface write segment carries signals from the selectors and the pipe registers to the slaves within the programmable logic.

72. The configurable processor system unit of claim 71, wherein a socket interface read segment collects signals from the slaves to return pipe registers.

73. The configurable processor system unit of claim 72, wherein the signals collected from the slaves are routed through a general-purpose configurable logic of the programmable logic.

74. The configurable processor system unit of claim 72, wherein the socket interface read segment further comprises logical OR gates for collecting the signals into consolidated bus signals at the return pipe registers.

75. The configurable processor system unit of claim 69, wherein a slave read segment couples signals from the programmable logic to the bus pipe.

76. A system on an integrated circuit comprising:
   a processor;
   an internal system bus; and
   a repetitive, block based, dynamically configurable programmable logic coupled to the processor by the internal system bus.

77. The system of claim 76, further comprising a memory interface for interfacing the system with an external memory.

78. The system of claim 76, further comprising a plurality of input/output pins (PIO) for interfacing the system with other devices through the programmable logic.

79. The system of claim 78, wherein the PIO further comprise interface buffers coupled to the programmable logic.

80. The system of claim 76, wherein the repetitive block-based programmable logic comprises a semi-homogeneous two-dimensional array of logic banks.

81. The system of claim 80, wherein the logic banks of the programmable logic comprise:
   an array of banks, each bank including a plurality of tiles, wherein each tile may be programmed to perform a function.
   a plurality of breaker tiles arranged between the banks, the breaker tiles for leading signals into the tiles, wherein the breaker tiles comprise a vertical breaker and a horizontal breaker associated with each bank, such that each bank is surrounded by all four sides by breaker tiles.

82. The system of claim 81, wherein the logic banks include an embedded extension of the bus.

83. The system of claim 82, wherein:
   an address bus is distributed down the column of the horizontal breakers;
   a write data bus is distributed down the column of the vertical breakers;
   a read data bus is distributed up the column of vertical breakers.

84. The system of claim 76, wherein the programmable logic comprises:
   an array of banks, each bank including a plurality of tiles, wherein each tile may be programmed to perform a function.

85. The system of claim 84, wherein programmable logic further comprises:
   a plurality of breaker tiles arranged between the banks, the breaker tiles for leading signals into the tiles.

86. The system of claim 85, wherein additional global signals are distributed across the programmable logic using the breaker tiles.

87. The system of claim 86, wherein a bank comprises an 8 tile by 8 tile row by column array of logic block tiles.

88. A system comprising:
   a means for high performance processing;
   a means for coupling signals between components of the system; and
   a means for configuring customized gate arrays in a RAM-based logic circuit;
   wherein the means for processing, the means for coupling and the means for configuring are implemented on a single substrate.

89. A configurable processor system unit comprising:
   a processor;
   at least one region of programmable logic dynamically configurable by the processor; and
   a bus coupling the processor and the programmable logic;
   wherein the processor, the programmable logic and the bus are implemented on a single integrated circuit.

90. The system of claim 89, further comprising a memory, the memory used by the processor to configure the programmable logic, such that no external devices are used to configure the system.

91. A configurable system-on-a-chip comprising:
   a processor;
   at least one region of dynamically reconfigurable programmable logic that may be a bus master; and
   a system bus coupling the processor and the programmable logic; and
   a bus arbitration logic to arbitrate bus access between multiple masters.

92. The system of claim 91, wherein the bus comprises a plurality of segments coupling an arbiter, at least one master device, and the programmable logic together.

93. The configurable processor system unit of claim 92, wherein an arbitration segment of the bus couples the arbiter and the master device for arbitration requests and response signals.

94. A configurable system-on-a-chip comprising:
   a processor;
   at least one region of programmable logic, the programmable logic further providing input/output (I/O) to the system-on-a-chip; and
   a bus coupling the processor and the programmable logic.

95. The system of claim 94, further comprising wherein the processor is further to reconfigure the programmable logic, such that no external components are needed for configuring and reconfiguring the programmable logic.

96. The configurable system-on-a-chip of claim 94, wherein the processor includes memory-mapped internal register that are exported to the internal system bus, to be available to other bus masters.

97. The system of claim 95, wherein the PIO further comprise interface buffers coupled to the programmable logic.

98. The configurable system-on-a-chip of claim 96, further comprising a signal interface for translating addresses permitting the internal registers to be exported.

99. The configurable system-on-a-chip of claim 98, wherein the signal interface further includes an export table including a programmable memory for each direct register location that may be referenced.

100. The configurable system-on-a-chip of claim 95, wherein specific address spaces addressed by the processor are remapped, such that the processor addresses a single larger address space, that may include areas of the region of programmable logic.

101. A configurable system-on-a-chip comprising:

a processor;

a dynamically configurable programmable logic that may be reconfigured during run-time; and a bus coupling the processor and the programmable logic.

102. The system of claim 101, wherein the programmable logic may be reconfigured by the processor.

103. The configurable system-on-a-chip of claim 101, further comprising a read only memory (ROM) or a nonvolatile type memory.

104. The configurable system-on-a-chip of claim 103, wherein the processor and the programmable logic are bootstrapped from a boot portion of the ROM.

105. The configurable system-on-a-chip of claim 104, wherein the processor and the programmable logic are further personalized as part of the bootstrapping.

106. The configurable processor system unit of claim 105, wherein the further personalization is part of a subroutine call by the boot portion of the ROM to an external memory.

107. The configurable system-on-a-chip of claim 101, wherein configuration memory cells of the at least one region of programmable logic are addressed as system random access memory (RAM).

108. The configurable system-on-a-chip of claim 107, wherein a configuration information to configure the programmable logic is retrieved from an external memory.

109. The configurable system-on-a-chip of claim 107 further comprising a memory interface unit and a bypass bus, the memory interface unit coupled to the processor via the bypass bus, the memory interface unit for configuring the programmable logic.

* * * * *